United States Patent
Widmer et al.

(10) Patent No.: US 10,343,537 B2
(45) Date of Patent: Jul. 9, 2019

(54) METHOD AND APPARATUS FOR POSITIONING A VEHICLE

(71) Applicant: WiTricity Corporation, Watertown, MA (US)

(72) Inventors: Hans Peter Widmer, Wohlenschwil (CH); Andreas Daetwyler, Muhen (CH)

(73) Assignee: WiTricity Corporation, Watertown, MA (US)

( * ) Notice: Subject to any disclaimer, the term of this patent is extended or adjusted under 35 U.S.C. 154(b) by 196 days.

(21) Appl. No.: 15/449,718

(22) Filed: Mar. 3, 2017

(65) Prior Publication Data

US 2017/0259679 A1 Sep. 14, 2017

Related U.S. Application Data

(60) Provisional application No. 62/305,411, filed on Mar. 8, 2016, provisional application No. 62/343,736, filed on May 31, 2016.

(51) Int. Cl.
*H02J 7/00* (2006.01)
*B60L 11/18* (2006.01)
(Continued)

(52) U.S. Cl.
CPC ......... *B60L 11/1831* (2013.01); *B60L 11/182* (2013.01); *B60L 11/1827* (2013.01);
(Continued)

(58) Field of Classification Search
CPC .................................................. B60L 11/1831
(Continued)

(56) References Cited

U.S. PATENT DOCUMENTS

| 5,803,043 A * | 9/1998 | Bayron | F02P 11/04 |
| | | | 123/335 |
| 6,940,254 B2 * | 9/2005 | Nagamine | G06Q 30/06 |
| | | | 320/109 |
| 2005/0179531 A1 * | 8/2005 | Tabe | B60C 23/0408 |
| | | | 340/447 |

(Continued)

FOREIGN PATENT DOCUMENTS

DE 102010063665 A1 6/2012

OTHER PUBLICATIONS

International Search Report and Written Opinion—PCT/US2017/020890—ISA/EPO—dated Jun. 21, 2017.

*Primary Examiner* — Valkew Fantu
(74) *Attorney, Agent, or Firm* — Knobbe, Martens, Olson & Bear, LLP

(57) ABSTRACT

Methods and apparatus are discloses for position a vehicle. In one aspect, an apparatus for positioning a vehicle is provided. The apparatus comprises a plurality of receive, each configured to generate a respective voltage signal from a wireless magnetic field generated by a field generator. The apparatus further comprises a processor configured to determine a first set of data based on the respective voltage signals generated by the plurality of receive coils, and reduce the first set of data to a second set of data that is substantially constant regardless of relative rotation between the plurality of receive coils and the field generator. The apparatus is further configured to determine a plurality of candidate positions based upon the second set of data, which are used to determine a position and an orientation with respect to the field generator based on the first set of data.

30 Claims, 32 Drawing Sheets

(51) Int. Cl.
  *G01S 1/00*   (2006.01)
  *H02J 50/00*  (2016.01)
  *G01S 13/00*  (2006.01)
  *G05D 1/00*   (2006.01)

(52) U.S. Cl.
  CPC ............ *B60L 11/1833* (2013.01); *G01S 1/00* (2013.01); *G01S 13/00* (2013.01); *G05D 1/00* (2013.01); *H02J 50/00* (2016.02); *B60L 2240/62* (2013.01); *Y02T 10/7005* (2013.01); *Y02T 10/7072* (2013.01); *Y02T 10/7291* (2013.01); *Y02T 90/121* (2013.01); *Y02T 90/125* (2013.01); *Y02T 90/14* (2013.01); *Y02T 90/16* (2013.01); *Y02T 90/162* (2013.01)

(58) Field of Classification Search
  USPC ........................................................ 320/108
  See application file for complete search history.

(56) References Cited

U.S. PATENT DOCUMENTS

| | | | |
|---|---|---|---|
| 2010/0022904 A1 | 1/2010 | Centen et al. | |
| 2011/0246019 A1* | 10/2011 | Mineta | B60W 50/0097 |
| | | | 701/31.4 |
| 2012/0095617 A1 | 4/2012 | Martin | |
| 2012/0262002 A1 | 10/2012 | Widmer et al. | |
| 2015/0137801 A1* | 5/2015 | Raedy | B60L 11/1833 |
| | | | 324/207.15 |
| 2015/0217655 A1* | 8/2015 | Sankaran | B60L 11/182 |
| | | | 701/22 |
| 2016/0025821 A1 | 1/2016 | Widmer et al. | |
| 2016/0318413 A1 | 11/2016 | Roehrl et al. | |

\* cited by examiner

Frequency-division (FDM)

Time-division (TDM)

Code-division (TDM)

2300

| LUT address | | | Coordinate | | | 9D reference vector | 6D reference vector |
|---|---|---|---|---|---|---|---|
| $i$ | $j$ | $k$ | $x_i$ | $y_j$ | $z_k$ | $V'_0(r_{x,i}, r_{y,j}, r_{z,k})$ | $A'(r_{x',i}, r_{y',j}, r_{z',k})$ |

FIG. 23

METHOD AND APPARATUS FOR POSITIONING A VEHICLE

CROSS-REFERENCE TO RELATED APPLICATIONS

This application claims the benefit of U.S. Provisional Application No. 62/305,411, filed Mar. 8, 2016, and U.S. Provisional Application No. 62/343,736, filed May 31, 2016, both of which are hereby incorporated by reference under 37 CFR 1.57.

FIELD

This application is generally related to wireless charging power transfer applications, and specifically to a method and apparatus for positioning a vehicle. More specifically the present disclosure relates to determining a position of the vehicle relative to a ground-based charging unit based on magnetic vector fields (magnetic vectoring).

BACKGROUND

Efficiency in wireless inductive charging power applications depends at least in part on achieving at least a minimum alignment threshold between a wireless power transmitter and a wireless power receiver. One method for aiding such alignment is the use of magnetic vectoring, where a position of the wireless power receiver relative to the wireless power transmitter is determined based on sensing one or more attributes of a magnetic field generated at or near either the wireless power transmitter or the wireless power receiver. A position may include at least one of a distance, direction, and orientation of the wireless power receiver relative to the wireless power transmitter. However, determining a position accurately and with a minimum of ambiguity utilizing magnetic vectoring may involve a large number of calculation steps. Accordingly, a method and apparatus for positioning a vehicle as described herein are desirable.

SUMMARY

In some implementations, an apparatus for determining a position of vehicle is provided. The apparatus comprises a plurality of receive coils, each of the plurality of receive coils configured to generate a respective voltage signal from a wireless magnetic field generated by a field generator. The apparatus further comprise the processor. The processor is configured to reduce a first set of data indicative of the respective voltage signals generated by the plurality receive coils to a second set of data that is substantially constant regardless of relative rotation between the plurality of receive coils and the field generator. The processor is further configured to determine a plurality of candidate positions based on comparing the second set of data to a plurality of first sets of stored data mapped to stored positions of the vehicle relative to the field generator. The processor is further configured to identify a plurality of second sets of stored data using the determined plurality of candidate positions, wherein the plurality of second sets of stored data are mapped to stored positions and orientations of the vehicle relative to the field generator. The processor is further configured to determine a position and an orientation of the vehicle with respect to the field generator based on comparing the first set of data with the plurality of second sets of stored data.

In some other implementations, a method for determining a location of a vehicle relative to a reference point. The method comprises receiving, as an input, a first multi-dimensional vector having a first plurality of values indicative of respective electrical characteristics of a plurality of positioning coils, the electrical characteristics generated in response to a magnetic field generated by a field generator. The method further comprises generating a second multi-dimensional vector having a second plurality of values by performing a non-linear transformation on the first multi-dimensional vector, the total number of the second plurality of values being less than the total number of the first plurality of values. The method further comprises determining a plurality of candidate positions based on comparing the second multi-dimensional vector to a plurality of stored multi-dimensional vectors mapped with stored positions of the vehicle relative to the reference point. The method further comprises identifying a second set of stored multi-dimensional vectors corresponding to the determined plurality of candidate positions, each of the second set of stored multi-dimensional vectors mapped to a stored position and orientation of the vehicle relative to the reference point. The method further comprises determining a position and orientation based on comparing the first multi-dimensional vector with the second set of stored multi-dimensional vectors.

In some other implementations, an apparatus for determining a location of a vehicle relative to a reference point is provided. The apparatus comprises means for receiving, as an input, a first multi-dimensional vector having a first plurality of values indicative of respective electrical characteristics of a plurality of positioning coils, the electrical characteristics generated in response to a magnetic field generated by a field generator. The apparatus further comprises means for generating a second multi-dimensional vector having a second plurality of values by performing a non-linear transformation on the first multi-dimensional vector, the total number of the second plurality of values being less than the total number of the first plurality of values. The apparatus further comprises means for determining a plurality of candidate positions based on comparing the second multi-dimensional vector to a plurality of stored multi-dimensional vectors mapped with stored positions of the vehicle relative to the reference point. The apparatus further comprises means for identifying a second set of stored multi-dimensional vectors corresponding to the determined plurality of candidate positions, each of the second set of stored multi-dimensional vectors mapped to a stored position and orientation of the vehicle relative to the reference point. The apparatus further comprises means for determining a position and orientation based on comparing the first multi-dimensional vector with the second set of stored multi-dimensional vectors.

In some other implementations, a method for positioning a vehicle is provided. The method comprises generating, at a plurality of receive coils, respective voltage signals based upon a wireless magnetic field generated by a field generator. The method further comprises reducing a first set of data indicative of the respective voltage signals generated at the plurality receive coils to a second set of data that is substantially constant regardless of relative rotation between the plurality of receive coils and the field generator. The method further comprises determining a plurality of candidate positions based on comparing the second set of data to a plurality of first sets of stored data mapped to stored positions of the vehicle relative to the field generator. The method further comprises identifying a plurality of second sets of stored data using the determined plurality of candidate positions, wherein the plurality of second sets of stored data are mapped to stored positions and orientations of the vehicle relative to the field generator. The method further comprises determining a position and an orientation of the vehicle with respect to the field generator based on comparing the first set of data with the plurality of second sets of stored data.

BRIEF DESCRIPTION OF THE DRAWINGS

FIG. 23 illustrates an exemplary entry in a look up table (LUT) including position coordinates and associated 9D reference vector referring to a zero-rotated magnetic field sensor and associated 6D reference vector e.g. composed of scalar (dot) products of 3D reference vectors, in accordance with some implementations.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
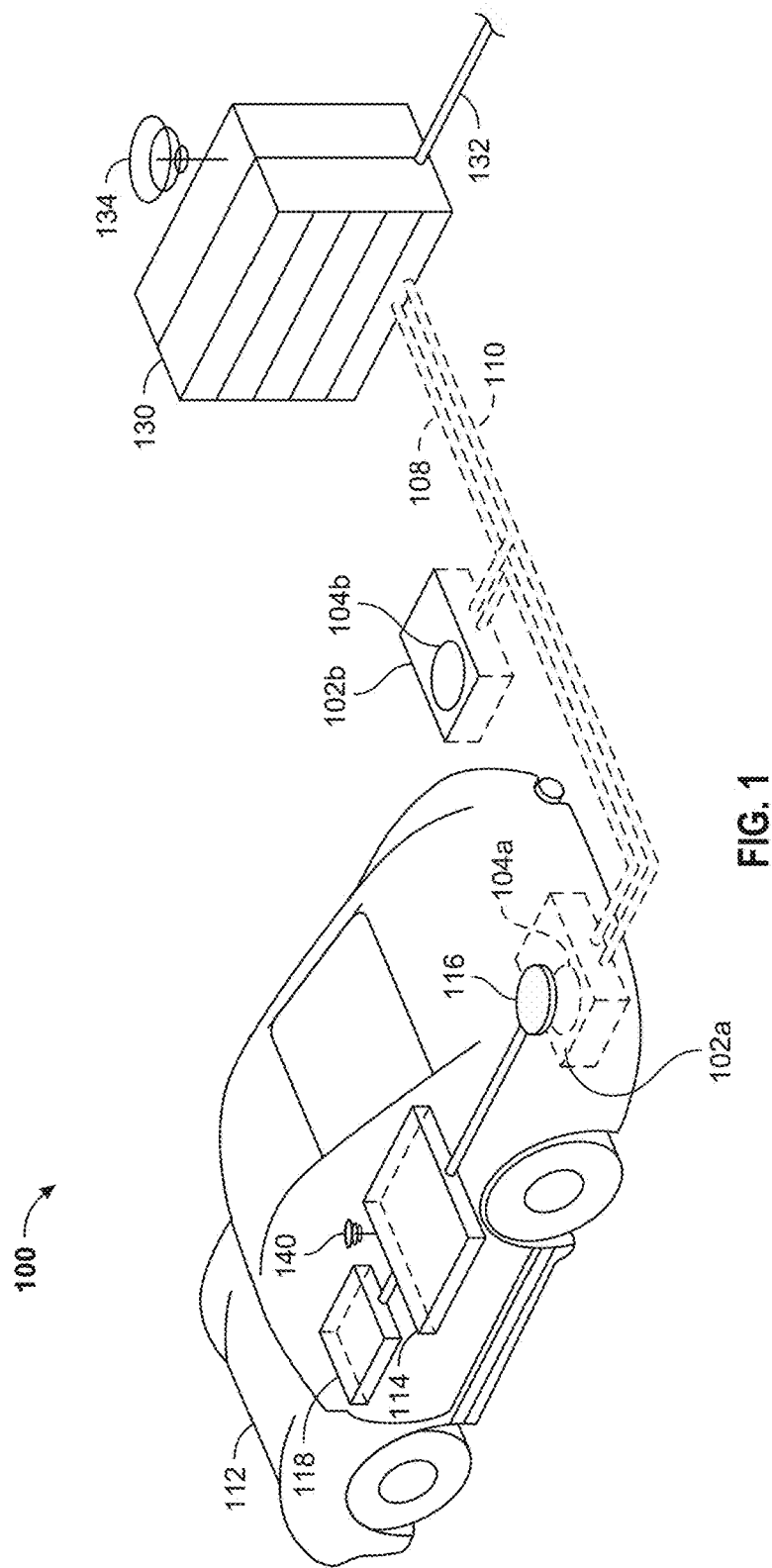
FIG. 1 illustrates a wireless power transfer system for charging an electric vehicle, in accordance with some implementations.

FIG. 1 is a diagram of an exemplary wireless power transfer system 100 for charging an electric vehicle 112, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\frac{1}{2}\pi$ of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
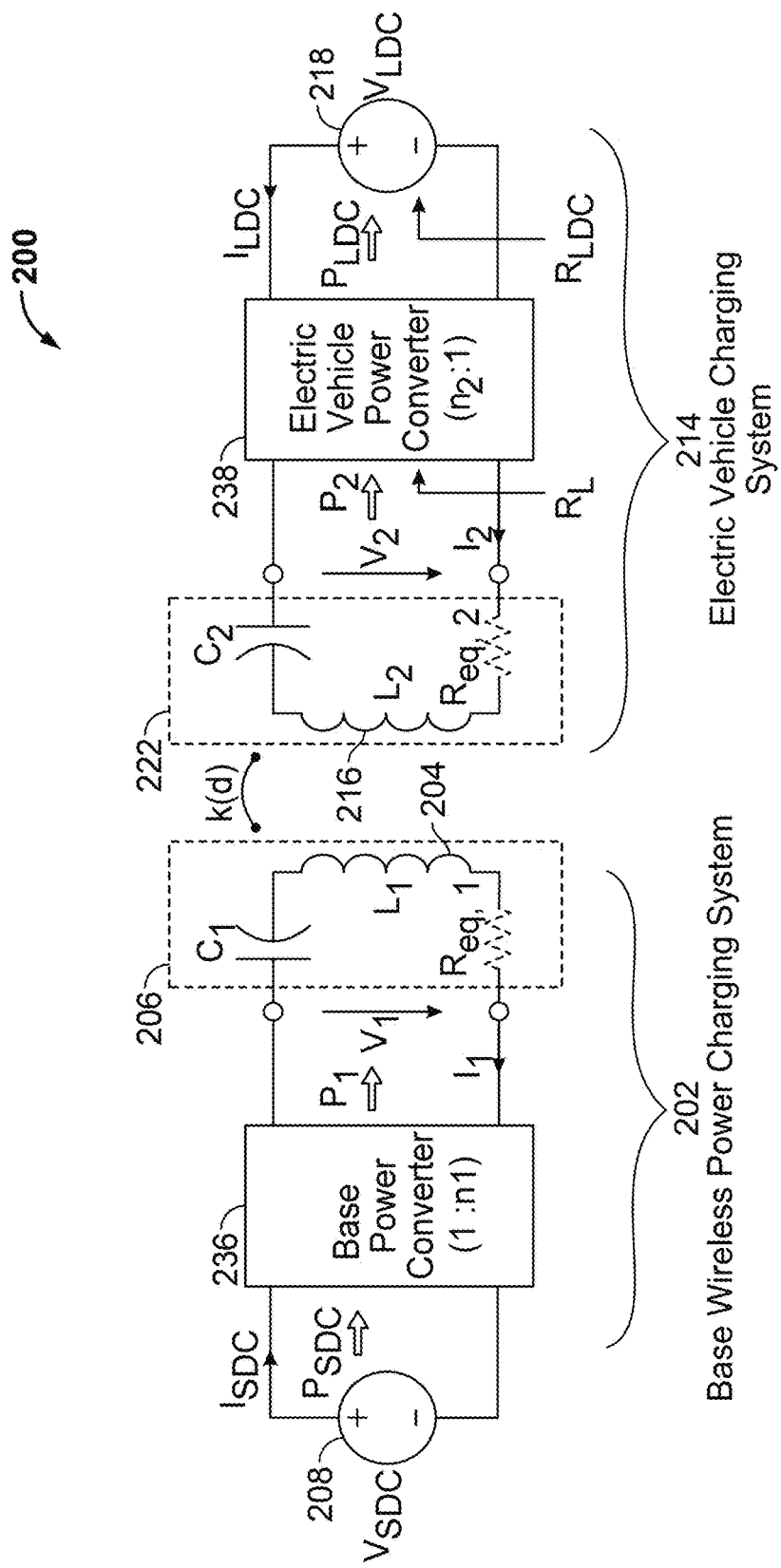
FIG. 2 is a schematic diagram of exemplary components of the wireless power transfer system of FIG. 1.

FIG. 2 is a schematic diagram of exemplary components of a wireless power transfer system 200 similar to that previously discussed in connection with FIG. 1, in accordance with some exemplary implementations. The wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238, if bidirectional, may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
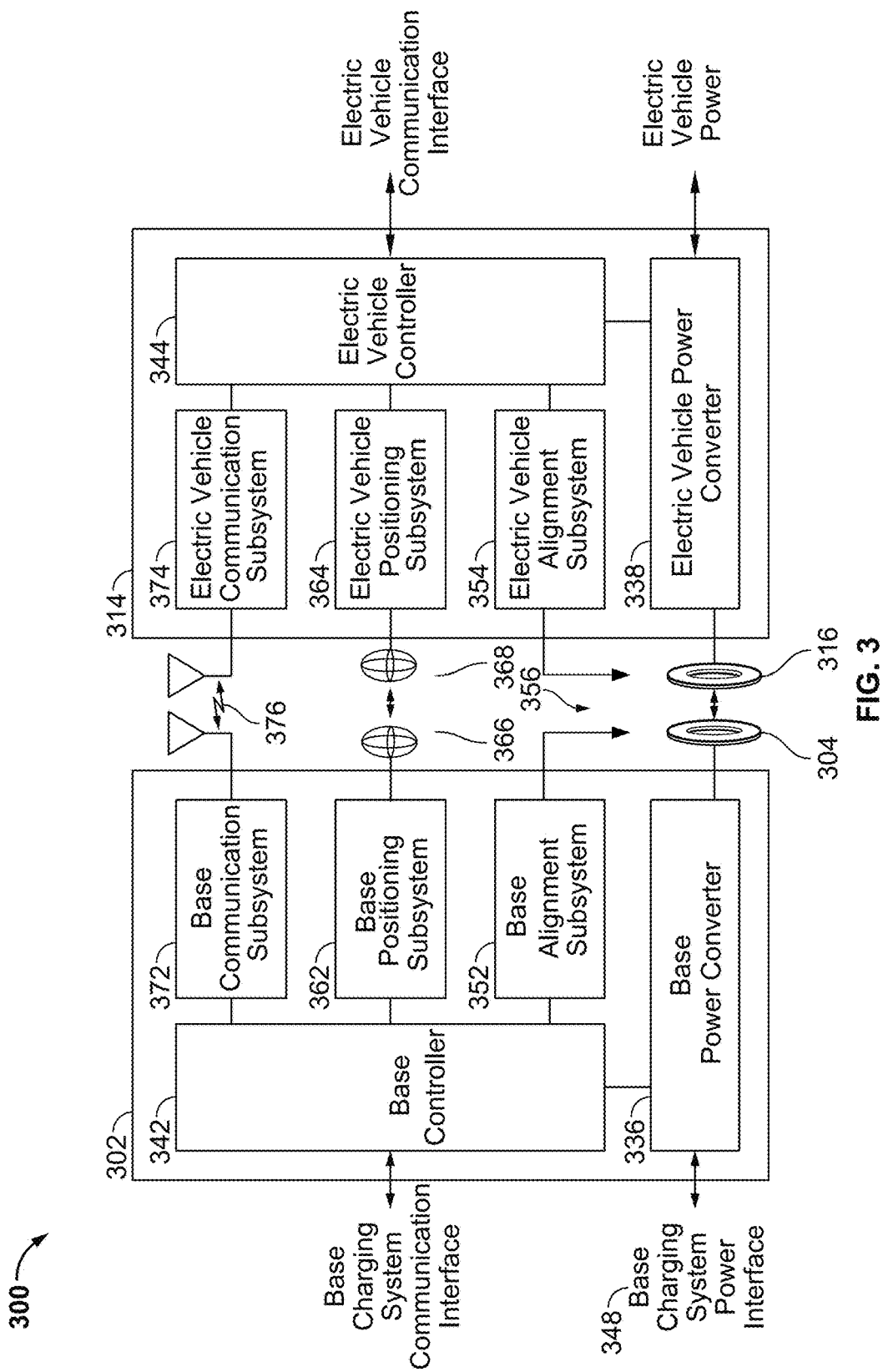
FIG. 3 is a functional block diagram showing exemplary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment subsystem 352 and the electric vehicle charging alignment subsystem 354, respectively. The positioning link 366 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base coupler 304 and the electric vehicle coupler 316, for example via autonomous mechanical (kinematic) alignment, by either the electric vehicle alignment subsystem 354 or the base alignment subsystem 352, or by both, or with operator assistance as described herein.

The electric vehicle charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field generator 368, as will be described in more detail in connection with FIGS. 4-34. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire). In some implementations, these estimates may be accurate in determining a position and angle of a vehicle over a distance of approximately 5 m. In some implementations, the estimates may be accurate over a distance of between 1 m and 8 m.

FIG. 3 and all following descriptions herein assume the electric vehicle positioning subsystem 364 in connection with the magnetic field generator 368 and the base positioning subsystem 362 with the magnetic field sensor 366. However, in some implementations, the magnetic field generator 368 may be part of the base wireless charging system 302 and the magnetic field sensor 368 part of the electric vehicle charging system 314.

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In some implementations, some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

Figure 4:
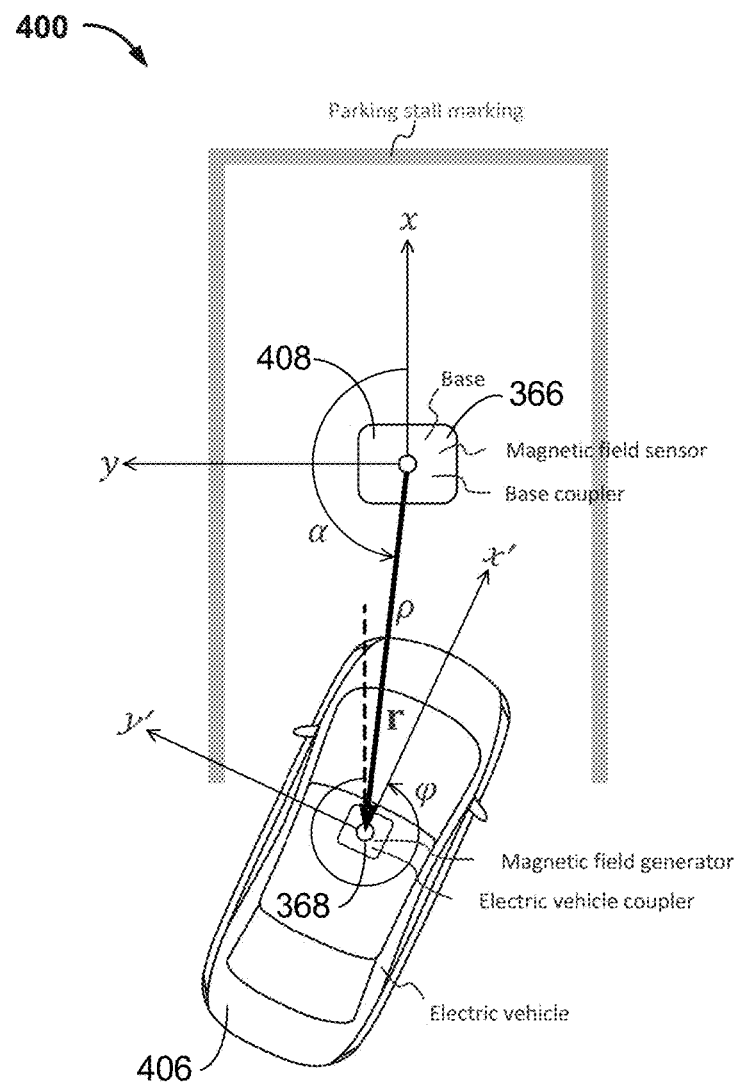
FIG. 4 is a diagram illustrating a positional relationship between the vehicle-based magnetic field generator and the ground-based magnetic field sensor of FIG. 3 in the sensor's (base) coordinate frame.

FIG. 4 is a diagram 400 illustrating an exemplary positional relationship between the vehicle-based magnetic field generator 368 and the ground-based magnetic field sensor 366 of FIG. 3 in the sensor's 366 coordinate frame. The sensor 366 may be associated with the perpendicular x- and y-coordinate axes of the sensor's 366 coordinate frame. The generator 368 may be associated with the perpendicular x'- and y'-coordinate axes of the generator's 368 coordinate frame. A position vector $\vec{r}=\overrightarrow{OP}$, having length ρ, is illustrated. O and P denote the magnetic center points of the magnetic field sensor 366 and the magnetic field generator 368, respectively. The rotation of the generator's 368 coordinate frame with respect to the sensor's 366 coordinate frame may be defined by the angle of rotation φ measured from the dashed line parallel to the x-axis. Using polar coordinates, the magnetic field generator's 368 position and rotation relative to the sensor 366 may be defined by the distance ρ (length of r), the azimuth angle α measured from the x-axis, and the angle of rotation φ, respectively. In some implementations, this positional relationship between the vehicle-based magnetic field generator 368 and the ground-based magnetic field sensor 366 in the sensor's 366 coordinate frame may correspond to the positional relationship of the vehicle (406) and the base (408) in the base's (408) coordinate frame.

Figure 5:
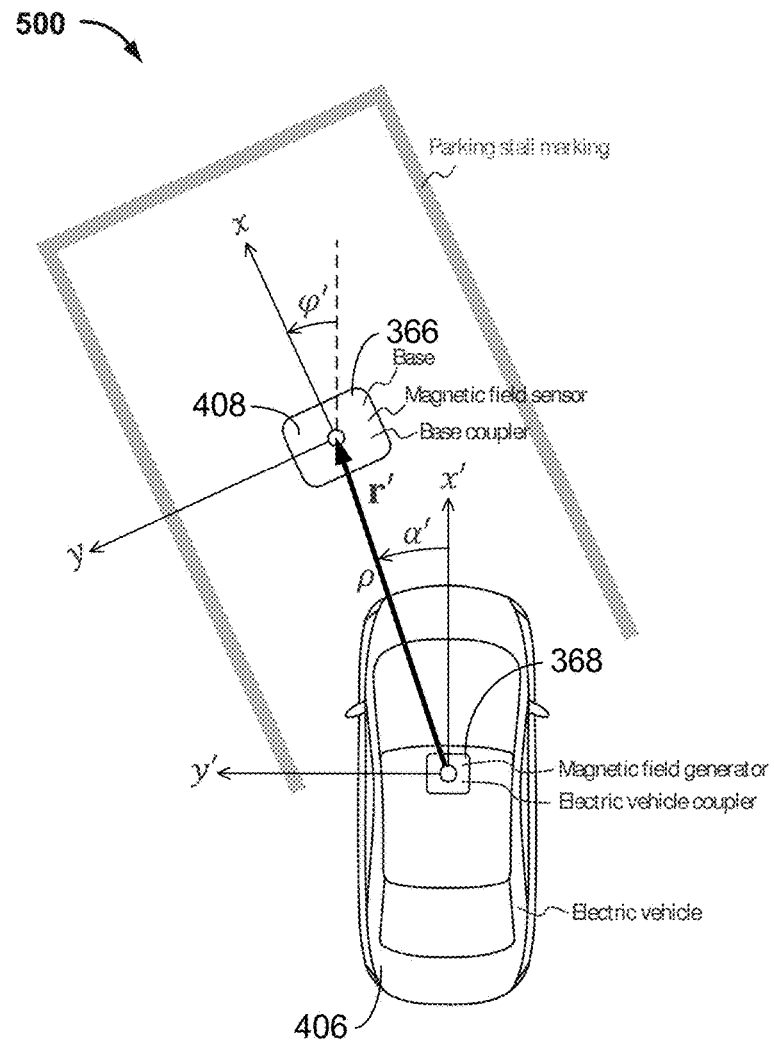
FIG. 5 is a diagram illustrating a positional relationship between the ground-based magnetic field sensor and the vehicle-based magnetic field generator of FIG. 3 in the generator's (vehicle) coordinate frame.

FIG. 5 is a diagram 500 illustrating an exemplary positional relationship between the ground-based magnetic field sensor 366 and the vehicle-based magnetic field generator 368 of FIG. 3 in the generator's 368 coordinate frame. The perpendicular x- and y-coordinate axes of the sensor's 366 coordinate frame, and the perpendicular x'- and y'-coordinate axes of the generator's 368 coordinate frame are shown. A position vector $\vec{r'}=\overrightarrow{O'P'}$, having length ρ, is illustrated, where O' and P' denote the magnetic center points of the magnetic field generator 368 and the magnetic field sensor 366, respectively. The rotation of the sensor's 366 coordinate frame with respect to the generator's 368 coordinate frame may be defined by the angle of azimuthal rotation φ' measured from the x'-axis. Using polar coordinates, the magnetic field sensor's 366 position and rotation may be defined by azimuth angle α' measured from the dashed line parallel to the x'-axis, the distance ρ (length of r'), and the angle of azimuthal rotation φ', respectively. In some implementations, this positional relationship between the ground-based magnetic field sensor 366 and the vehicle-based magnetic field generator 368 in the generator's 368 coordinate frame may correspond to the positional relationship of the base (408) and the vehicle (406) in the vehicle's (406) coordinate frame.

Figure 6:
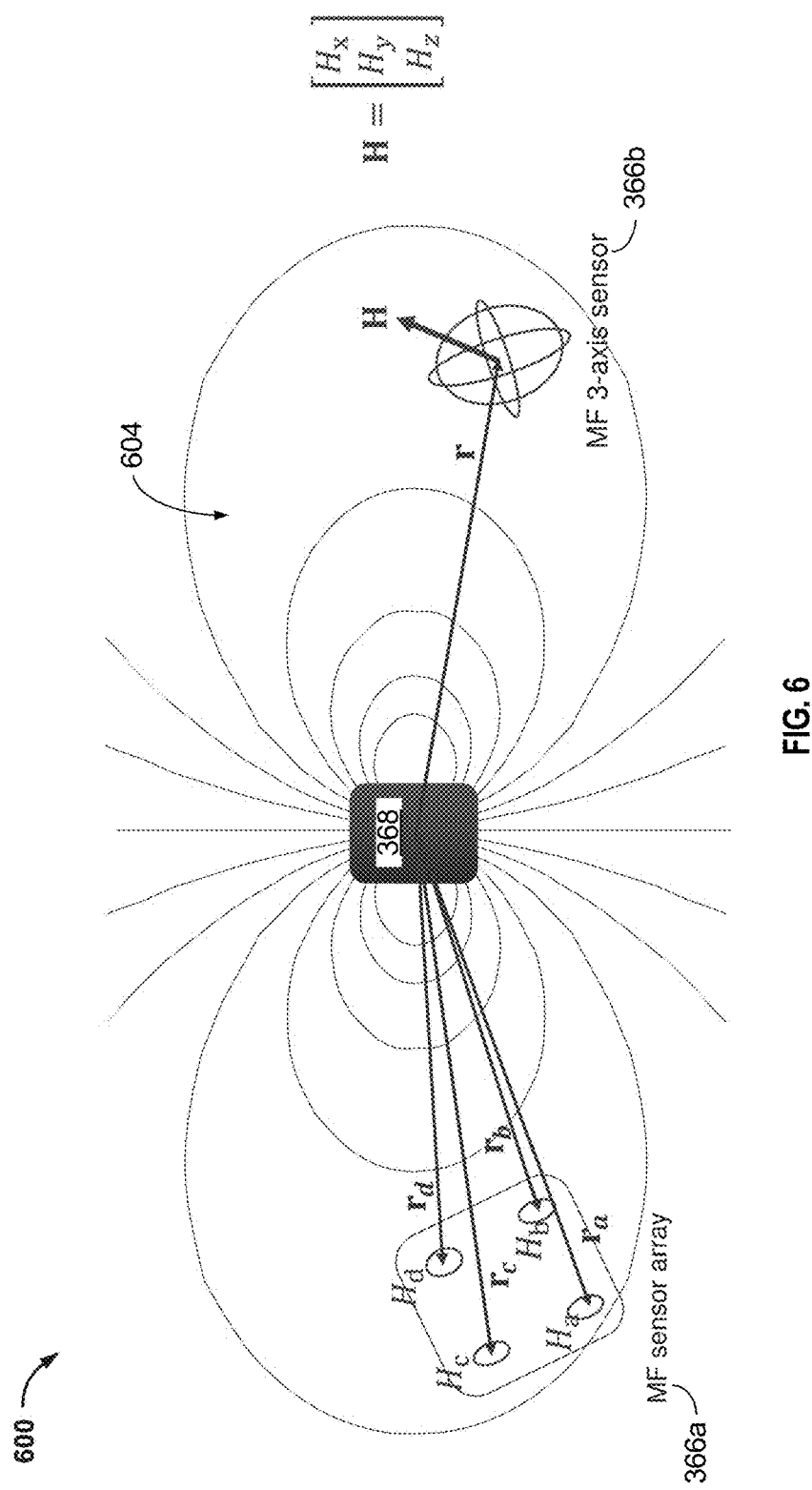
FIG. 6 is a diagram referring to FIG. 3 illustrating an arrangement between the magnetic field generator and two different types of magnetic field sensors as they may be configured and used for determining a position and orientation of the vehicle relative to the base, in accordance with some implementations.

FIG. 6 is a diagram 600 illustrating an arrangement between the magnetic field generator 368 and two different types 366a, 366b of the magnetic field sensor 366 of FIG. 3 configured to determine a position and orientation of a vehicle, in accordance with some implementations. The magnetic field generator 368 is configured to generate an alternating magnetic field 604. The differential magnetic field sensor 366a comprises an array of coplanar sense coils. The differential magnetic field sensor 366a may be used to determine a position based on sensing the differential levels $H_a$, $H_b$, $H_c$, $H_d$ of the magnetic field 604 at the location of each of the coplanar sense coils. By contrast, the 3-axis magnetic field sensor 366b comprises three sense coils disposed in mutually orthogonal planes. The 3-axis magnetic field sensor 366b may be used to determine a position based on sensing the magnitude and direction of the vector $H=[H_x, H_y, H_z]^T$ of the magnetic field 604 at the sensor's 366b location.

Figure 7:
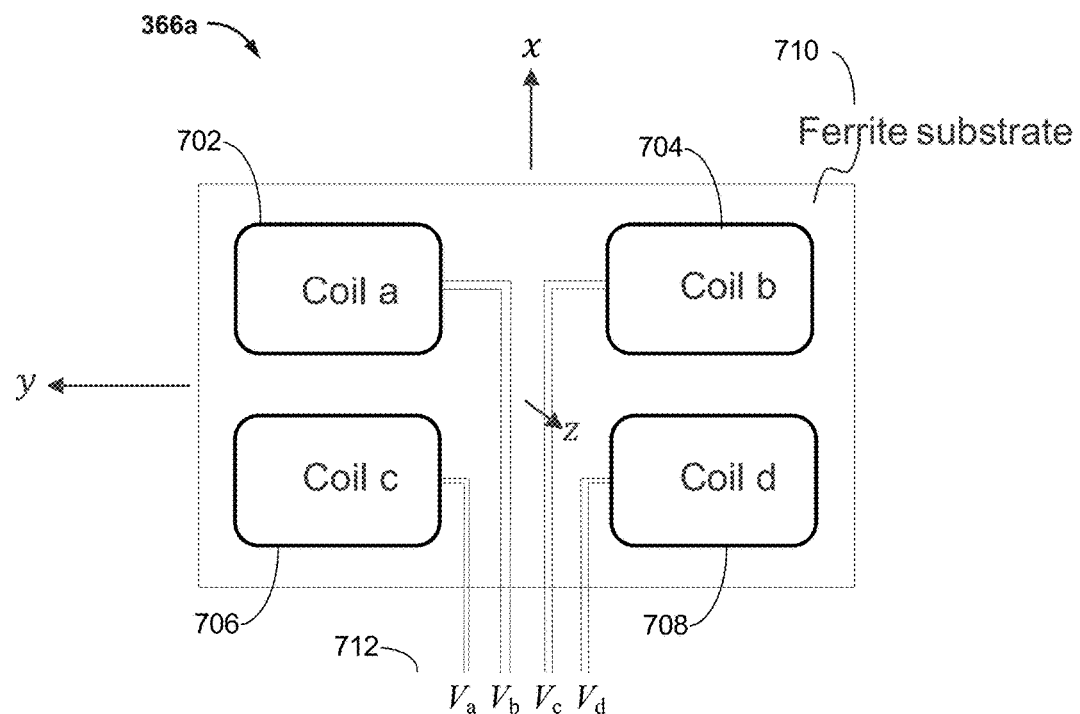
FIG. 7 is a diagram illustrating the coplanar-type multi-coil magnetic field sensor of FIG. 6.

FIG. 7 is a diagram illustrating a differential magnetic field sensor 366a of FIG. 6 based on a coplanar coil array in accordance with some implementations. The differential magnetic field sensor 366a may comprise four coplanar coils, e.g., coils 702, 704, 706, 708, each disposed on or near a ferrite structure 710. Each of the four coplanar coils 702, 704, 706, 708 may be configured to generate respective voltage signals $V_a$, $V_b$, $V_c$, $V_d$, corresponding to the magnetic field levels $H_a$, $H_b$, $H_c$, $H_d$ of the magnetic field 604 previously described in connection with FIG. 6. In some other implementations, a differential magnetic field sensor 366a comprises of a plurality of at least three coplanar coils.

Figure 8:
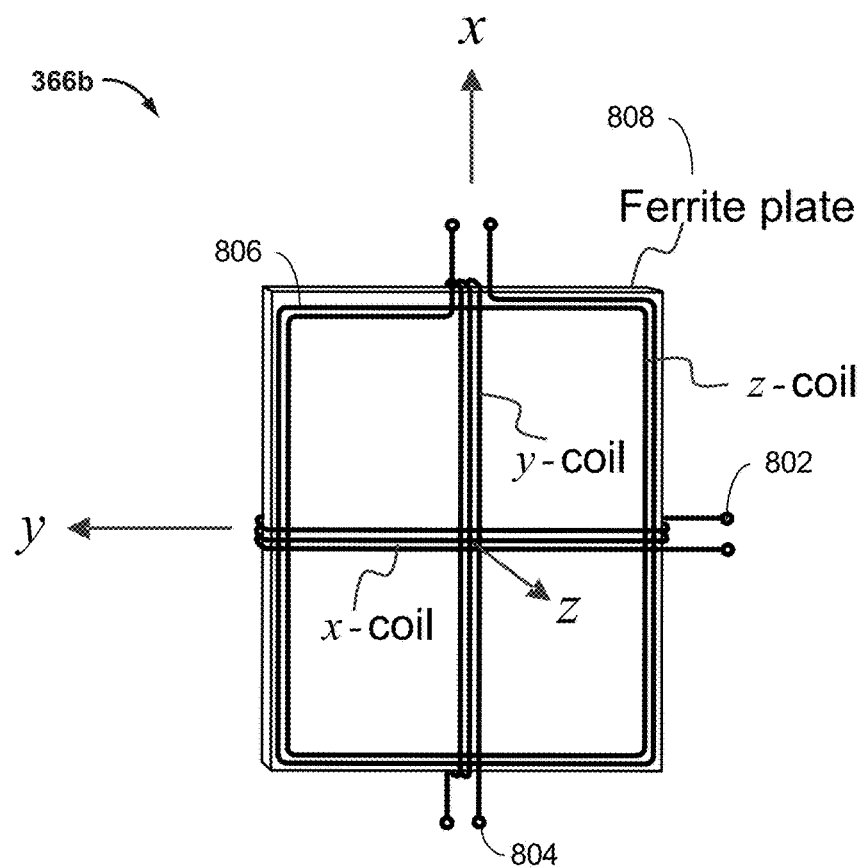
FIG. 8 is a diagram illustrating the orthogonal coil-type 3-axis magnetic field sensor of FIG. 6.

FIG. 8 is a diagram illustrating the 3-axis magnetic field sensor 366b of FIG. 6. The magnetic field sensor 366b may comprise a ferrite structure 808 and three sense coils 802, 804, 806, each wound on or around the ferrite structure 808 in mutually orthogonal planes. In some implementations, the sense coil 806 may be disposed along a perimeter of a largest surface of the ferrite structure 808. Alternatively, the sense coil 806 may be wound on the edges of the ferrite structure 808. Although FIG. 8 illustrates an example of the 3-axis magnetic field sensor 366a, the structure illustrated may equally apply to the 3D magnetic field generator 368. In addition, the present application further contemplates a 2-axis magnetic field generator and/or sensor, which may omit one of the three sense coils 802, 804, 806 (e.g., the sense coil 806). The orthogonal coil arrangement as shown in FIG. 8 may be also used to generate magnetic fields polarized in multiple axis if coils are actively driven with currents.

In some implementations, the ferrite structure 808 may be shared between the wireless power transfer base coupler 304 and the magnetic field sensor 366 as shown in FIG. 3. In some implementations, sharing the ferrite structure 808 between the wireless power transfer base coupler 304 and the magnetic field sensor 366 may enable a larger ferrite structure 808 to be used. The larger ferrite structure 808 may be able to capture more magnetic flux, which may in turn allow the base positioning subsystem 362 to provide a more accurate vehicle position or to operate over a larger range. In some other implementations, at least one of the sense coils 802, 804, 806 may also function as a coil for wireless power transmission. In some implementations, by reusing structures for multiple purposes, a reduced component count may be achieved, which may also reduce fabrication costs.

Figure 9:
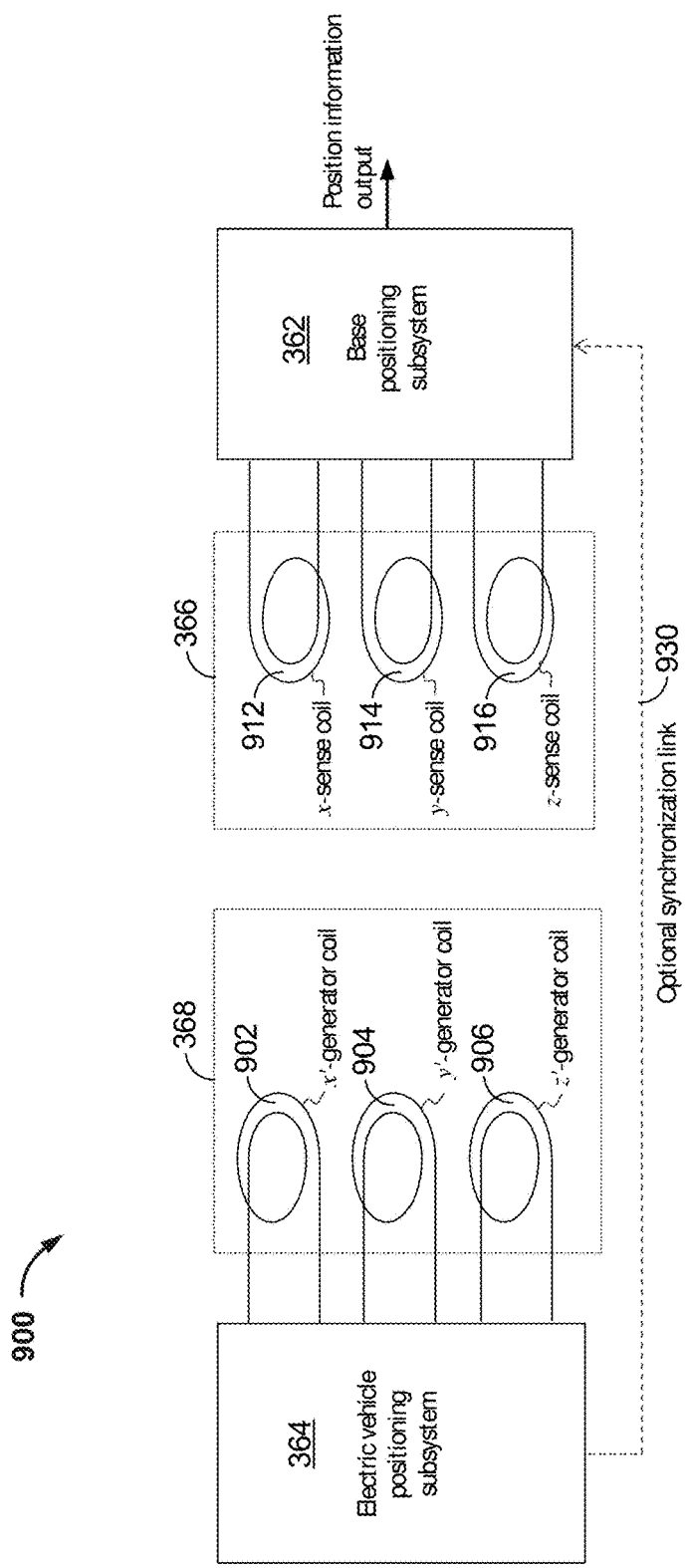
FIG. 9 is a block diagram illustrating a magnetic field based positioning system, in accordance with some implementations.

FIG. 9 is a block diagram illustrating a magnetic field based positioning system 900, in accordance with some implementations. The magnetic field based positioning system 900 includes the electric vehicle positioning subsystem 364 of FIG. 3. The electric vehicle positioning subsystem 364 is configured to drive each of a plurality of generator coils 902, 904, 906 of the magnetic field generator 368 with respective alternating currents. The generator coils 902, 904, 906 may have a physical orientation and construction corresponding to the coils 802, 804, 806 described in connection with FIG. 8 to generate magnetic fields with magnetic moments in a x'-, y'-, and z'-axis direction, respectively. The alternating currents generate an alternating magnetic field that may be used for position and orientation finding.

The magnetic field based positioning system 900 further includes the magnetic field sensor 366 of FIG. 3 that comprises a plurality of sense coils 912, 914, 916. The sense coils 912, 914, 916 may have a physical orientation and construction corresponding to the coils 802, 804, 806 described in connection with FIG. 8. The plurality of sense coils 912, 914, 916 are configured to generate voltage signals based on an amount of magnetic flux passing through their windings. The sense coils 912, 914, 916 may have a physical orientation and construction corresponding to the coils 802, 804, 806 described in connection with FIG. 8 to sense magnetic field components in a x-, y-, and z-axis direction, respectively. The base positioning subsystem 362 is configured to receive the voltage signals from the plurality of sense coils 912, 914, 916 and output information indicative of a position based thereon.

In some implementations, the magnetic field based positioning system 900 is configured to include an optional synchronization link 930 configured to establish time or phase synchronization between the electric vehicle positioning subsystem 364 and the base positioning subsystem 362.

In some implementations, the magnetic field based positioning system 900 may comprise a 2-axis generator and a 3-axis sensor. In such implementations, one of the plurality of generator coils 902, 904, 906 may be omitted or alternatively driven with zero current. Similarly, in some implementations, the magnetic field based positioning system 900 may comprise a 3-axis generator and a 2-axis sensor. In such implementations, one of the plurality of sense coils 912, 914, 916 may be omitted or alternatively electrically disconnected from the base positioning subsystem 362. In some implementations, the magnetic field based positioning system 900 may comprise a 2-axis generator and a 2-axis sensor.

Figure 10:
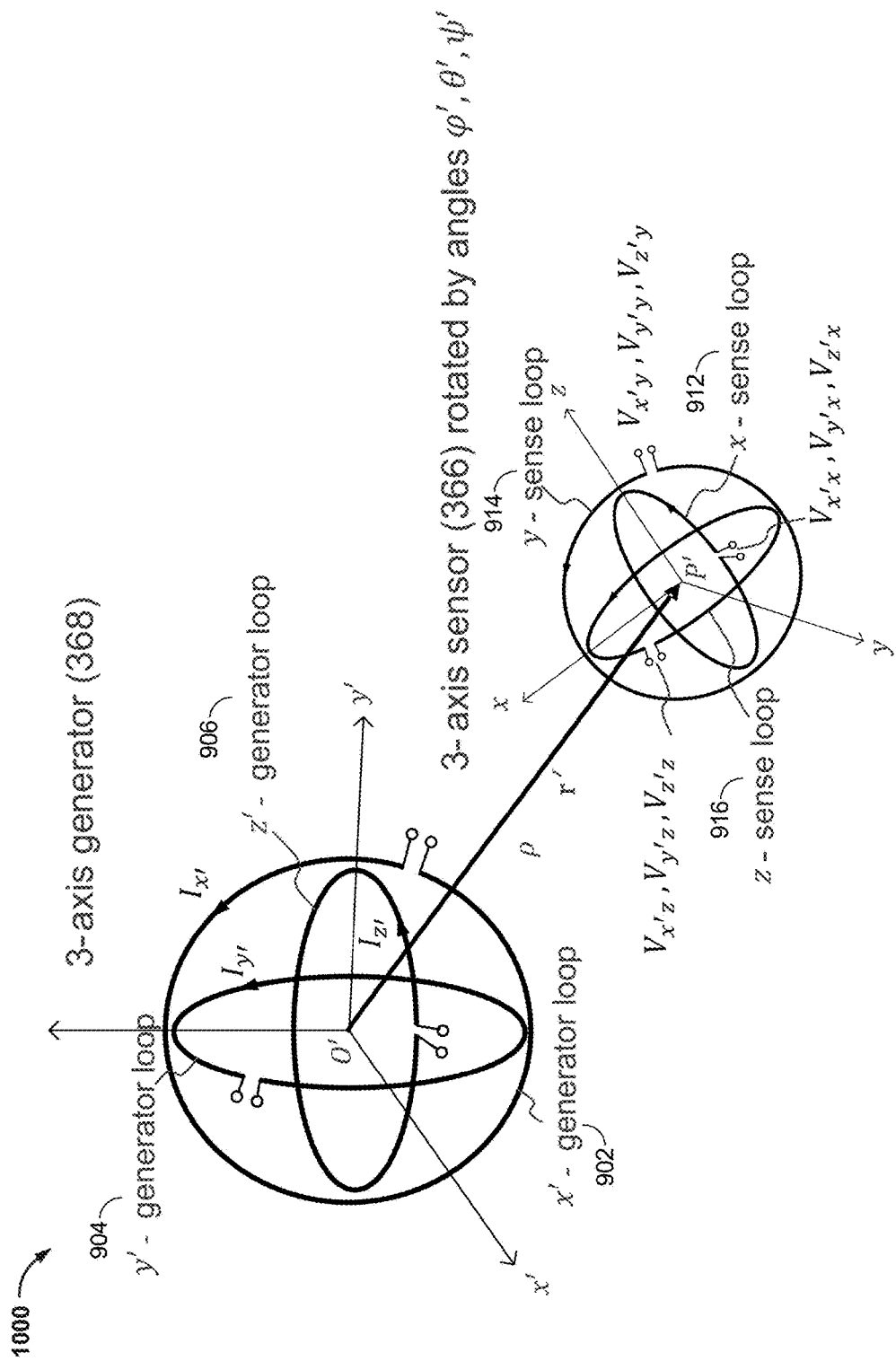
FIG. 10 is a diagram referring to FIG. 9 illustrating 3-axis orthogonal coil arrangements and flow of currents in coils of the 3-axis magnetic field generator and induced voltages in coils of the 3-axis magnetic field sensor, in accordance with some implementations.

FIG. 10 illustrates a multiple coil arrangement 1000 of a 3-axis generator/3-axis sensor magnetic field based positioning system 900. Coils are schematically shown as circular wire loops. The generator coils 902, 904, 906 may illustrate an arrangement of coils in mutually orthogonal planes. Likewise, the sense coils 912, 914, 916 may illustrate an arrangement of coils in mutually orthogonal planes. FIG. 10 shows flow of currents in coils 902, 904, 906 of the 3-axis magnetic field generator 368 of FIG. 9 and voltages at the terminals of the sense coils 912, 914, 916 of the 3-axis magnetic field sensor 366 of FIG. 9, in accordance with some implementations. The sensor 366 is illustrated as having three arbitrary orthogonal rotation angles $\varphi'$, $\theta'$, and $\psi'$ with respect to an orientation aligned to the generator 368. These angles may represent Euler angles as commonly used to describe a sequence of spatial rotations of a body in a reference coordinate frame. The angles $\varphi'$, $\theta'$, and $\psi'$ may refer to a sequence of rotations about the sensor's z-axis, y-axis, and x-axis, respectively. In some implementations, they may refer to an azimuthal (yaw) rotation angle, pitch rotation angel, and a roll rotation angle, respectively.

In some implementations, physical restrictions for the position of the sensor 366 with respect to the generator 368 may apply. For example, in an implementation in accordance with FIG. 5 with the magnetic field generator 368 aboard the vehicle 100 and the magnetic field sensor 366 in the base, the position and orientation of the sensor 366 is normally physically restricted to the lower half space and to a substantially horizontal orientation with respect to the generator's 368 coordinate frame, so that $$r_{z'} < 0, \quad (1)$$

$$\theta' \approx \psi' \approx 0 \quad (2)$$

holds.

In operation, the electric vehicle positioning subsystem drives 364 the generator coils 902, 904, 906 with respective coil currents $I_{x'}$, $I_{y'}$, $I_{z'}$, represented in vector form as:

$$I_{x'} = \begin{bmatrix} I_{x'} \\ 0 \\ 0 \end{bmatrix}, I_{y'} = \begin{bmatrix} 0 \\ I_{y'} \\ 0 \end{bmatrix}, I_{z'} = \begin{bmatrix} 0 \\ 0 \\ I_{z'} \end{bmatrix}. \quad (3)$$

Current vectors may be also combined to a 3×3 matrix:

$$[I'] = [I_{x'} \; I_{y'} \; I_{z'}] = \begin{bmatrix} I_{x'} & 0 & 0 \\ 0 & I_{y'} & 0 \\ 0 & 0 & I_{z'} \end{bmatrix}. \quad (4)$$

In some implementations, the electric vehicle positioning subsystem 364 drives the generator coils 902, 904, 906 each with equal current levels so that $$I_{x'} = I_{y'} = I_{z'} = I \quad (5)$$

holds. In some other implementations, the electric vehicle positioning subsystem 364 drives the generator coils 902, 904, 906 each with an alternating (sinusoidal) current with an amplitude so that $$\omega_x I_{x'} = \omega_y I_{y'} = \omega_z I_{z'}. \quad (6)$$

holds, where $\omega_{x'}$, $\omega_{y'}$, $\omega_{z'}$ denote the angular frequencies of the coil driving currents.

Alternating coil currents $I_{x'}$, $I_{y'}$, $I_{z'}$ circulating in the generator coils 902, 904, 906 generate an alternating magnetic field. Magnetic flux from this alternating magnetic field flows through each of the sense coils 912, 914, 916 and induces respective voltages across the terminals of the sense coils 912, 914, 916. These voltages are detected by the base positioning subsystem 362 operationally coupled to the sense coils as shown in FIG. 9. In some implementations, detected voltage components may refer to outputs of a phase synchronization circuitry 3002 as described in connection with FIG. 30. Voltage components as detected by the base positioning subsystem 362 may be expressed in vector form as:

$$V_{x'} = \begin{bmatrix} V_{x'x} \\ V_{x'y} \\ V_{x'z} \end{bmatrix}, V_{y'} = \begin{bmatrix} V_{y'x} \\ V_{y'y} \\ V_{y'z} \end{bmatrix}, V_{z'} = \begin{bmatrix} V_{z'x} \\ V_{z'y} \\ V_{z'z} \end{bmatrix}. \quad (7)$$

The values of the voltage vectors $V_{x'}$, $V_{y'}$, $V_{z'}$ may represent sampled voltage values output from detection and synchronization circuitry based on oscillating voltage signals at the sense coil terminals. These 3-dimensional vectors are referred to as 3D voltage vectors. Components of these voltage vectors are indicative of the voltages produced by the alternating magnetic field generated by each of the generator coils 902, 904, 906, respectively. Vector components $V_{x'x}$, $V_{y'x}$, $V_{z'x}$ are indicative of the voltage components induced into the x-sense coil 912 by the generator coils 902, 904, 906, respectively. Vector components $V_{x'x}$, $V_{y'x}$, $V_{z'x}$ are indicative of the voltage components induced into the y-sense coil 914 by the generator coils 902, 904, 906, respectively. Vector components $V_{x'z}$, $V_{y'z}$, $V_{z'z}$ are indicative of the voltage components induced into the z-sense coil 916 by the generator coils 902, 904, 906, respectively. As shown in FIG. 9, the sense coils 912, 914, 916 and generator coils 902, 904, 906 may be associated with (e.g., connected to) the base positioning subsystem 362 and electric vehicle positioning subsystem 364, respectively. In other implementations, the generator coils may be associated with the base positioning subsystem, and the sense coils associated with the electric vehicle positioning subsystem. In some implementations, position and orientation processing may be performed by the base positioning subsystem 362, while in other implementations, position and orientation processing may be performed by the electric vehicle positioning subsystem 364.

3D voltage vectors $V_{x'}$, $V_{y'}$, $V_{z'}$ may also be combined to form a 3×3 voltage matrix:

$$[V'] = \begin{bmatrix} V_{x'x} & V_{y'x} & V_{z'x} \\ V_{x'y} & V_{y'y} & V_{z'y} \\ V_{x'z} & V_{y'z} & V_{z'z} \end{bmatrix} = [V_{x'} \ V_{y'} \ V_{z'}]. \quad (8)$$

They may be also combined to form a 9-dimensional (9D) voltage vector:

$$V' = \begin{bmatrix} V_{x'x} \\ V_{x'y} \\ V_{x'z} \\ V_{y'x} \\ V_{y'y} \\ V_{y'z} \\ V_{z'x} \\ V_{z'y} \\ V_{z'z} \end{bmatrix}. \quad (9)$$

In some implementations, the base positioning subsystem 362 determines a position and orientation of the sensor 366 relative to the generator 368 based on the nine components of the 9D voltage vector.

For a sinusoidal current excitation of the generator coils 902, 904, 906, the magnetic field coupling relationship between the 3-axis generator 368 and the 3-axis sensor 366, indicated by the relationship between the three generator 368 coil currents $I_{x'}$, $I_{y'}$, $I_{z'}$ and the nine voltage components as detected by the base positioning subsystem 362 at the three terminals of the sensor 366, may be expressed in matrix form using definitions (4) and (8) as:

$$[V'] = j[\omega'][M'][I'], \quad (10)$$

with $j=\sqrt{-1}$ and [M'] denoting the 3×3 mutual inductance matrix defined as:

$$[M'] = \begin{bmatrix} M_{x'x} & M_{y'x} & M_{z'x} \\ M_{x'y} & M_{y'y} & M_{z'y} \\ M_{x'z} & M_{y'z} & M_{z'z} \end{bmatrix}. \quad (11)$$

and [ω'] denoting the 3×3 angular frequency matrix of the current excitation:

$$[\omega'] = \begin{bmatrix} \omega_{x'} & 0 & 0 \\ 0 & \omega_{y'} & 0 \\ 0 & 0 & \omega_{z'} \end{bmatrix}. \quad (12)$$

In some implementations using a sinusoidal current excitation of the generator coils 902, 904, 906, the base positioning subsystem 362 determines a position and orientation of the sensor 366 relative to the generator 368 based on the nine mutual inductances (elements) of the mutual inductance matrix (11). In such implementations, the electric vehicle positioning subsystem 364 may communicate excitation current levels $I_{x'}$, $I_{y'}$, $I_{z'}$ to the base positioning subsystem 362 via communications link 376, allowing the base positioning subsystem 362 to compute the mutual inductance matrix. If Equation (6) holds for the current excitation, elements of the voltage matrix of Equation (8) are proportional to elements of the mutual inductance matrix of Equation (11). Therefore, implementations relying on the mutual inductance matrix of Equation (11) may be equivalent to implementations relying on the voltage matrix of Equation (8).

The base positioning subsystem 362 may determine the absolute value of the dot product (i.e., the scalar product) of each unique combination of the 3D voltage vectors $V_{x'}$, $V_{y'}$, $V_{z'}$ that also form the 9D voltage vector V' to generate a 6-dimensional (6D) absolute scalar (dot) product vector A':

$$A' = \begin{bmatrix} |V_{x'} \cdot V_{x'}| \\ |V_{y'} \cdot V_{y'}| \\ |V_{z'} \cdot V_{z'}| \\ |V_{x'} \cdot V_{y'}| \\ |V_{x'} \cdot V_{z'}| \\ |V_{y'} \cdot V_{z'}| \end{bmatrix}. \quad (13)$$

The 3D voltage vectors $V_{x'}$, $V_{y'}$, $V_{z'}$ are dependent upon the orientation of the sensor 366 with respect to the generator 368. As such, the 9D voltage vector V', which comprises the components of each of the voltage vectors $V_{x'}$, $V_{y'}$, $V_{z'}$, is also dependent upon the orientation of the sensor 366 with respect to the generator 368. By contrast, since the components of A' are determined from the dot product of components of V', vector A' is orientation-independent, if the magnetic sensor 366 is isotropic. A 3-axis magnetic field sensor 366 may be considered isotropic if the magnitude of the 9D voltage vector (9) remains constant or substantially constant for a rotation of the magnetic field sensor 366 about any axis by any angle. In some implementations, a 3-axis magnetic field sensor 366 may be considered isotropic if the 9D voltage vector (9) remains constant for any (azimuthal) rotation by an angle φ' about its z-axis. If the magnetic field sensor 366 is substantially isotropic, the 6D absolute scalar product vector A' may be substantially invariant to rotation of the sensor 366 with respect to the generator 368 (e.g., the vector A' may be substantially constant regardless of relative rotation the sensor 366 with respect to the generator 368).

In some implementations, the sensor 366 may not constitute a physical arrangement of orthogonal sense coils. Instead, the sensor 366 may comprise a plurality of non-orthogonal sense coils, whereupon the base positioning subsystem 362 may perform an additional operation of orthogonalization, e.g., on the 3×3 voltage matrix (8), such that the 9D voltage vector V' becomes equivalent to the 9D voltage vector as obtained from a sensor 366 that constitutes a physical arrangement of orthogonal sense coils e.g. as shown by FIG. 8.

With this understanding, a positioning inquiry may be made as follows. Based on the nine detected voltage components $V_{x'x}, V_{x'y}, V_{x'z}, V_{y'x}, V_{y'y}, V_{y'z}, V_{z'x}, V_{z'y}, V_{z'z}$ indicative of voltages induced into sense coils 912, 914, 916, a position $r'=[r_{x'}, r_{y'}, r_{z'}]^T$ and rotation angles $\varphi'$, $\theta'$, $\psi'$ in the sensor's 366 coordinate frame (e.g., x', y' and z'-axes) can be determined. This is a 6-dimensional (6D) inquiry, since there are 6 unknowns: the 3 position coordinates $r_{x'}, r_{y'}, r_{z'}$ and the 3 rotation angles $\varphi'$, $\theta'$, $\psi'$.

In some implementations, by imposing a set of physical restrictions and assumptions, this 6D inquiry may be reduced to a 3D inquiry that may be resolved with less computation. For example, in some implementations, it may be assumed that the magnetic field sensor 366 is located in a lower half-space as defined by Equation (1). Further, in some implementations, the vertical distance $r_{z'}$ between the sensor and generator may be disregarded. Moreover, in some implementations it may be assumed that the generator and the sensor are both substantially horizontally oriented (e.g., there is no relative pitch or roll so that Equation (2) holds). Thus, under these assumptions, knowing the generator coil driving currents $I_x, I_y, I_z$, and the detected voltage components $V_{x'x}, V_{x'y}, V_{x'z}, V_{y'x}, V_{y'y}, V_{y'z}, V_{z'x}, V_{z'y}, V_{z'z}$ indicative of the sense coil induced voltages, a position $r'=[r_{x'}, r_{y'}]^T$ and a rotation angle $\varphi'$ in the vehicle's coordinate frame may be determined. This modified inquiry becomes a 3D inquiry by virtue of the elimination of the position vector $r_{z'}$ and the rotation angles $\theta'$ and $\psi'$.

In some implementations, multiplexing may be used in order to allow the base positioning subsystem 362 to differentiate between the contributions of each of the generator coils 902, 904, 906 to the voltages induced in each of the sense coils 912, 914, 916 of FIGS. 9 and 10.

Figure 11:
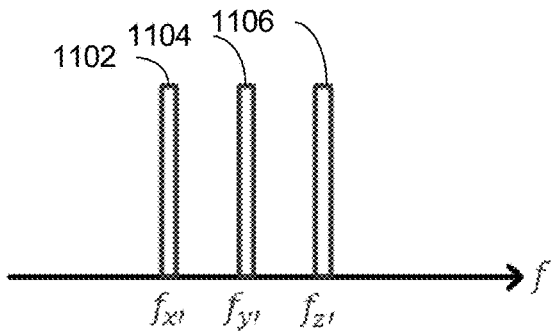
FIG. 11 illustrates a plurality of frequencies used in a magnetic field frequency-division multiplexing scheme, in accordance with some implementations.

FIG. 11 illustrates a multiplexing scheme where a plurality of frequencies 1102, 1104, 1106 are used in a magnetic field positioning frequency-division multiplexing (FDM) scheme, in accordance with some implementations. As shown in FIG. 11, in order to differentiate between the magnetic field components generated by each of the generator coils 902, 904, 906, the electric vehicle positioning subsystem 364 may concurrently drive each of the generator coils 902, 904, 906 with currents oscillating at respective frequencies $f_{x'}, f_{y'}, f_{z'}$. In some implementations, $f_{x'}, f_{y'}, f_{z'}$ may be equally spaced in frequency. In other implementations, $f_{x'}, f_{y'}, f_{z'}$ may not be equally spaced.

Figure 12:
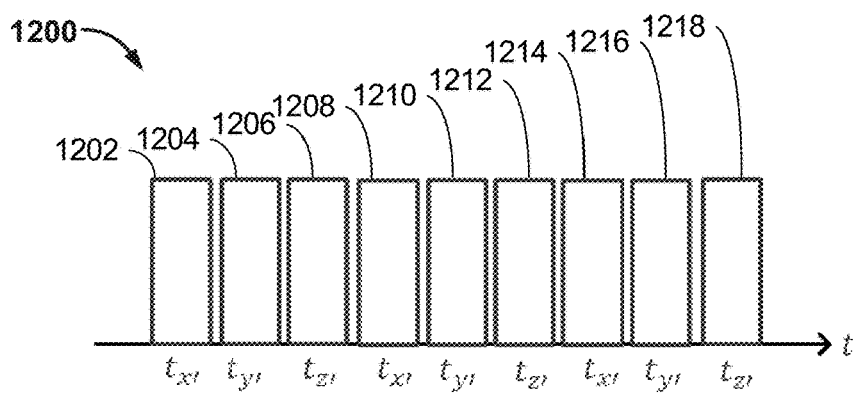
FIG. 12 illustrates a plurality of time slots used in a magnetic field time-division multiplexing scheme, in accordance with some implementations.

FIG. 12 illustrates a multiplexing scheme where a plurality of time slots are used in a magnetic field positioning time-division multiplexing (TDM) scheme, in accordance with some implementations. TDM may be utilized to generate magnetic field signals with magnetic moments in different axis directions. As opposed to FDM, the electric vehicle positioning subsystem 364 may drive each of the generator coils 902, 904, 906 sequentially, during respective time slots. For example, the generator coil 902 may be driven during time slots 1202, 1208, 1214, While the generator coil 904 is driven during time slots 1204, 1210, 1216, and the generator coil 906 is driven time slots 1206, 1212, 1218. A group of time slots (e.g., time slots 1202, 1204, 1206, respectively denoted as $t_{x'}, t_{y'}, t_{z'}$ for a 3-axis generator 368 of a repetition period may be called a frame. In some implementations, the frame duration may correspond to the position data update period of the magnetic field based positioning system, e.g., 200 ms corresponding to 5 position updates per second.

Figure 13:
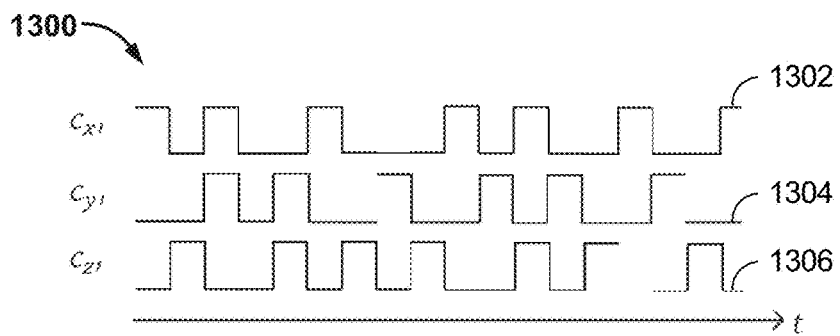
FIG. 13 illustrates a plurality of mutually orthogonal codes used in a magnetic field code-division multiplexing scheme, in accordance with some implementations.

FIG. 13 illustrates a multiplexing scheme where a plurality of mutually orthogonal binary code sequences 1302, 1304, 1306 denoted by $c_{x'}, c_{y'}, c_{z'}$, are used in a magnetic field positioning code-division multiplexing (CDM) scheme, in accordance with some implementations. Like FDM, when using CDM the electric vehicle positioning subsystem 364 may drive each of the generators coils 902, 904, 906 simultaneously. However, instead of having different frequencies, the electric vehicle positioning subsystem 364 may drive the generators coils 902, 904, 906 each with a modulated current signal $I_{x'}, I_{y'}, I_{z'}$. In some implementations of CDM, each of the modulated current signals may be a carrier waveform that is binary phase shift keyed (BPSK) by the respective mutually orthogonal binary code sequences 1302, 1304, 1306. The base positioning subsystem 362 may differentiate between the magnetic fields generated by each of the generator coils 902, 904, 906 by correlating voltage signals received via the sense coils 912, 914, 916 with local replicas of the binary code sequences 1302, 1304, 1306.

As previously described in connection with FIG. 9, the magnetic field based positioning system 900 may include the optional synchronization link 930 configured to provide absolute phase synchronization between the electric vehicle positioning subsystem 364 and the base positioning subsystem 362, such that the polarities of the detected 3D voltage vectors (e.g., $V_{x'}, V_{y'}, V_{z'}$) may be unambiguous. Such an optional synchronization link 930 may necessitate additional circuitry having an associated manufacturing cost. In some implementations, if the magnetic field based positioning system 900 omits such a synchronization link 930, the base positioning subsystem 362 may establish at least intrinsic relative phase synchronization on the voltage signals as received via sense coils 912, 914, 916.

Figure 14:
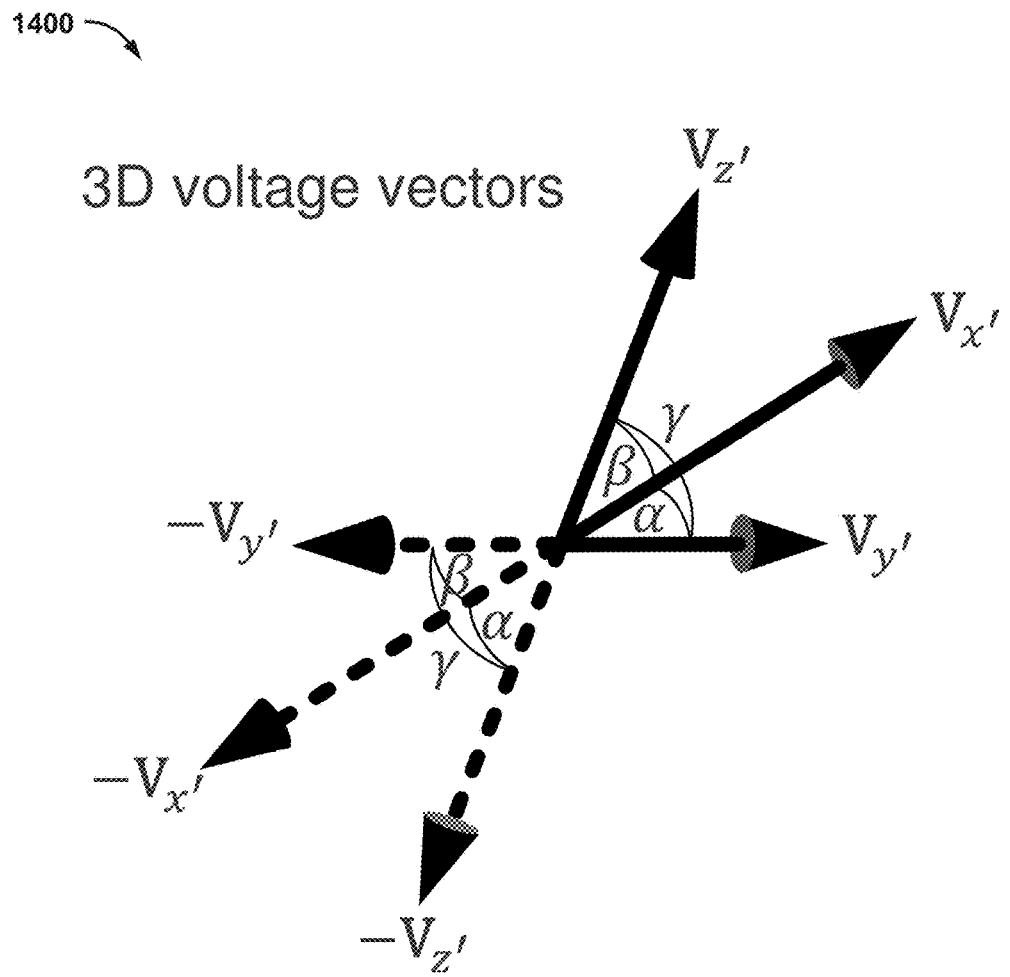
FIG. 14 is a diagram illustrating polarity ambiguity of 3-dimensional voltage vectors as they may be detected by the base positioning subsystem of FIG. 3 that is not in absolute phase synchronization with the magnetic fields as generated by the electric vehicle positioning subsystem of FIG. 3.

A potential consequence of a missing absolute phase synchronization is that the detected 3D voltage vectors $V_{x'}, V_{y'}, V_{z'}$ may be ambiguous with respect to their absolute polarity. FIG. 14 illustrates an exemplary vector triple $V_{x'}, V_{y'}, V_{z'}$ 1400 with absolute polarity ambiguity indicated by the dashed and non-dashed vector triple. Vector triple 1400 may refer to 3D voltage vectors $V_{x'}, V_{y'}, V_{z'}$ as detected in a base positioning subsystem 362 that is in relative phase synchronization with the magnetic fields as generated by the 3-axis magnetic field generator 368 driven by the electric vehicle positioning subsystem 364. Relying on relative phase synchronization only, the base positioning subsystem 362 may not be able to distinguish between the 3D voltage vector triple $V_{x'}, V_{y'}, V_{z'}$ and corresponding vector triple $-V_{x'}, -V_{y'}, -V_{z'}$ having opposite polarity.

Figure 15:
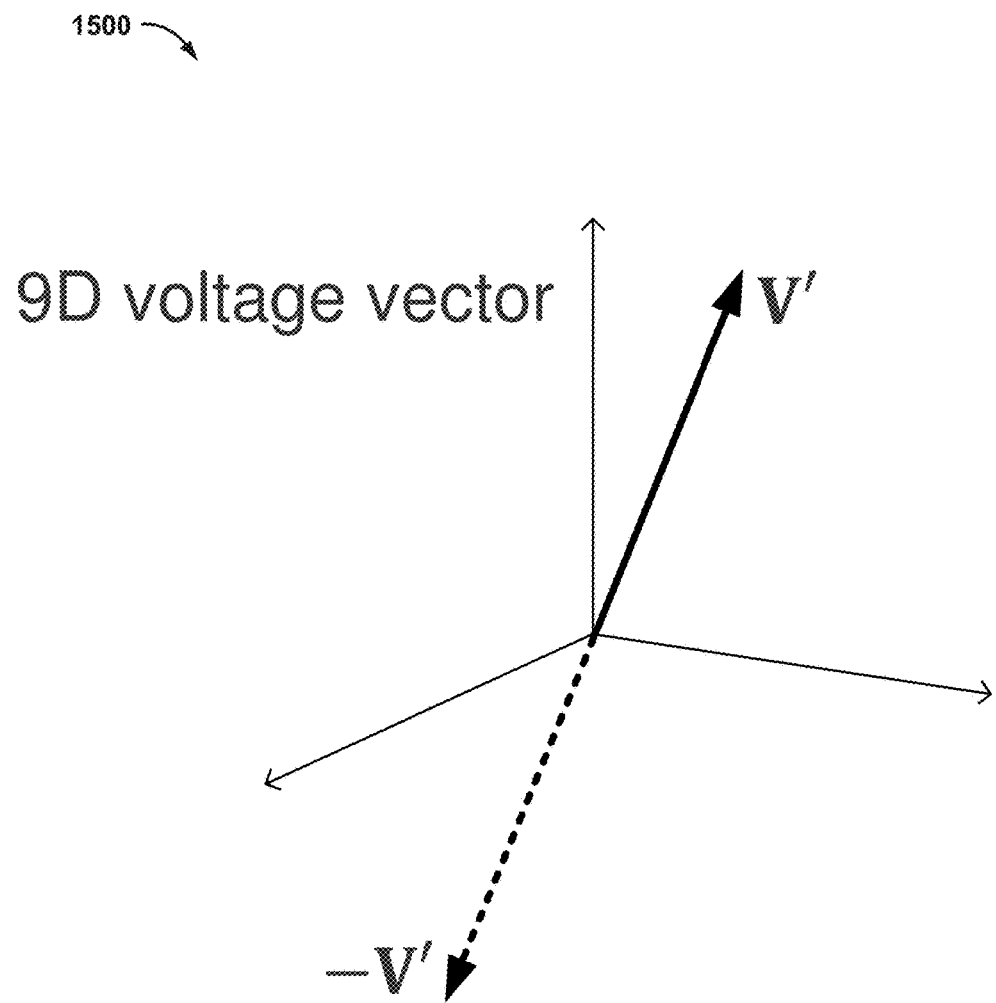
FIG. 15 is a diagram illustrating polarity ambiguity of a 9-dimensional voltage vector as it may be detected by a base positioning subsystem of FIG. 3 that is in relative phase synchronization but not in absolute phase synchronization with the magnetic fields as generated by the electric vehicle positioning subsystem of FIG. 3.

However, in some implementations, relative phase synchronization may ensure that individual vectors of vector triple $V_{x'}, V_{y'}, V_{z'}$ have no polarity ambiguity relative to each other, meaning that the angles α, β, γ between vectors $V_{x'}, V_{y'}, V_{z'}$ as indicated in FIG. 14 may be the same as in a system that employs absolute phase synchronization. As a consequence, relative polarities of the components of the 9D vector V' can also be unambiguous. However, there may be a remaining absolute polarity ambiguity on the entire 3D vector triple $V_{x'}, V_{y'}, V_{z'}$ as illustrated in FIG. 14. FIG. 15 illustrates another exemplary 9D vector V having absolute polarity ambiguity expressed by ±V' in the 9D voltage vector space 1500. As previously defined by Equation (13), the 6D absolute scalar product vector A' is invariant to any polarity ambiguity of the 3D voltage vectors $V_{x'}, V_{y'}, V_{z'}$.

Figure 16:
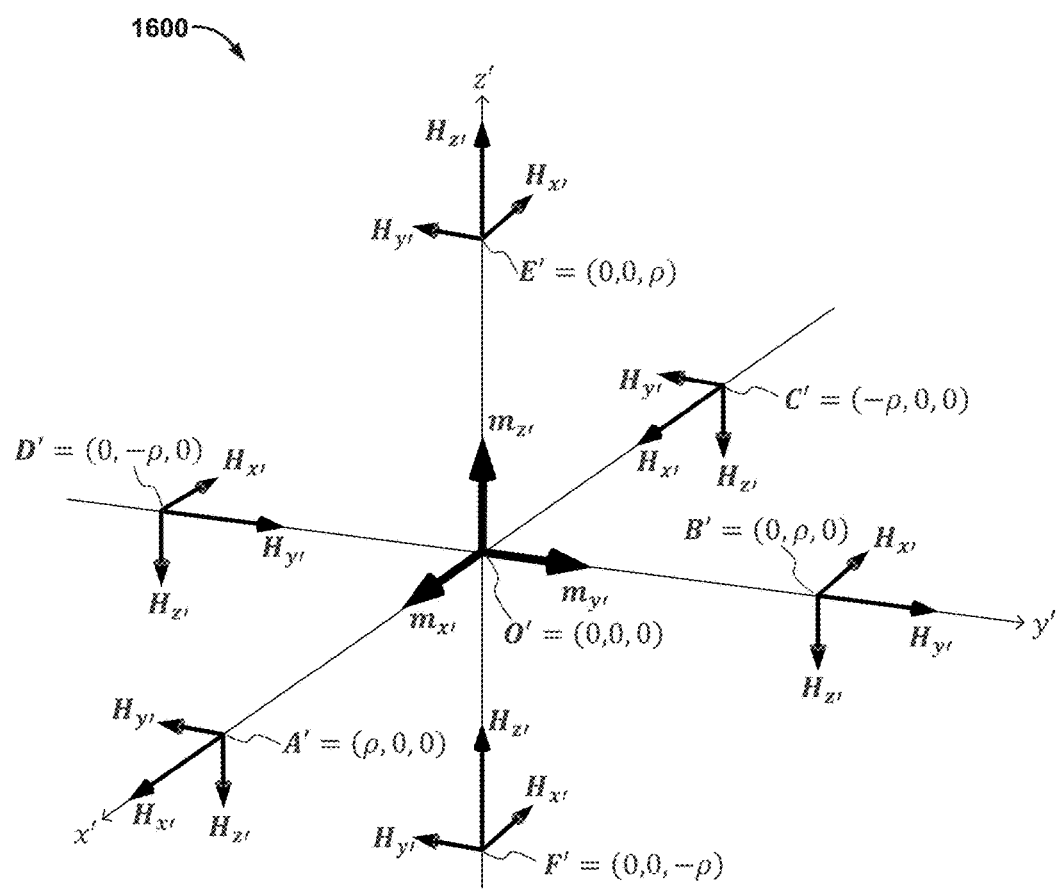
FIG. 16 is a diagram illustrating magnetic moments of a magnetic field generated by a 3-axis magnetic field generator and resulting magnetic field vectors at each of six different on-axis positions, in accordance with some implementations.

In some implementations, absolute polarity ambiguity may result in ambiguity of the position and/or orientation as determined by a magnetic field based positioning system 600. However, even in absence of absolute polarity ambiguity, magnetic field sensing may result in position and/or orientation ambiguity. The nature of position ambiguity, which is inherent to the structure of magnetic fields, is illustrated in more detail in connection with FIG. 16 for the simple example of a magnetic dipole field in free space. FIG. 16 is a vector diagram 1600 illustrating magnetic dipole moments $m_{x'}$, $m_{y'}$, $m_{z'}$ of a 3-axis magnetic field generator 368 and resulting magnetic field vector components $H_{x'}$, $H_{y'}$, $H_{z'}$ at each of six different on-axis positions A', B', C', D', E', F', in accordance with some implementations.

As illustrated in FIG. 16, the magnetic moment vectors $m_{x'}$, $m_{y'}$, $m_{z'}$ are shown at the origin of the generator coordinate frame O'=(0,0,0). The resulting magnetic field vector components $H_{x'}$, $H_{y'}$, $H_{z'}$ are shown at each of the six equidistant on-axis points A'=(ρ,0,0), B'=(0,ρ,0), C'=(-ρ,0,0), D'=(0,-ρ,0), E'=(0,0,ρ), F'=(0,0,-ρ). At each of these six on-axis points, the vector components comprise a component in a radial direction (e.g., $H_{x'}$ for point A') resulting from the on-axis moment. The vector components further comprise two other components (e.g., $H_{y'}$, $H_{z'}$ for point A') in directions tangential to the radial directions resulting from the two other magnetic moments pointing in perpendicular directions. It can be seen that in this example an ambiguous position always comprises two diametrically opposed (antipodal) positions, which may be denoted by position vectors $r'_1$ and $r'_2$, respectively, where $$r'_1 = r'_2. \quad (14)$$

holds.

A change in either the position or the orientation of the sensor 368 with respect to the generator 366 will result in a change in the 9D voltage vector V'. The nature of such variability is described in more detail in connection with FIGS. 17 and 18.

Figure 17:
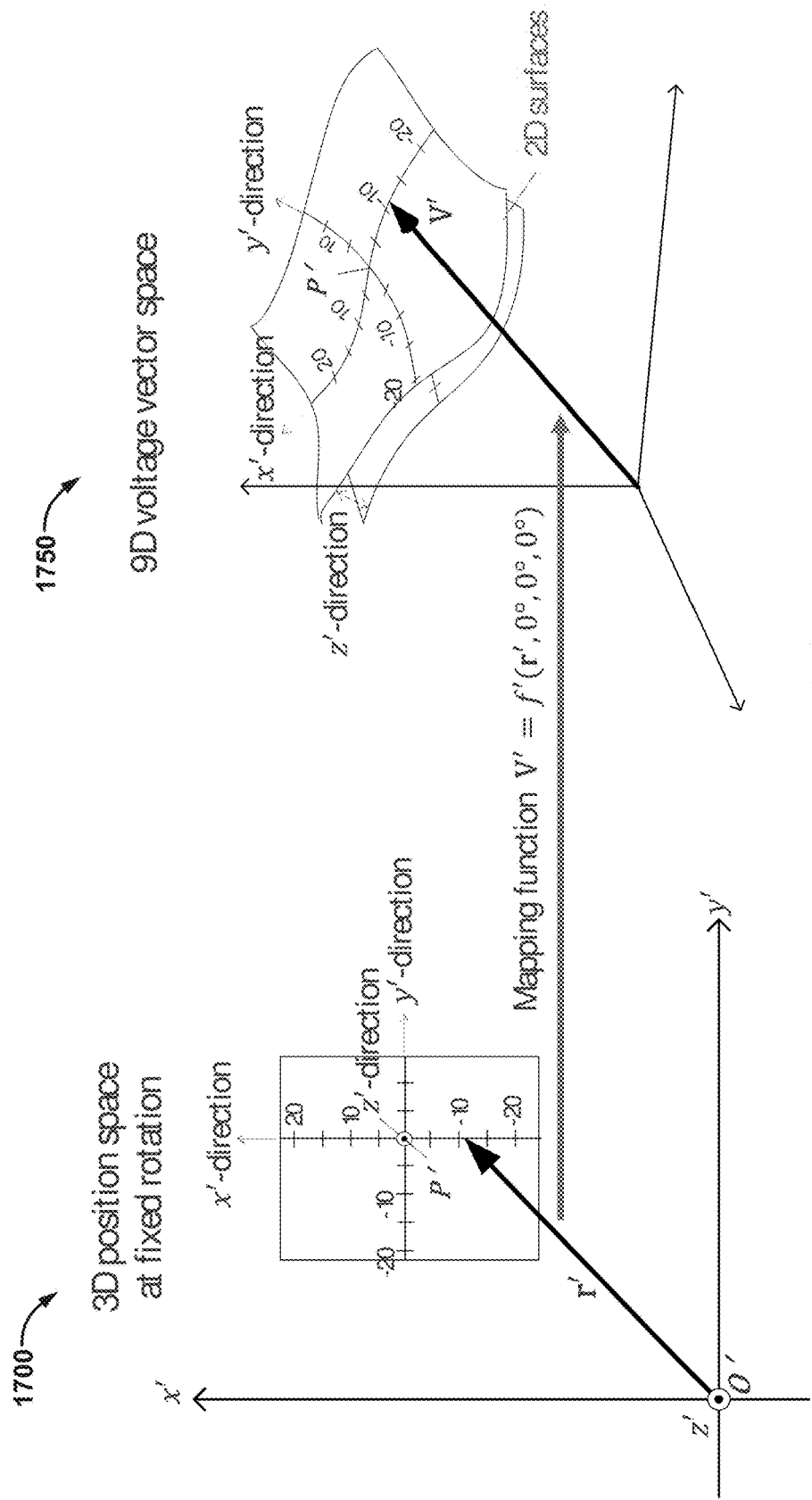
FIG. 17 is a diagram illustrating the effect of changes in a position of the magnetic field sensor in the 3D position space on the voltage vector in the 9D voltage vector space.

FIG. 17 illustrates the effect that changes in a position vector r' of the 3-axis magnetic field sensor 366 may have on the 9D voltage vector V'. FIG. 17 illustrates a position vector r' in a 3D position space 1700 referring to the magnetic field generator's 368 frame of reference (e.g., x'-, y'- and z'-axes) having origin O'. FIG. 17 also illustrates a 9D voltage vector V' in a 9D voltage vector space 1750 (though actually illustrated in only 3-dimensions). A change in the position of the magnetic field sensor 366 defined by position vector r' will result in a change in the 9D voltage vector V', which may be described by a mapping function as described below in connection with Equation (23). The three zero-arguments φ'=θ'=ψ'=0° for the rotation angles indicate that the sensor 366 while moving is maintained aligned (zero-rotation) with respect to the generator 368. For ease of visualization, corresponding arbitrary adjustment markings in each of the x'- and y'-axes directions are shown in each of the vector spaces 1700 and 1750. Points P' in the 3D position space 1700 and in the 9D voltage vector space 1750 may refer to an initial position of the sensor 366 before it has moved. Adjustment markings indicate an offset, e.g., in centimeters, from P' referring to the 3D position space 1700. FIG. 17 shows that the 9D voltage vector moves on curved 2D surfaces if the position vector is moved in a plane parallel to the x', y'-plane (constant z'). FIG. 17 also indicates that the 9D voltage vector would move on a different 2D surface if the position vector r' was moved in another plane parallel to the x', y'-plane at a different z'. The 2D surfaces in the 9D vector space as shown in FIG. 17 are only illustrative and do not represent the real geometry.

Figure 18:
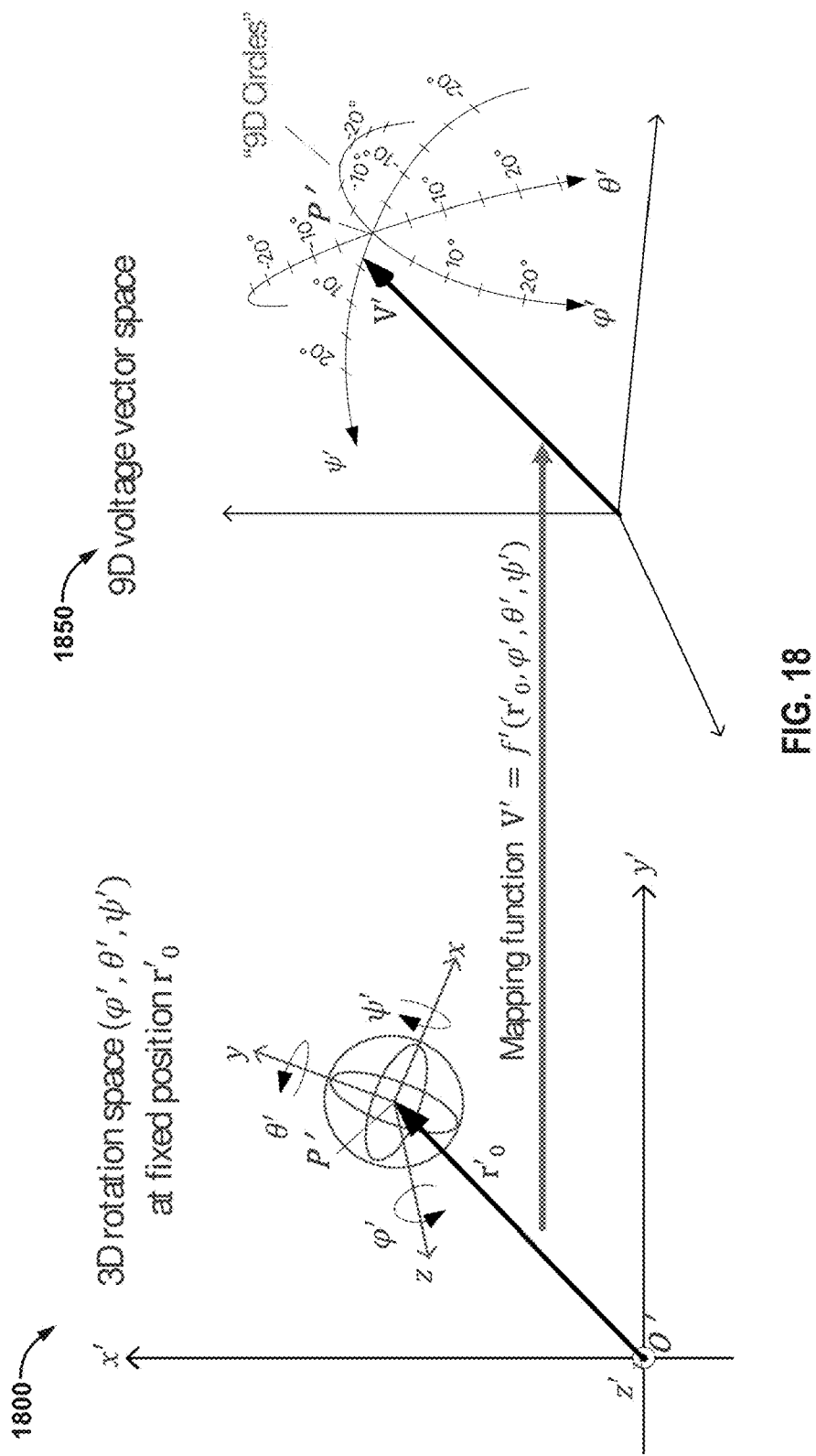
FIG. 18 is a diagram illustrating the effect changes in an orientation of the magnetic field sensor in the 3D orientation space have on the voltage vector in the 9D voltage vector space.

FIG. 18 illustrates the effect that changes in an orientation φ', θ', ψ' of the 3-axis magnetic field sensor 366 may have on the 9D voltage vector V'. FIG. 18 illustrates a sensor 366 with rotation angles φ', θ', ψ' in the 3D rotation space 1800 referring to the generator's 368 coordinate frame. The sensor 366 while rotating is assumed at a fixed position P' defined by position vector $r'_0$. FIG. 18 also illustrates a 9D voltage vector V' in a 9D voltage vector space 1850 (though actually illustrated in only 3-dimensions). A change in the orientation of the sensor 366 about any of the x-, y- and z-axes will result in a change in the 9D voltage vector V', which may be described by a mapping function V'=f'($r'_0$, φ', θ', ψ') as described below in connection with Equation (23). If the sensor 366 is isotropic as defined above, the tip of the 9D voltage vector V' moves on a circle in the 9D space 1850 as the sensor 366 rotates, e.g., about its z-axis by an arbitrary angle φ'. For ease of visualization, corresponding arbitrary adjustment markings are shown in the vector diagram 1850 to illustrate how rotation by the angles φ', θ', ψ' in each of the x-, y- and z-axes modifies the 9D vector V'. Markings on these 9D circles indicate the rotation angle of the sensor 366 in degrees relative to its initial orientation. Again, the circles in the 9D space 1850 as shown in FIG. 18 are only illustrative and do not represent the real geometry.

Figure 19:
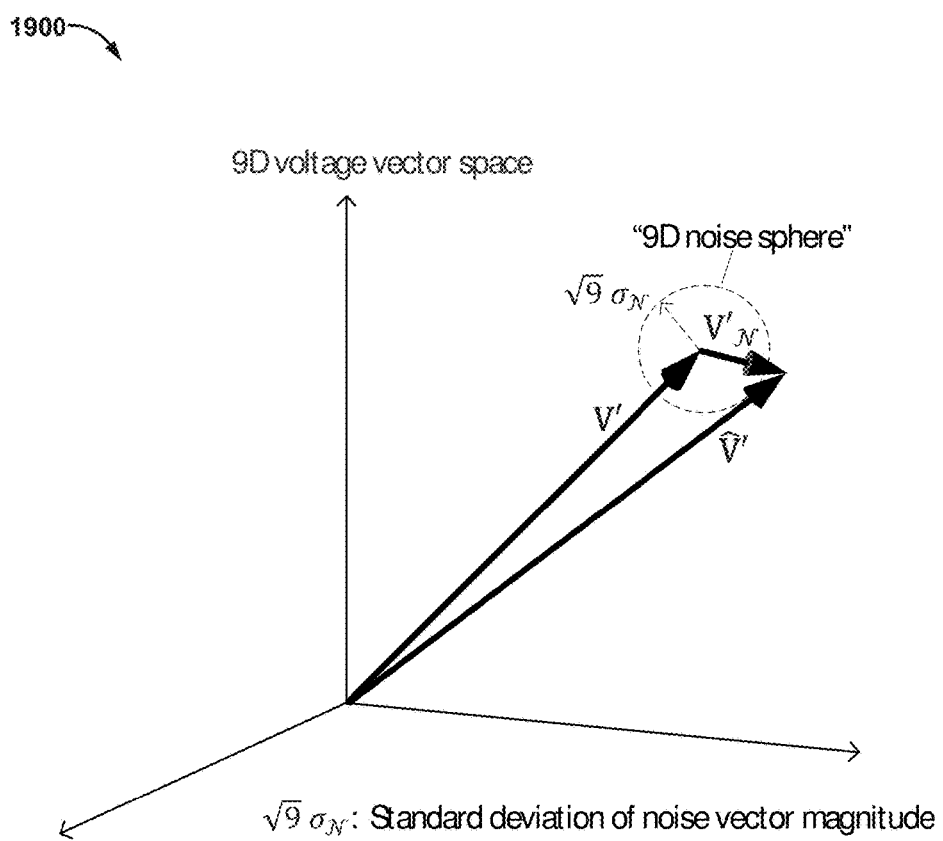
FIG. 19 is a diagram illustrating the effect of noise on a voltage vector in the 9D voltage vector space.

FIG. 19 illustrates the effect of noise on a 9D voltage vector in the 9D voltage vector space 1000. In some implementations, when in presence of noise, interference and/or distortion, the voltage vector V' as detected by the base positioning subsystem 362 operationally coupled to the sensor 366 may be perturbed. In some embodiments, a perturbation by an additive noise may be expressed as $$\hat{V}' = V' + \mathbf{V}'_{\mathcal{N}}, \quad (15)$$

where $\hat{V}'$ is the perturbed 9D voltage vector, V' is the unperturbed voltage vector, and $\mathbf{V}'_{\mathcal{N}}$ is the noise vector. The noise vector $\mathbf{V}'_{\mathcal{N}}$ may be considered a vector random variable and may be statistically described by a multi-dimensional (multivariate) probability distribution e.g. a multivariate Gaussian distribution. For example, FIG. 19 illustrates an example noise vector of a 9D hyperspherical probability distribution around the unperturbed voltage vector V'. A hyperspherical probability distribution results, if all nine components of the noise vector $\mathbf{V}'_{\mathcal{N}}$ have equal standard deviation $\sigma_{\mathcal{N}}$ so that the following equation holds:

$$\sigma_{\mathcal{N}} = \sigma_{\mathcal{N},1} = \sigma_{\mathcal{N},2} = \ldots = \sigma_{\mathcal{N},9}. \quad (16)$$

In this case, the 9D probability distribution may be considered hyperspherical with a radius $\sqrt{9}\sigma_{\mathcal{N}}$.

Since the base positioning subsystem 362 determines the 6D absolute scalar product vector A' as an absolute value of the dot product of components of the 9D vector V', if V' is perturbed, e.g., by additive noise $\mathbf{V}'_{\mathcal{N}}$, A' will generally be similarly perturbed by noise according to the equation:

$$\hat{A}' = A' + \mathbf{A}'_{\mathcal{N}}, \quad (17)$$

where $\hat{A}'$ is the perturbed 6D vector, A' is the unperturbed 6D vector, and $\mathbf{A}'_{\mathcal{N}}$ is the 6D noise vector.

The perturbed vectors $\hat{V}'$ and $\hat{A}'$ may also be known as detection vectors, since any voltages detected by the base positioning subsystem 362 would be subjected to at least minimal noise and/or interference from the ambient environment and/or from the base position subsystem itself.

In some implementations, an unperturbed zero-rotated 9D voltage vector $V'_0$ may be defined as the unperturbed 9D voltage vector V' that results when all rotation angles φ', θ', ψ' of the sensor 366 with respect to the generator 368 are zero. If the sensor 366 is isotropic as defined above, the unperturbed 9D voltage vector V'(φ', θ', ψ') as obtained with a sensor 366 having arbitrary rotation angles $\varphi'$, $\theta'$, $\psi'$ and the unperturbed zero-rotated 9D voltage vector $V'_0$ may be related by the following matrix equation:

$$[V'(\varphi',\theta',\psi')] = [R_{\psi'}][R_{\theta'}][R_{\varphi'}][V'_0], \quad (18)$$

where $[R_{\varphi'}]$, $[R_{\theta'}]$, and $[R_{\psi'}]$ denote rotation matrices defined as $$[R_{\varphi'}] = \begin{bmatrix} \cos\varphi' & \sin\varphi' & 0 \\ -\sin\varphi' & \cos\varphi' & 0 \\ 0 & 0 & 1 \end{bmatrix}, \quad (19)$$

$$[R_{\theta'}] = \begin{bmatrix} \cos\theta' & 0 & -\sin\theta' \\ 0 & 1 & 0 \\ \sin\theta' & 0 & \cos\theta' \end{bmatrix}, \quad (20)$$

$$[R_{\psi'}] = \begin{bmatrix} 1 & 0 & 0 \\ 0 & \cos\psi' & \sin\psi' \\ 0 & -\sin\psi' & \cos\psi' \end{bmatrix}. \quad (21)$$

In some implementations, the base positioning subsystem 362 may determine an estimate $\hat{V}'_0$ of the unperturbed zero-rotated 9D vector $V'_0$ from a perturbed 9D detection vector $\hat{V}'(\varphi', \theta', \psi')$ as obtained with a sensor 366 having arbitrary rotation angles $\varphi'$, $\theta'$, $\psi'$ by utilizing the inverse of matrix equation (18) as follows:

$$[\hat{V}'_0] = [R_{\varphi'}]^T [R_{\theta'}]^T [R_{\psi'}]^T [\hat{V}'(\varphi',\theta',\psi')], \quad (22)$$

where $[\bullet]^T$ denotes the transposed matrix of the respective rotation matrices defined by Equations (19)-(21). The matrix operation as defined by Equation (22) may herein be referred to as de-rotation and the matrix $[\hat{V}_0]$ as a rotational transform of matrix $[\hat{V}']$. This rotational transform of matrix $[\hat{V}']$ may be also denoted by $[\hat{V}'(-\varphi', -\theta', -\psi')]$.

Figure 20:
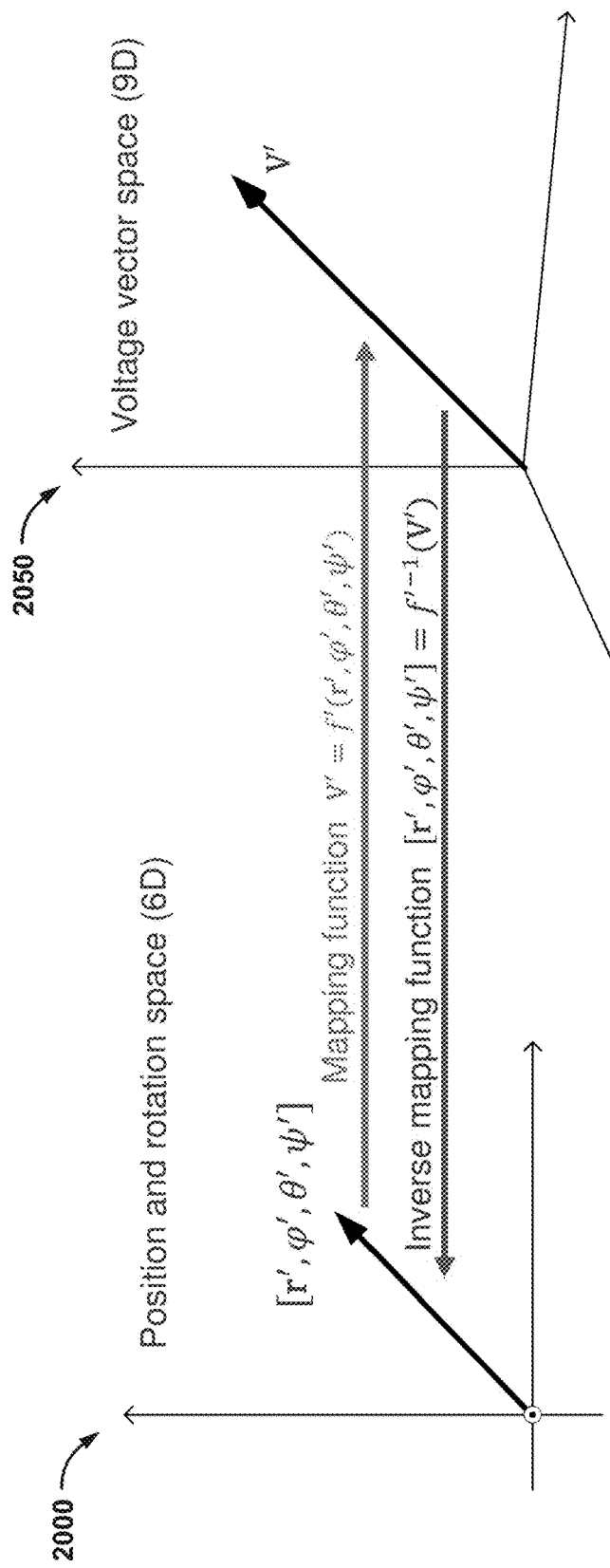
FIG. 20 is a diagram illustrating a mapping of a position vector in the 6D position and orientation space onto a voltage vector in the 9D voltage vector space and vice-versa.

FIG. 20 illustrates mapping of a 6D position and orientation vector $[r', \varphi', \theta', \psi']$ in comprised of three position coordinates $r_x, r_y, r_z$ and three rotation angles $\varphi', \theta', \psi'$ in the 6D position and orientation vector space 2000 onto a 9D voltage vector $V'$ in the 9D voltage vector space 2050. In mathematical terms, this mapping of a sensor's 366 position and orientation onto a voltage vector may be described by a mapping function $$V' = f'(r',\varphi',\theta',\psi'). \quad (23)$$

Similarly, FIG. 20 also illustrates the inverse mapping of a 9D voltage vector $V'$ in the 9D voltage vector space 2050 onto a 6D position and orientation vector $[r', \varphi', \theta', \psi']$ in the 6D position and orientation vector space 2000. In mathematical terms, this mapping of a 9D voltage vector onto a 6D position and orientation vector may be described by an inverse mapping function $$[r',\varphi',\theta',\psi'] = f'^{-1}(V'). \quad (24)$$

In some implementations, determining a valid unambiguous position may rely on the mapping function $f'(\bullet)$ having a one-to-one relationship (i.e., an injective relationship). In other words, each 6D position and orientation vector $[r', \varphi', \theta', \psi']$ maps to a single 9D voltage vector $V'$ and, reciprocally, each 9D voltage vector $V'$ maps to a single 6D position and orientation vector $[r', \varphi', \theta', \psi']$. For the 3-axis generator/3-axis sensor system of FIG. 9 operating under the previously defined physical restrictions (Equations (1) and (2)), the mapping functions $f'(\bullet)$ and $f'^{-1}$ may be injective, even if the 9D vector $V'$ is subject to absolute polarity ambiguity. On the other hand, these mapping functions may become non-injective in implementations utilizing less than 3-axes in either the generator 368 or the sensor 366 and having absolute polarity ambiguity. This may result in position and/or orientation ambiguity that the vehicle guidance and alignment system has to cope with.

Moreover, in some implementations, determining an accurate position and orientation may rely on the mapping function $f'(\bullet)$ and/or its inverse $f'^{-1}$ being valid for a particular parking space and stable over time.

In some implementations, the mapping function $f'$ and/or its inverse $f'^{-1}$ or portions thereof may be described by a mathematical (analytic) multidimensional function, e.g., based on magnetic monopole or dipole functions, polynomial functions, exponential functions, trigonometric functions, hypergeometric functions, Gaussian functions, etc.

In some other implementations, the mapping function $f'$ and/or its inverse $f'^{-1}$ or portions thereof may be defined by a table function also referred to as a look-up table (LUT), an example of which is illustrated in FIG. 23. A LUT may be described as an array of numbers associating discrete input value strings to discrete output value strings. For example, if applied to the inverse function $f'^{-1}$, each input value string may refer to a voltage vector $V'$ and each associated output value string may refer to a corresponding position and orientation vector $[r', \varphi', \theta', \psi']$.

In some implementations, an output value string of the mapping function $f'$ and the input value string of the inverse mapping function $f'^{-1}$ may be also referred to as a reference vector $V'$ regardless whether $f'$ and/or its inverse $f'^{-1}$ is implemented as an analytic or tabulated function (LUT).

In some implementations, each combination of position $r'$ and rotation angles $\varphi'$, $\theta'$, $\psi'$ associated to a reference vector $V'$ may correspond to a grid point in a limited position and orientation space 2000 as further described below. If the inverse mapping function is based on a LUT, the grid point spacing and the resulting number of reference vectors $V'$ may represent a trade-off between positioning accuracy and LUT size. If based on an analytic function, the grid point spacing and the resulting number of reference vectors $V'$ may relate to the numeric precision of the processor 3004 as described in connection with FIG. 30. If the processor 3004 is an analogue circuitry, the grid point spacing may be zero and the number of reference vectors becomes infinite (a continuum).

The plurality of reference vectors $V'$ each associated to a position $r'$ and a rotation angle $\varphi'$ may be also referred to as a vector map regardless whether $f'$ and/or its inverse $f'^{-1}$ is implemented as an analytic or tabulated function (LUT) or whether it is a finite or an infinite set.

In some implementations, the plurality of reference vectors $V'$ may be obtained in a previous process of system calibration. This process of system calibration may involve computer simulations, e.g., using a finite element method (FEM), interpolation, approximation, regression using analytic methods, measurements in a controlled environment, and/or in-situ in a particular parking space using a real implementation of a magnetic field positioning system 900.

In some implementations, the base positioning subsystem 362 may determine a position and/or an orientation of the sensor 366 with respect to the generator 368 based on the inverse mapping function $f'^{-1}$ according to Equation (24) using the detection vector $\hat{V}'$ as an input, which may be expressed as $$[r',\varphi',\theta',\psi'] = f'^{-1}(\hat{V}'). \quad (25)$$

If the inverse mapping function $f'^{-1}$ is analytically defined, the base positioning subsystem 362 may compute a position and/or orientation using Equation (25) and a suitable numerical method.

In some implementations, the set of reference vectors V' related to positions r' and rotation angles $\varphi'$, $\theta'$, $\psi'$ by the mapping function $f'$ may occupy only a subspace of the voltage vector space. This may be particularly true in cases where the dimensionality of the voltage vector space exceeds that of the position and rotation angle space (e.g., 9D vs. 6D) and if the position and rotation angle space itself is restricted. If the detection vector $\hat{V}'$ is perturbed e.g. by additive noise as previously described, the detection vector $\hat{V}'$ may not belong to the set of reference vectors $V'=f(r', \varphi', \theta', \psi')$. In such event, the inverse function $f'^{-1}$ may not provide a solution at all or it may not provide a physically meaningful solution for r', $\varphi'$, $\theta'$, $\psi'$. The likelihood for such event may be high if the dimensionality of the voltage vector space 2050 exceeds that of the position and rotation space 2000 (e.g., 9D vs. 6D). However, even if the dimensionality of the two spaces is equal and the sensor's 366 true position and orientation is within the specified position and rotation angle space, the inverse function $f'^{-1}$ may not always provide a solution, depending on the properties and structure of $f'^{-1}$. In any case, if the detection vector $\hat{V}'$ is perturbed, a solution of $f'^{-1}(\hat{V}')$ must be considered an estimate of the sensor's 366 true position and orientation with respect to the generator 368 and may be expressed as:

$$[\hat{r}', \hat{\varphi}', \hat{\theta}', \hat{\psi}'] = f'^{-1}(\hat{V}'). \quad (26)$$

In some implementations, the base positioning subsystem 362 deduces a position and/or an orientation of the sensor 366 with respect to the generator 368 by first performing some non-linear operations on the detection vector $\hat{V}'$ so that a physically meaningful solution for r', $\varphi'$, $\theta'$, $\psi'$ exists for any or at least for most perturbed detection vectors $\hat{V}'$. In some implementations using an isotropic sensor 366 as previously defined, such non-linear operation may include transforming the vector $\hat{V}'$ into a vector $\hat{A}'$, e.g., in analogy to Equation (13). However, such implementations may not perform optimally in the sense of a best estimate $\hat{r}'$, $\hat{\varphi}'$, $\hat{\theta}'$, $\hat{\psi}'$ for the sensor's 366 true position and orientation, respectively, since such non-linear operation generally involves a loss of information.

Therefore, in some implementations, the base positioning subsystem 362 may deduce a position and/or orientation of the sensor 366 with respect to the generator 368, which may be equivalent to the position and/or orientation of the base 408 with respect to the vehicle 406, by determining a closest match between the detection vector $\hat{V}'$ and a plurality of reference vectors V' previously calibrated to correspond to particular positions r' and rotation angles $\varphi'$, $\theta'$, $\psi'$ of sensor 366 with respect to the generator 368. This process of position and orientation finding may be also referred to as joint position and orientation finding. The plurality of reference vectors V' associated with positions r' and rotation angles $\varphi'$, $\theta'$, $\psi'$ may define the mapping function of Equation (23).

From a probabilistic perspective, if vector $\hat{V}'$ is perturbed, e.g., by additive noise as previously described, the reference vector of a plurality of reference vectors V'(r') that is closest to a detection vector $\hat{V}'$ may represent the reference vector of highest probability (maximum likelihood). Therefore, the position r' and rotation angles $\varphi'$, $\theta'$, $\psi'$ associated to that reference vector may also represent the sensor's 366 position and orientation of highest probability. The position and orientation of highest probability may be also considered a best estimate $\hat{r}'$ and $\hat{\varphi}'$, $\hat{\theta}'$, $\hat{\psi}'$ of the sensor's 366 true position and orientation, respectively.

Figure 21:
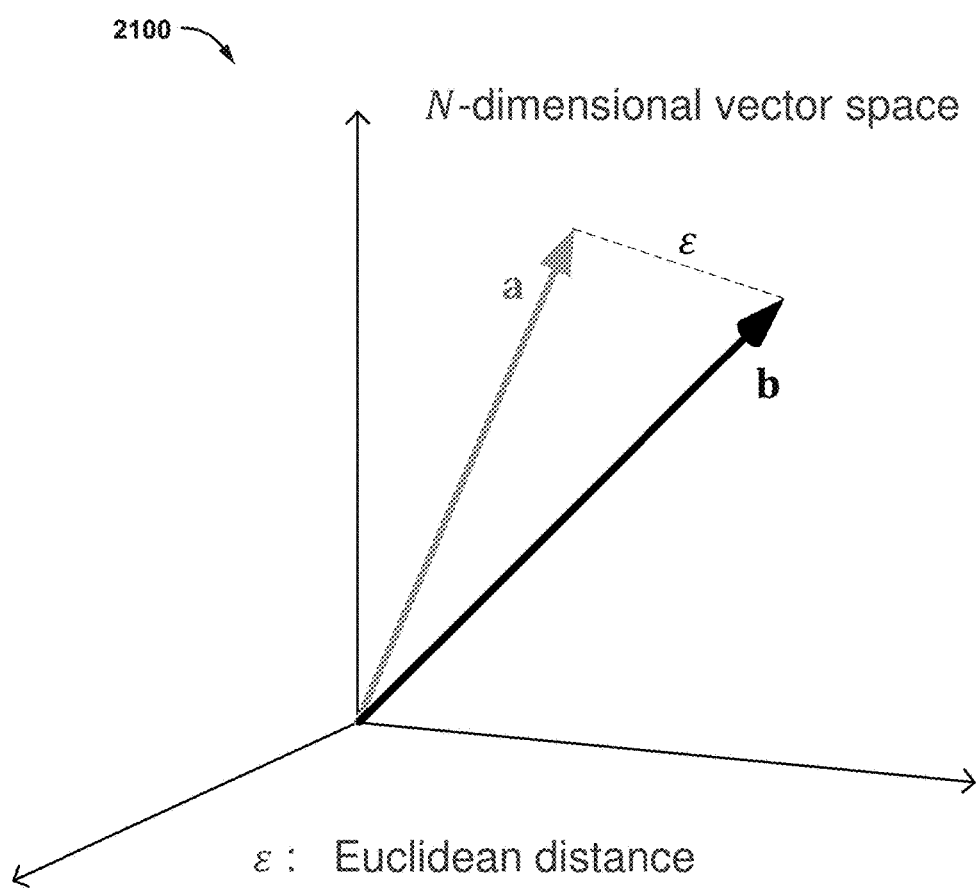
FIG. 21 is a diagram illustrating a Euclidean distance between two vectors in the N-dimensional vector space.

If vector $\hat{V}'$ is perturbed by additive noise with standard deviations as defined by Equation (27), the base positioning subsystem 362 may use the Euclidean distance between two vectors for determining the vector pair having closest match. FIG. 21 illustrates a Euclidean distance between two N-dimensional vectors in the N-dimensional vector space 2100. FIG. 21 shows a vector a and a vector b, each having its origin at the origin of the N-dimensional vector space 2100. A Euclidean distance $\varepsilon$ between vectors a and b is may be defined as the length of the difference vector d=a−b according to the following equation:

$$\varepsilon = |d| = |a - b| = \sqrt{\sum_{i=1}^{N}(a_i - b_i)^2}. \quad (28)$$

where $a_i$ is the $i^{th}$ vector component of the vector a and $b_i$ is the $i^{th}$ vector component of the vector b. Vector a and vector b may refer to the reference vector V' and the detection vector $\hat{V}'$, respectively.

If Equation (29) does not hold, meaning that standard deviations $\sigma_{N,i}$ are unequal, the base positioning subsystem 362 may employ, instead of the Euclidean distance, a weighted distance metrics e.g.

$$\varepsilon_w = \sqrt{\sum_{i=1}^{N} \frac{1}{\sigma_{N,i}^2}(a_i - b_i)^2}, \quad (30)$$

where $a_i$ may refer to the $i^{th}$ component of the vector a (e.g., reference vector V') and $b_i$ to the $i^{th}$ component of the vector b (e.g. detection vector $\hat{V}'$). In some implementations, the base positioning subsystem 362 may employ an alternative distance metric, e.g. the squared Euclidean distance, an approximation of the Euclidean distance, a weighted distance metric in accordance with Equation (33), or any other suitable distance metric. Descriptions of position and orientation finding processes below assume the standard Euclidean distance as defined by Equation (32) but should not be construed limited to that.

In some implementations based on a LUT, an example of which is illustrated in FIG. 23, the process of determining a position and orientation as described above may require reference vectors V' to be stored for each combination of position r' and rotation angles $\varphi'$, $\theta'$, $\psi$. Depending on the size of the specified position and rotation angle space and the grid point spacing (see examples given below), this may require high amount of memory. Therefore, in some implementations, the base positioning subsystem 362 uses a LUT containing a plurality of reference vectors $V'_0$ previously calibrated to correspond to particular sensor 366 positions r' but only for a single fixed rotation, e.g., the zero rotation ($\varphi'=0$) of sensor 366 with respect to the generator 368. The plurality of reference vectors $V'_0$ associated to positions r' may be also referred to as a vector map for a fixed rotation of the sensor 366.

In some implementations using an isotropic or substantially isotropic sensor 366 as previously defined, the base positioning subsystem 362 may deduce a position and/or orientation of the sensor 366 with respect to the generator 368 by determining a shortest Euclidean distance between a 9D detection vector $\hat{V}'$ and a plurality of rotational transforms $V'_0(\varphi', \theta', \psi')$ for each of a plurality of previously calibrated reference vectors $V'_0$. The rotational transform may comprise a sequence of rotations of reference vector $V'_0$, first by angle $\varphi'$, then by angle $\theta'$, and finally by angle $\psi'$, e.g., as given by Equation (18).

Figure 22:
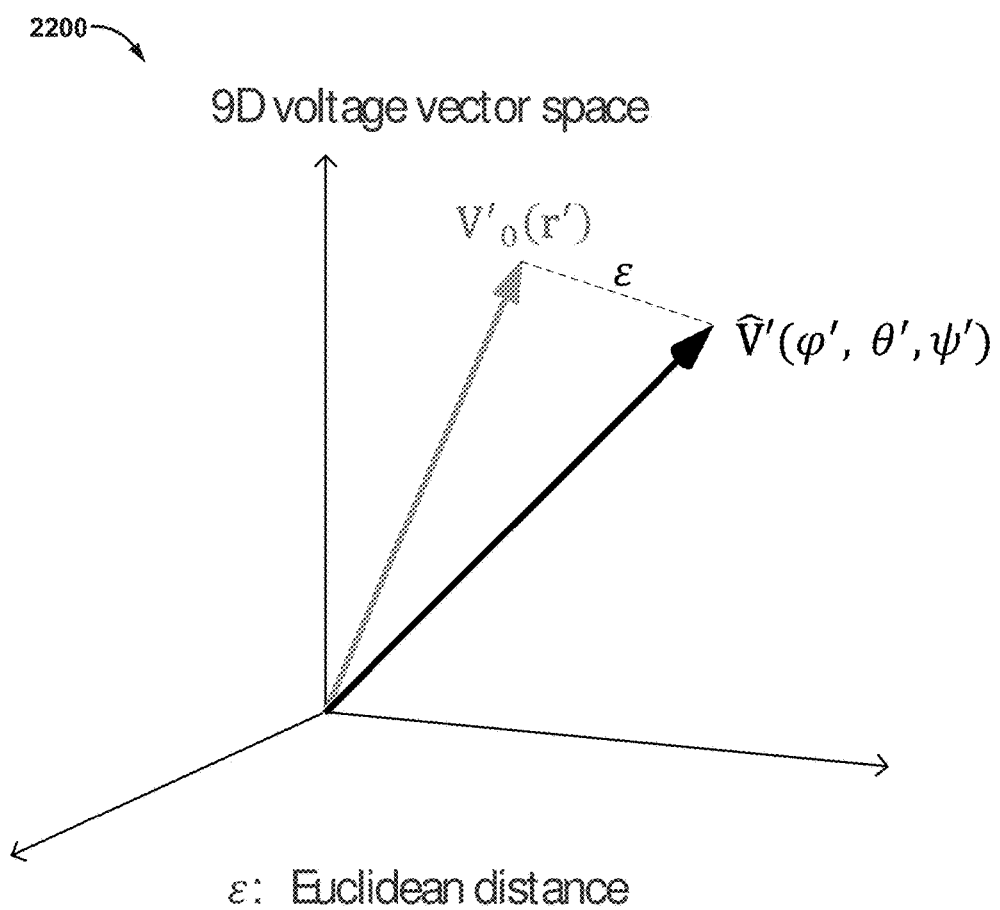
FIG. 22 is a diagram illustrating a Euclidean distance between a reference vector referring to a zero-rotated magnetic field sensor and a rotational transform of a detection vector in the 9D voltage vector space.

In some implementations using an isotropic or substantially isotropic sensor 366 as previously defined, the base positioning subsystem 362 may deduce a position and/or orientation of the sensor 366 with respect to the generator 368 by determining a shortest Euclidean distance between a plurality of rotational transforms $\hat{V}'(-\varphi', -\theta', -\psi')$ of the detection vector $\hat{V}'$ and a plurality of zero-rotated reference vectors $V'_0$ previously calibrated to correspond to particular sensor 366 positions r' of sensor 366 with respect to the generator 368. The rotational transform may comprise a sequence of rotations (de-rotations) of detection vector $\hat{V}'$, for example, first by angle $-\psi'$, then by angle $-\theta'$, and finally by angle $-\varphi'$, e.g., as given by Equation (22). FIG. 22 illustrates a Euclidean distance ε between a 9D zero-rotated reference vector $V'_0(r')$ and a rotational transform $\hat{V}'(-\varphi', -\theta', -\psi')$ of a 9D detection vector $\hat{V}'$ in the 9D vector space 2200. Vector $\hat{V}'$ may be an output of the base positioning subsystem 362 operationally connected to an arbitrarily rotated sensor 366. Rotations $\varphi'$, $\theta'$, $\psi'$ of the sensor 366 with respect to the generator 368 are a priori unknown and are to be determined. Any such rotations may affect the detection vector $\hat{V}'$ as previously discussed. Thus, finding a position and orientation jointly may require determining a Euclidean distance ε between a rotational transform $\hat{V}'(-\varphi', -\theta', -\psi')$ of detection vector $\hat{V}'$ and a previously-calibrated zero-rotated reference vector $V'_0(r')$ iteratively for every position of a plurality of discrete positions r', for every angle of a plurality of discrete angles $\varphi'$, for every angle of a plurality of discrete angles $\theta'$, and for every angle of a plurality of discrete angles $\psi'$. If the detection vector is subject of a polarity ambiguity as previously discussed, the process of joint position and orientation finding may additionally include iterations over both polarity hypothesis p=+1 and p=−1. The terms "iteratively" or "iterations" mean that the Euclidean distance may be determined for every position of a plurality of positions, and for each position for every angle $\varphi'$ of a plurality of angles $\varphi'$, and for each angle $\varphi'$ for every angle $\theta'$ of a plurality of angles $\theta'$, and for each angle $\theta'$ for every angle $\psi'$ of a plurality of angles and $\psi'$, if required, for each angle $\psi'$ for both polarity hypothesis p=+1 and p=−1.

Figure 30:
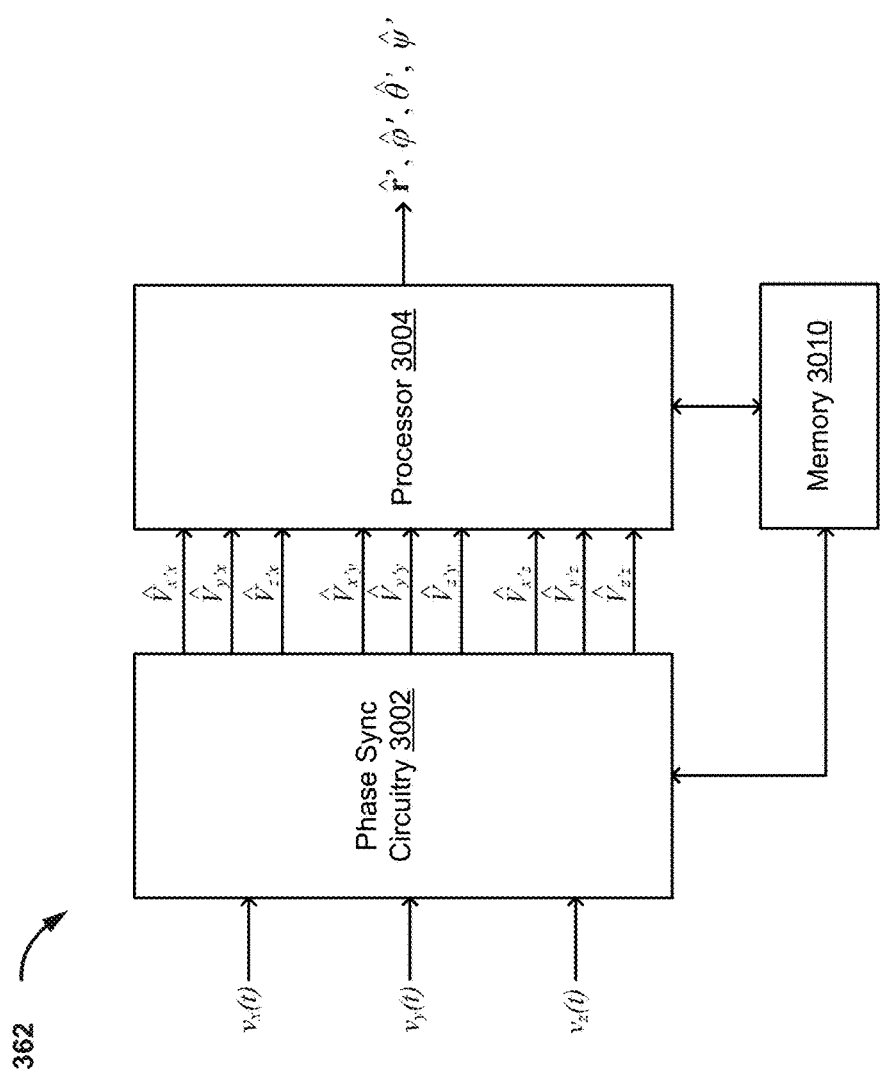
FIG. 30 is a block diagram illustrating parts of the base positioning system of FIG. 3, in accordance with some implementations.

In some implementations, the zero-rotated reference vectors $V'_0(r')$ may be stored in a look-up table (LUT) 2300, an example of which is illustrated in FIG. 23. In some other implementations, the zero-rotated reference vectors $V'_0(r')$ may be defined by an analytical (mathematical) function of the form as expressed by Equation (23) and are computed by a processor (e.g., processor 3004 as illustrated in FIG. 30).

In mathematical terms, a position of a plurality of discrete positions r' may be expressed by position vector $r'_{i,j,k} = [r_{x',i}, r_{y',j}, r_{z',k}]^T$, where indices i, j, k are integer numbers. Likewise, a respective angle of a plurality of discrete angles $\varphi'$, $\theta'$, and $\psi'$ may be expressed by $\varphi'_l$, $\theta'_m$, and $\psi'_n$, where indices l, m, n are integer numbers. Using these definitions, the process of determining a position and rotation angle jointly based on the shortest (minimum) Euclidean distance ε may be expressed as $$\min_{all\ i,j,k,l,m,n,p} |V'_0(r'_{i,j,k}) - p\hat{V}'(-\varphi'_l, -\theta'_m, -\psi'_n)| \to \hat{r}' \quad (31)$$
$$\to \hat{\varphi}'$$
$$\to \hat{\theta}',$$
$$\to \hat{\psi}'$$

where $|\cdot|$ denotes the norm of a vector in the Euclidean space. The term "all" shall be understood as all iterations (combinations) of i, j, k, l, m, n, p over the number ranges as specified for a particular implementation. The position and rotation angles as output by the process of Equation (31) may represent a position estimate $\hat{r}'$ and rotation angle estimates $\hat{\varphi}'$, $\hat{\theta}'$, $\hat{\psi}'$, respectively. In some implementations, these estimates may include position and/or orientation ambiguity. The rotational transform (also known as de-rotation) of the 9D detection vector $\hat{V}'$ is given by matrix equation (18) and may be expressed in the context of Equation (31) as $$[\hat{V}'(-\varphi'_l, -\theta'_m, -\psi'_n)] = [R_{\psi'_n}]^T [R_{\theta'_m}]^T [R_{\varphi'_l}]^T [\hat{V}']. \quad (32)$$

In some implementations, the discrete positions $r'_{i,j,k}$ may correspond to grid points in a limited 3D position space, which is referred to as the search space. The search space may be defined by the following ranges:

$$x'_{min} < r_{x',i} < x'_{max},$$
$$y'_{min} < r_{y',j} < y'_{max},$$
$$z'_{min} < r_{z',k} < z'_{max}, \quad (33)$$

where $x'_{min}$ and $x'_{max}$ denote the lower and upper limit of the x'-dimension of the 3D position space, $y'_{min}$ and $y'_{max}$ the lower and upper limit of its y'-dimension, etc. The grid points of the search space may have a tight enough spacing so that it does not noticeably impair the accuracy of the position and orientation estimates as determined by the base positioning subsystem 362 regardless of the sensor's 366 position. In some implementation, grid points are equally spaced. In some other implementations, grid points are unequally spaced, e.g., a spacing increasing with distance from the origin of the 3D position space according to some rule. In an exemplary implementation, e.g., where physical restrictions for the sensor's 366 position as defined by Equation (1) applies, the ranges may be limited to $x'_{min} = -500$ cm, $x'_{max} = 500$ cm, $y'_{min} = -300$ cm, $y'_{max} = 300$ cm, $z'_{min} = -15$ cm, $z'_{max} = -10$ cm, and an equal grid point along each axis may apply.

In some implementations, the discrete angles $\varphi'_l$, $\theta'_m$, and $\psi'_n$ correspond to grid points in a 3D orientation angle space defined by the following ranges:

$$\varphi'_{min} \leq \varphi'_l < \varphi'_{max},$$
$$\theta'_{min} \leq \theta'_m < \theta'_{max},$$
$$\psi'_{min} \leq \psi'_n < \psi'_{max}, \quad (34)$$

where $\varphi'_{min}$ and $\varphi'_{max}$ denote the lower and upper limit of the $\varphi'$-dimension of the 3D orientation space, $\theta'_{min}$ and $\theta'_{max}$ the lower and upper limit of the $\theta'$-dimension, etc. The grid points may have a tight enough spacing so that it does not noticeably impair the accuracy of the position and orientation estimates as determined by the base positioning subsystem 362 regardless of the sensor's 366 position and orientation. For example, in an exemplary implementation, the following limits $\varphi'_{min} = -180°$, $\varphi'_{max} = 180°$, $\theta'_{min} = -180°$, $\theta'_{max} = 180°$, $\psi'_{min} = -180°$, $\psi'_{max} = 180°$, and an equal grid point spacing of 1° may apply. If physical restrictions for the sensor's 366 pitch and roll angle as defined by Equation (2) apply, the limits for the θ'- and ψ'-ranges may be set to $\theta'_{min} = \theta'_{max} = \psi'_{min} = \psi'_{max} = 0°$.

In some other implementations, the limits $x'_{min}$, $x'_{max}$, $y'_{min}$, $y'_{max}$, $z'_{min}$, $z'_{max}$, $\varphi'_{min}$, $\varphi'_{max}$, $\theta'_{min}$, $\theta'_{max}$, $\psi'_{min}$, $\psi'_{max}$, of the search space and the grid spacing are variable parameters may depend on previously found position and orientation angle estimates, respectively.

In further implementations, the plurality of discrete positions $r'_{i,j,k}$ may correspond to grid points in a search space that is determined by a function of the 9D detection vector. In some implementations, the base positioning subsystem 362 determines a 3D cylindrical search space centered in the origin of the generator's 368 coordinate frame that is limited by an inner radius $\rho'_{x',y',min}$ and outer radius $\rho'_{x',y',max}$ and by a z'-height range. This cylindrical search space may be defined as:

$$\rho'_{x',y',min} < \sqrt{r_{x',i}^2 + r_{y',j}^2} < \rho'_{x',y',max},$$

$$z'_{min} < r_{z',k} < z'_{max}. \quad (35)$$

In some implementations, the base positioning subsystem 362 may determine the inner radius $\rho'_{x',y',min}$ and the outer radius $\rho'_{x',y',max}$ based on a value that is derived from the 9D detection vector $\hat{V}'$, e.g., on its magnitude $|\hat{V}'|$.

Depending on the number of grid points in the search space, the process of joint position and orientation finding may be extremely computationally intensive. In some implementations, to reduce computational load, this process of position and orientation finding may be divided into a first operation process that is an orientation-independent position finding process and a second operation process that is an orientation finding process based on the position found in the first operation process.

The orientation-independent position finding process is described below and applies to a base positioning subsystem 362 using a sensor 366 that is isotropic or substantially isotropic as previously defined. The base positioning subsystem 362 may first determine a position estimate $\hat{r}'$ based on a detection vector $\hat{A}'$ (e.g., the 6D detection vector as defined by Equation (13)). Detection vector $\hat{A}'$ is a non-linear transform of detection vector $\hat{V}'$, has lower dimensionality than $\hat{V}'$, and is invariant to the sensor's 366 rotation and to polarity ambiguity. The base positioning subsystem 362 may determine a position estimate $\hat{r}'$ by finding a shortest Euclidean distance between the detection vector $\hat{A}'$ and a plurality of previously-calibrated reference vectors $A'(r'_{i,j,k})$. These reference vectors $A'(r'_{i,j,k})$ may be stored in a look up table (LUT) 2300, as described in connection with FIG. 23.

FIG. 23 illustrates an exemplary entry in a look up table (LUT) 2300 including a LUT address i, j, k associated position coordinates $r_{x',i}$, $r_{y',j}$, $r_{z',k}$, associated 9D zero-rotated reference vector $V'_0(r_{x',i}, r_{y',j}, r_{z',k})$, and associated 6D reference vector $A'(r_{x',i}, r_{y',j}, r_{z',k})$. The LUT 2300 may include a plurality of entries having the general format as shown. Each entry may correspond to a unique position of the magnetic field sensor 366 with respect to the magnetic field generator 368 arranged into a grid over a limited 3D position space as previously described. In some implementations, if the magnetic field generated by the generator 368 is symmetric, the LUT 2300 may be limited to entries only in one octant of the 3D positioning space to reduce the size of the LUT 2300 of FIG. 23. If a physical restriction for the sensor's 366 position as defined by Equation (1) additionally applies (the lower half space), the octant may refer to a quadrant.

Figure 24:
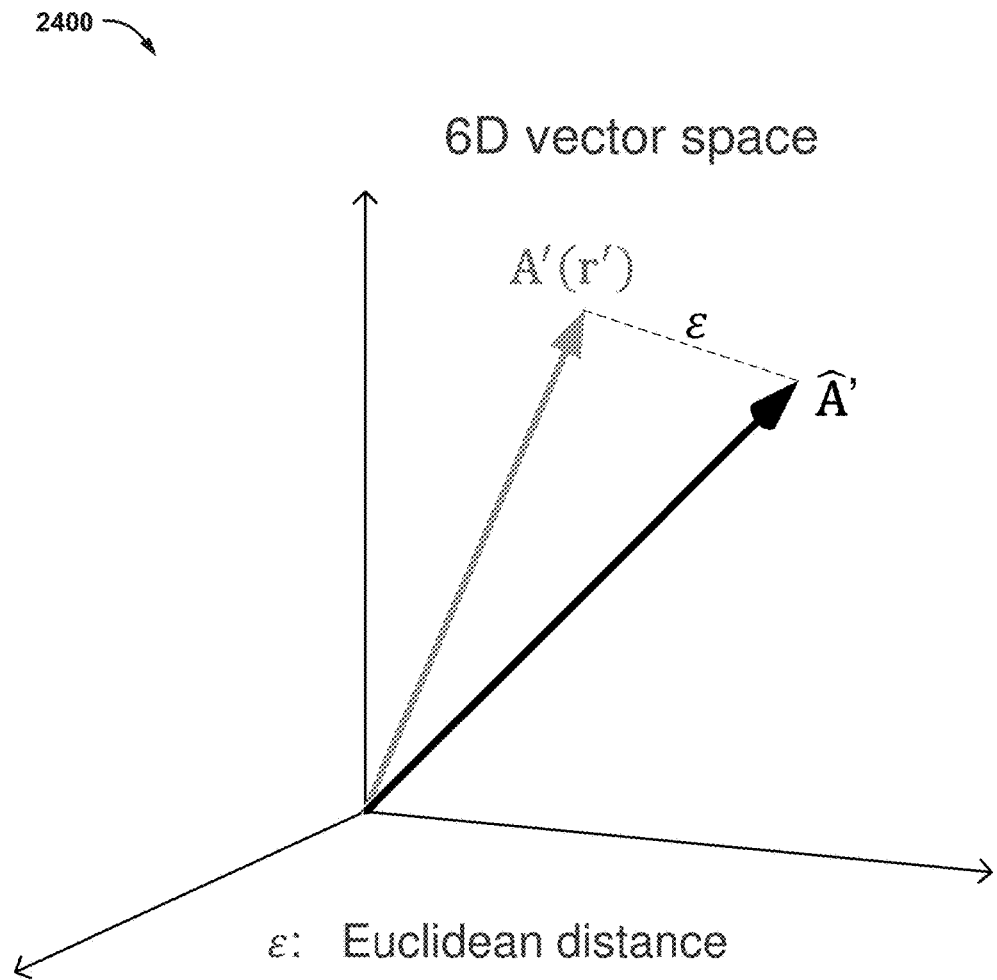
FIG. 24 is a diagram illustrating a Euclidean distance between a 6D reference vector of the LUT of FIG. 23 and a 6D detection vector e.g. composed of scalar (dot) products of detected 3D voltage vectors, in accordance with some implementations.

FIG. 24 illustrates a Euclidean distance ε between a 6D zero-rotated reference vector $A'(r'_{i,j,k})$ of the LUT 2300 of FIG. 23 and a 6D detection vector $\hat{A}'$ in the 6D vector space 2400. Because the detection vector $\hat{A}'$ is invariant to the sensor's 366 rotation, relying on the 6D absolute scalar product vector $\hat{A}'$ does not require determining a shortest Euclidean distance between iterative rotations and polarity changes of a detection vector $\hat{A}'$ and every zero-rotated reference vector $A'$. This may drastically reduce the computational load of determining a position $r'_{i,j,k}$. The base positioning subsystem 362 may determine the position $r'_{i,j,k}$ providing shortest Euclidean distance between a plurality of 6D reference vectors $A'(r'_{i,j,k})$ and the 6D detection vector $\hat{A}'$. The base positioning subsystem 362 may accomplish this by systematically stepping through each position entry $r'_{i,j,k}$ associated to a reference vector $A'(r'_{i,j,k})$ in the LUT 2300 of FIG. 23 within the search space as specified by a particular implementation. In mathematical terms, this orientation-independent process of determining a position estimate $\hat{r}'$ based on the shortest (minimum) Euclidean distance ε may be expressed as $$\min_{all\ i,j,k} |A'(r'_{i,j,k}) - \hat{A}'| \to \hat{r}', \quad (36)$$

where |•| denotes the norm of a vector in the Euclidean space. The term "all" may be understood as all iterations (combinations) of i, j, k over the number ranges as specified by a particular implementation. In some implementations, these ranges correspond to grid points in one octant of the 3D position subspace of the 6D position and orientation space.

In some implementations, if the vector map $A'(r'_{i,j,k})$ is symmetric with respect to at least one of an x'-, y'-, and z'-axis, the position estimate $\hat{r}'$ as determined by an orientation-independent process (Equation (36)) may be considered ambiguous. If a physical restriction for the sensor's 366 position apply, e.g. $r_{z'} < 0$, an ambiguous position may comprise one position in each of the $5^{th}$, $6^{th}$, $7^{th}$, and $8^{th}$ octant of the lower half space at symmetry points. These positions may be expressed as $$\hat{r}'_5 = \begin{bmatrix} \hat{r}_{x'} \\ \hat{r}_{y'} \\ -\hat{r}_{z'} \end{bmatrix}, \hat{r}'_6 = \begin{bmatrix} \hat{r}_{x'} \\ -\hat{r}_{y'} \\ -\hat{r}_{z'} \end{bmatrix}, \hat{r}'_7 = \begin{bmatrix} -\hat{r}_{x'} \\ -\hat{r}_{y'} \\ -\hat{r}_{z'} \end{bmatrix}, \hat{r}'_8 = \begin{bmatrix} -\hat{r}_{x'} \\ -\hat{r}_{y'} \\ -\hat{r}_{z'} \end{bmatrix} \quad (37)$$

Once a position estimate $\hat{r}'$ is known, the sensor's 366 orientation may be determined in a second operation orientation finding process based on the 9D detection vector $\hat{V}'$. This may be accomplished by determining a shortest Euclidean distance ε between a rotational transform $\hat{V}'(-\varphi'_l, -\theta'_m, -\psi'_n)$ of detection vector $\hat{V}'$ and a zero-rotated reference vector $V'_0$ associated to the position $\hat{r}'$ found in the first operation process, iteratively for every angle of a plurality of discrete angles $\varphi'_l$, for every angle of a plurality of discrete angles $\theta'_m$, and for every angle of a plurality of discrete angles $\psi'_n$, and, if required, for both polarity hypothesis p=[+1, −1]. If the position estimate $\hat{r}'$ as obtained from the first operation position finding process is ambiguous, e.g., comprising positions $\hat{r}'_5$, $\hat{r}'_6$, $\hat{r}'_7$, and $\hat{r}'_8$ as given by Equation (37), the orientation finding process may also include iterations over these ambiguities. If the vector data in the LUT 2300 covers the $5^{th}$, $6^{th}$, $7^{th}$, and $8^{th}$ octant, the zero-rotated reference vectors $V'_0$ associated to these positions can be obtained from the LUT 2300. However, if the LUT 2300 covers only one octant e.g. the $1^{st}$ octant, reference vectors for other octants may be obtained by using an octant transform, which may be expressed using matrix notation as $$[V'_0(\hat{r}'_q)] = [Q'_q][V'_0(\hat{r}'_1)][Q'_q], \quad (38)$$

where $[V'_0(\hat{r}'_q)]$ denotes the matrix notation of the new reference vector transformed from the $1^{st}$ to the $q^{th}$ octant, and $[Q'_q]$ the matrix transforming a reference vector $V'_0(\hat{r}'_1)$ from the $1^{st}$ to the $q^{th}$ octant. In some implementations, transformation matrices $[Q'_q]$ may be given by, for q=1:
$$[Q'_1] = \begin{bmatrix} 1 & 0 & 0 \\ 0 & 1 & 0 \\ 0 & 0 & 1 \end{bmatrix}, \quad (39)$$

for q=2:
$$[Q'_2] = \begin{bmatrix} -1 & 0 & 0 \\ 0 & 1 & 0 \\ 0 & 0 & 1 \end{bmatrix}, \quad (40)$$

for q=3:
$$[Q'_3] = \begin{bmatrix} -1 & 0 & 0 \\ 0 & -1 & 0 \\ 0 & 0 & 1 \end{bmatrix}, \quad (41)$$

for q=4:
$$[Q'_4] = \begin{bmatrix} 1 & 0 & 0 \\ 0 & -1 & 0 \\ 0 & 0 & 1 \end{bmatrix}, \quad (42)$$

for q=5:
$$[Q'_5] = \begin{bmatrix} 1 & 0 & 0 \\ 0 & 1 & 0 \\ 0 & 0 & -1 \end{bmatrix}, \quad (43)$$

for q=6:
$$[Q'_6] = \begin{bmatrix} -1 & 0 & 0 \\ 0 & 1 & 0 \\ 0 & 0 & -1 \end{bmatrix}, \quad (44)$$

for q=7:
$$[Q'_7] = \begin{bmatrix} -1 & 0 & 0 \\ 0 & -1 & 0 \\ 0 & 0 & -1 \end{bmatrix}, \quad (45)$$

and for q=8:
$$[Q'_8] = \begin{bmatrix} 1 & 0 & 0 \\ 0 & -1 & 0 \\ 0 & 0 & -1 \end{bmatrix}. \quad (46)$$

Above matrices as defined by Equations (39)-(47) may also apply to an inverse octant transform from the $q^{th}$ octant back to the $1^{st}$ octant.

In mathematical terms, the second operation process of determining rotation angle estimates $\hat{\varphi}'$, $\hat{\theta}'$, $\hat{\psi}'$ at position $\hat{r}'$ found by the preceding orientation-independent process may be expressed as $$\min_{\text{all } l,m,n,p,q} |V'_0(\hat{r}'_q) - p\hat{V}'(-\varphi'_l, -\theta'_m, -\psi'_n)| \rightarrow \hat{\varphi}' \quad (48)$$
$$\rightarrow \hat{\theta}',$$
$$\rightarrow \hat{\psi}'$$

where |•| denotes the norm of a vector in the Euclidean space. The term "all" shall be understood as all iterations (combinations) of l, m, n, p, q over the number ranges as specified by a particular implementation. The rotational transform (also known as de-rotation) of the detection vector $\hat{V}'$ may be given by matrix equation (32). If the position estimate $\hat{r}'$ exhibits ambiguity, e.g., at symmetry positions in the $5^{th}$, $6^{th}$, $7^{th}$, and $8^{th}$ octant as given by (37), iterations may be performed for q=5, 6, 7, and 8. Otherwise q=1 may be assumed.

In some implementations, the base positioning subsystem 362 applies an octant transformation to the rotational transform $\hat{V}'(-\varphi'_l, -\theta'_m, -\psi'_n)$ of the detection vector $\hat{V}'$ rather than to the reference vector $V'_0(\hat{r}')$ in order to determine the shortest Euclidean distance ε and the LUT 2300 contains reference vector data e.g. only for the first octant. Using matrix equation (38), the octant transform of $\hat{V}'(-\varphi'_l, -\theta'_m, -\psi'_n)$ may be expressed as $$[\hat{V}'_q(-\varphi'_l, -\theta'_m, -\psi'_n)] = [Q'_q][\hat{V}'(-\varphi'_l, -\theta'_m, -\psi'_n)][Q'_q], \quad (49)$$

Equation ( ) may refer to an inverse octant transform of a 9D detection vector as obtained with the sensor 366 at a position in the $q^{th}$ octant to a symmetry position in the $1^{st}$ octant. The inverse octant and rotational transform of vector $\hat{V}'$ may be denoted by $\hat{V}'_q(-\varphi'_l, -\theta'_m, -\psi'_n)$. Using this denotation, this second operation process of determining rotation angle estimates $\hat{\varphi}'$, $\hat{\theta}'$, $\hat{\psi}'$ based on the shortest (minimum) Euclidean distance ε may be expressed as $$\min_{\text{all } l,m,n,p,q} |V'_0(\hat{r}') - p\hat{V}'_q(-\varphi'_l, -\theta'_m, -\psi'_n)| \rightarrow \hat{\varphi}' \quad (50)$$
$$\rightarrow \hat{\theta}'.$$
$$\rightarrow \hat{\psi}'$$

This process may be equivalent to the process defined by Equation ( ).

In some implementations, if detection vectors are perturbed e.g. by noise as previously discussed, position and rotation angle estimates as obtained from the two-operation (sequential) position and orientation finding process as described above may be less accurate compared to estimates obtained from the computationally intensive joint position and orientation finding process as previously described.

An alternative process in accordance with some implementations, which may represent a trade-off between computational burden and positioning accuracy is described below. This process may be again a two-operation process comprised of a first operation process that is an orientation-independent position finding process and a second operation process that is a joint position and orientation finding process. In the first operation process, the base positioning subsystem 362 may find a number $N_c$ of candidate positions $r'_1, r'_2, \ldots, r'_{N_c}$ for which Euclidean distances $\varepsilon_1, \varepsilon_2, \ldots \varepsilon_{N_c}$ between the associated reference vectors $A'(r'_1)$, $A'(r'_2), \ldots, A'(r'_{N_c})$ and the detection vector $\hat{A}'$ is smaller than the Euclidean distances $\varepsilon$ between all other reference vectors $A'(r')$ in the search space and the detection vector $\hat{A}'$. The base positioning subsystem 362 may accomplish this by systematically stepping through each position entry $r'_{i,j,k}$ associated to a reference vector $A'(r'_{i,j,k})$ in the LUT 2300 of FIG. 23 and within the search space as specified for a particular implementation. In some implementations, the resulting $N_c$ candidate positions $r'_1, r'_2, \ldots, r'_{N_c}$ may be ambiguous as previously discussed.

In some implementations, the number of candidates $N_c$ may be in the range from 10 to 100. If the LUT 2300 of FIG. 23 covers reference vector data of only one octant (e.g. the $1^{st}$ octant) as previously discussed, candidate positions $r'_1$, $r'_2, \ldots, r'_{N_c}$ may be ambiguous.

Figure 25:
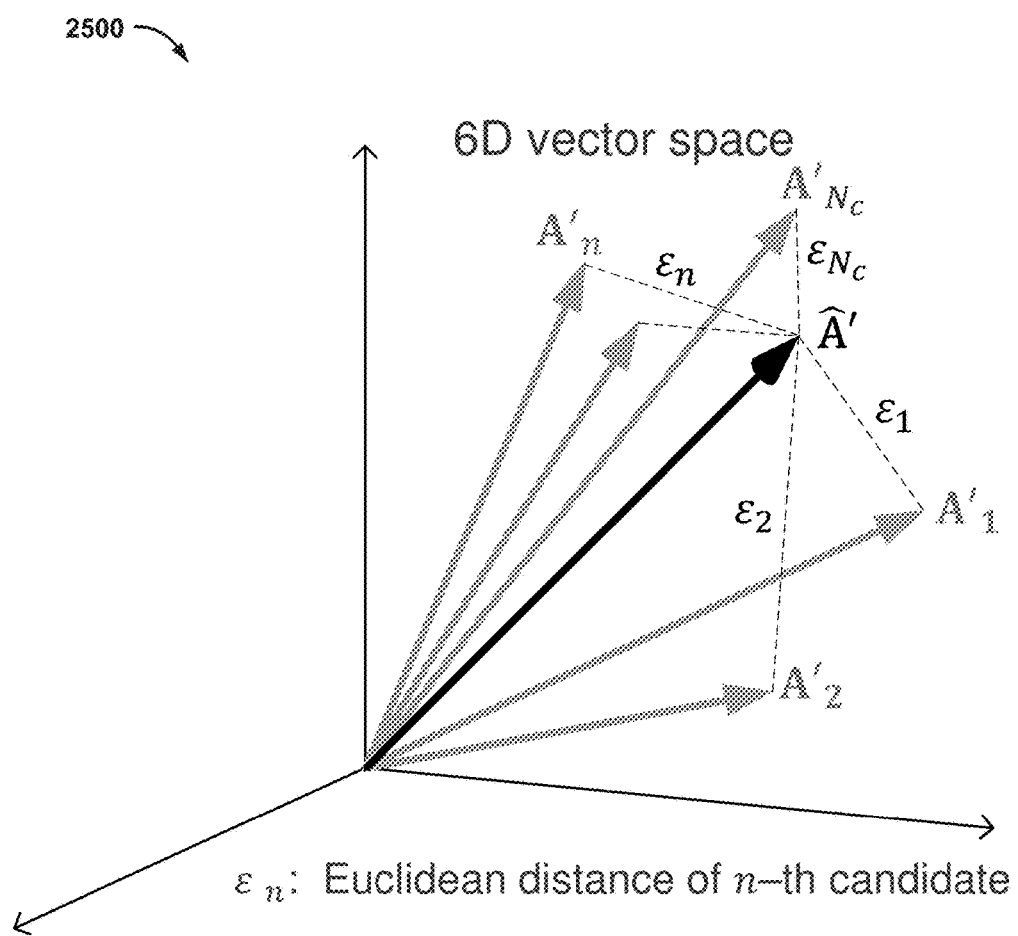
FIG. 25 is a diagram illustrating Euclidean distances between 6D reference vectors of the LUT of FIG. 23 and a 6D detection vector of FIG. 24 in the 6D vector space.

FIG. 25 illustrates the $N_c$ smallest Euclidean distances $\varepsilon_1$, $\varepsilon_2, \ldots \varepsilon_{N_c}$ between 6D reference vectors $A'(r'_1)$, $A'(r'_2), \ldots, A'(r'_{N_c})$ of the LUT 2300 and a 6D detection vector $\hat{A}'$ in the 6D vector space 2500. In mathematical terms, this orientation-independent process of determining $N_c$ position $r'_1, r'_2, \ldots, r'_N$ based on the $N_c$ smallest Euclidean distances $\varepsilon_1, \varepsilon_2, \ldots \varepsilon_{N_c}$ may be expressed as $$\underset{smallest\ all\ i,j,k}{N_c} |A'(r'_{i,j,k}) - \hat{A}'| \rightarrow r'_1, r'_2, \ldots, r'_{N_c}, \quad (49)$$

where |•| denotes the norm of a vector in the Euclidean space. The term "all" shall be understood as all iterations (combinations) of i, j, k over the number ranges as specified by a particular implementation. In some implementations, these ranges correspond to grid points in one octant of the 3D position subspace of the 6D position and orientation space. In some implementations, the number $N_c$ of candidate positions $r'_1, r'_2, \ldots, r'_{N_c}$ may be a predetermined value. In some implementations, the $N_c$ of candidate positions $r'_1$, $r'_2, \ldots, r'_{N_c}$ may correspond to all positions $r'$ having a Euclidean distance $\varepsilon$ from the 6D detection vector $\hat{A}'$ smaller than a threshold value.

Figure 26:
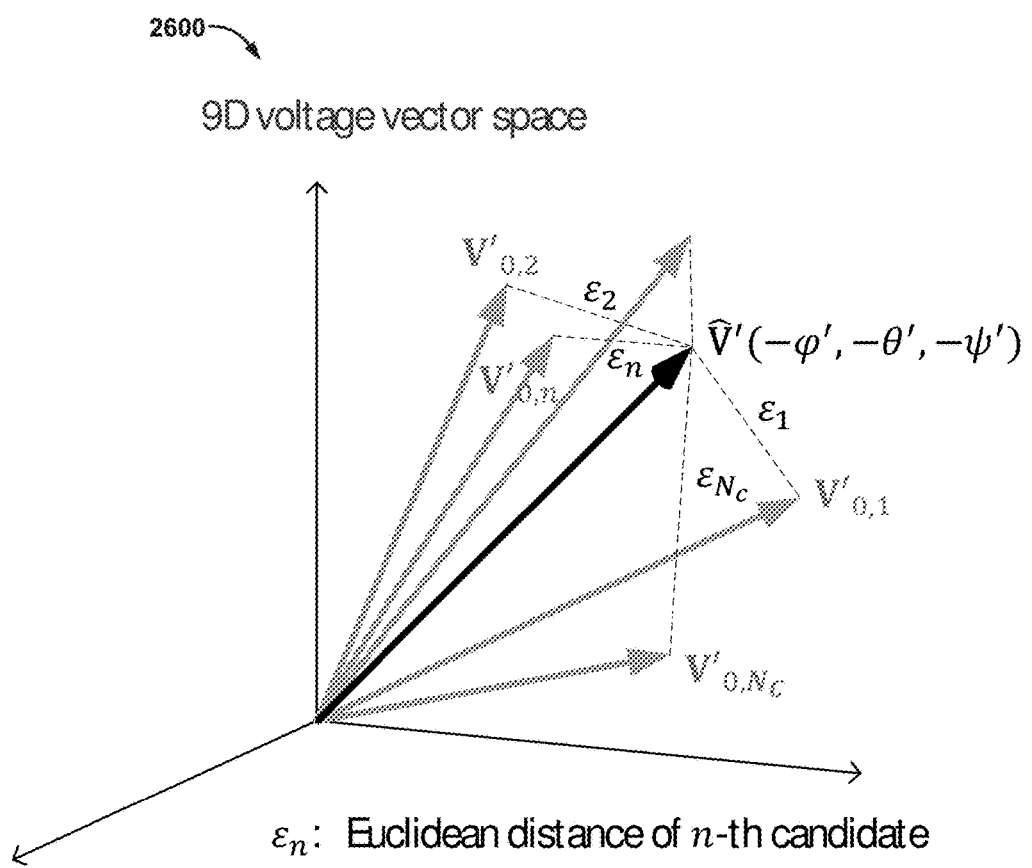
FIG. 26 is a diagram illustrating Euclidean distances between 9D reference vectors of the LUT of FIG. 23 and a rotational transform of a 9D detection vector in the 9D voltage vector space.

In a subsequent (second operation) process, the base positioning subsystem 362 may determine, amongst the set of $N_c$ candidate positions $r'_1, r'_2, \ldots, r'_{N_c}$, the position $r'$ and the rotation angles $\varphi'_l, \theta'_m, \psi'_n$ for which a Euclidean distance $\varepsilon$ between a rotational transform $\hat{V}'(-\varphi'_l, -\theta'_m, -\psi'_n)$ of the detection vector $\hat{V}'$ and reference vectors $V'_0$ associated to candidate positions $r'_1, r'_2, \ldots, r'_{N_c}$ is a minimum. An example of this second operation process of joint position and orientation finding is illustrated in FIG. 26. FIG. 26 shows Euclidean distances $\varepsilon_1, \varepsilon_2, \ldots \varepsilon_{N_c}$ between a rotational transform of detection vector $\hat{V}'$ and a plurality of reference vectors $V'_0$ in the 9D vector space 2600. The plurality of reference vectors $V'_0$ refer to the zero-rotated 9D reference vectors associated to candidate positions $r'_1$, $r'_2, \ldots, r'_{N_c}$ and may be stored in the LUT 2300 of FIG. 23. The base positioning subsystem 362 may accomplish this subsequent operation process by systematically stepping through each position of the $N_c$ candidate positions $r'_1$, $r'_2, \ldots, r'_{N_c}$ and by selecting the candidate position $r'$ and rotation angles $\varphi'_l, \theta'_m, \psi'_n$ providing shortest (minimum) Euclidean distance $\varepsilon$. The position and rotation angle providing minimum Euclidean distance $\varepsilon$ may be referred to as the final position estimate $\hat{r}'$ and rotation angle estimates $\hat{\varphi}'$, $\hat{\theta}'$, $\hat{\psi}'$ of the sensor 366 with respect to the generator 368.

If candidate positions have ambiguity at symmetry points in different octants, the second operation may include iterations over all inverse octant transforms as required by a particular implementation as previously discussed. If the detection vector $\hat{V}'$ is also subject to a polarity ambiguity, iterations may include both polarity hypothesis p=+1 and p=−1. The process of joint position and orientation finding amongst $N_c$ candidate positions $r'_1, r'_2, \ldots, r'_{N_c}$, including iterations over octants q as well as polarity hypothesis p may be expressed analogously to Equation ( ) as $$\underset{r'=[r'_1,r'_2,\ldots,r'_{N_c}]}{\min} |V'_0(r') - p\hat{V}'_q(-\varphi'_l, -\theta'_m, -\psi'_n)| \rightarrow \hat{r}' \quad (50)$$
$$\text{all } p,q$$
$$\rightarrow \hat{\varphi}',$$
$$\rightarrow \hat{\theta}'$$
$$\rightarrow \hat{\psi}'$$

where |•| denotes the norm of a vector in the Euclidean space. The term "all" shall be understood as all iterations (combinations) of p and q over the number ranges as specified by a particular implementation.

In some implementations, the above-described positioning processes may rely on the magnetic field sensor 366 being isotropic or at least substantially isotropic. In some implementations only the magnetic field generator 368 may be considered isotropic. In such implementations, the position and orientation finding processes described above may be performed by relying on the concept of a fictitious reverse transmitting system. In this fictitious system, position and orientation as determined may refer to the generator's 368 position and orientation in the sensor's 366 coordinate frame that may be equivalent to the base's 408 coordinate frame.

Figure 27:
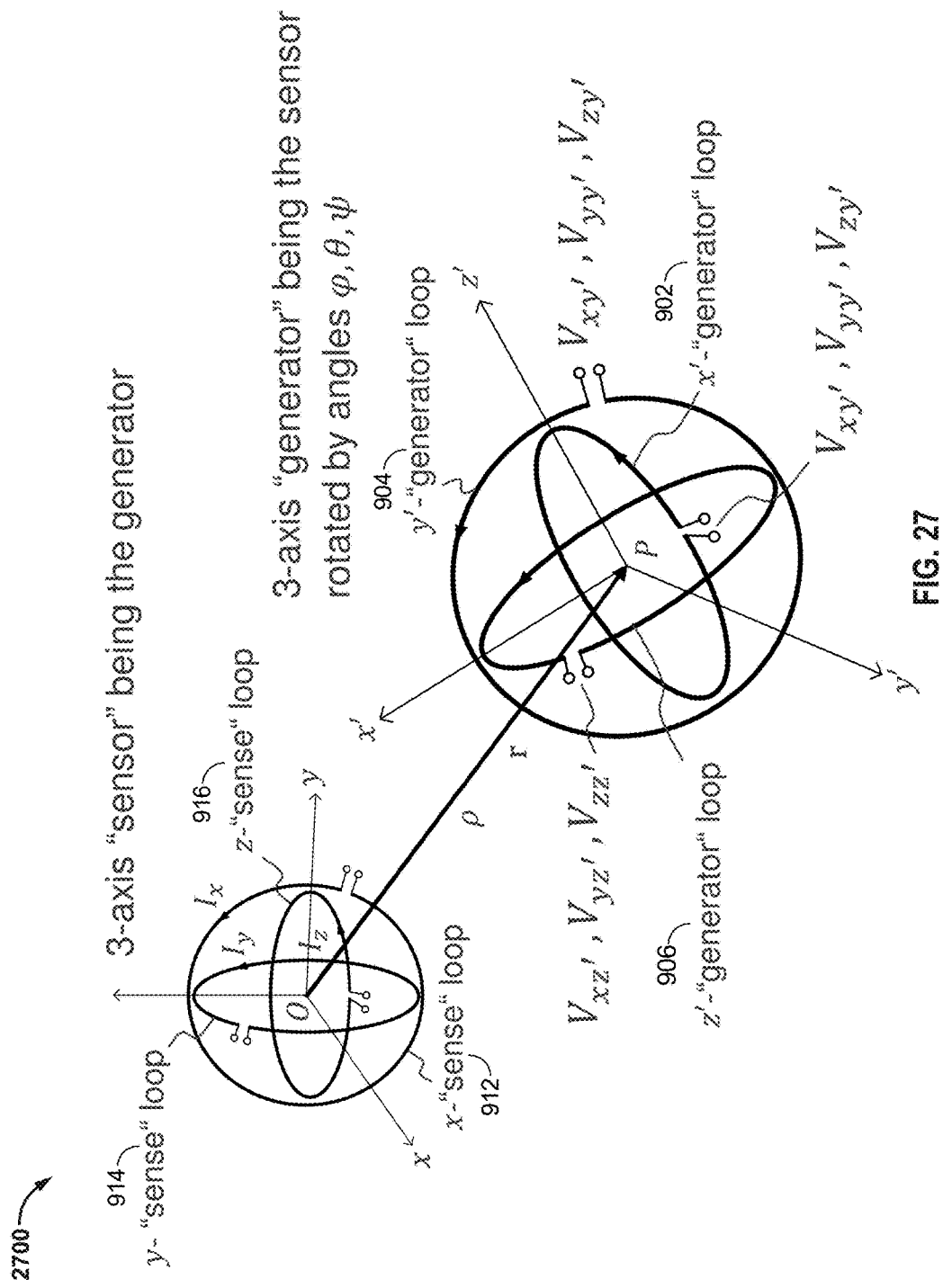
FIG. 27 is a diagram illustrating a fictitious reverse transmitting system where the 3-axis magnetic field generator of FIG. 10 is considered the sensor and the 3-axis magnetic field sensor of FIG. 10 is considered the generator, in accordance with some implementations.

FIG. 27 illustrates a fictitious reverse transmitting system 2700 where the 3-axis magnetic field generator 368 of FIG. 10 is considered the sensor and the 3-axis magnetic field sensor 366 of FIG. 10 is considered the generator. Thus, in FIG. 27, the 3-axis sensor 366 comprising the sense coils 912, 914, 916 may be considered the generator and the 3-axis generator 368 comprising the generator coils 902, 904, 906 the sensor. The sense coils 912, 914, 916 may be assumed driven by currents $I_x, I_y, I_z$.

The law of reciprocity of linear electrical networks states that the coupling between the generator coils 902, 904, 906 and the sense coils 912, 914, 916 and thus the mutual inductances between all coil combinations in the system 1000 shown in FIG. 10 are equal to the mutual inductances in the fictitious reverse transmitting system 2700 as shown in FIG. 27. In mathematical terms, the mutual inductance matrix [M'] of the system 1000 equals the transposed of the mutual inductance matrix [M] of the fictitious system 2700, which may be expressed as $$[M] = \begin{bmatrix} M_{xx'} & M_{yx'} & M_{zx'} \\ M_{xy'} & M_{yy'} & M_{zy'} \\ M_{xz'} & M_{yz'} & M_{zz'} \end{bmatrix} = [M']^T = \begin{bmatrix} M_{x'x} & M_{y'x} & M_{z'x} \\ M_{x'y} & M_{y'y} & M_{z'y} \\ M_{x'z} & M_{y'z} & M_{z'z} \end{bmatrix}^T, \quad (51)$$

where e.g. matrix element $M_{xy'}$ denotes the mutual inductance between the x-sense coil 912 and the y'-generator coil 904 and matrix element $M_{x'y}$ between the mutual inductance between the x'-generator coil 902 and the y-sense coil 914 in connection with FIG. 9.

Since, magnetic field position and orientation finding may rely on the magnetic field coupling relationship (e.g. the mutual inductances) as previously discussed, the direction of transmission may be irrelevant. Thus, the above-described position and orientation finding processes may be performed using the concept of the fictitious reverse transmitting system 2700. In this fictitious system, position and rotation angles refer to the generator's 368 (vehicle's) position and orientation, respectively, in the sensor's (base 408) coordinate frame having x-, y-, and z-axis.

In analogy to the definitions (3) to (12), vectors and matrices of the fictitious reverse transmitting system 2700 may be defined, for the current vectors:

$$I_x = \begin{bmatrix} I_x \\ 0 \\ 0 \end{bmatrix}, I_y = \begin{bmatrix} 0 \\ I_y \\ 0 \end{bmatrix}, I_z = \begin{bmatrix} 0 \\ 0 \\ I_z \end{bmatrix}, \quad (52)$$

for the 3×3 current matrix:

$$[I] = [I_x \ I_y \ I_z] = \begin{bmatrix} I_x & 0 & 0 \\ 0 & I_y & 0 \\ 0 & 0 & I_z \end{bmatrix}, \quad (51)$$

for the 3D voltage vectors:

$$V_x = \begin{bmatrix} V_{xx'} \\ V_{xy'} \\ V_{xz'} \end{bmatrix}, V_y = \begin{bmatrix} V_{yx'} \\ V_{yy'} \\ V_{yz'} \end{bmatrix}, V_z = \begin{bmatrix} V_{zx'} \\ V_{zy'} \\ V_{zz'} \end{bmatrix}, \quad (52)$$

for the 3×3 voltage matrix:

$$[V] = \begin{bmatrix} V_{xx'} & V_{yx'} & V_{zx'} \\ V_{xy'} & V_{yy'} & V_{zy'} \\ V_{xz'} & V_{yz'} & V_{zz'} \end{bmatrix} = [V_x \ V_y \ V_z], \quad (53)$$

for the 9D voltage vector:

$$V = \begin{bmatrix} V_{xx'} \\ V_{xy'} \\ V_{xz'} \\ V_{yx'} \\ V_{yy'} \\ V_{yz'} \\ V_{zx'} \\ V_{zy'} \\ V_{zz'} \end{bmatrix}, \quad (54)$$

and for the 3×3 angular frequency matrix of the fictitious current excitation:

$$[\omega] = \begin{bmatrix} \omega_x & 0 & 0 \\ 0 & \omega_y & 0 \\ 0 & 0 & \omega_z \end{bmatrix}. \quad (55)$$

In the fictitious reverse transmitting system 2700, for a sinusoidal current excitation of the sense coils 912, 914, 916, the relationship between the three sense coil currents $I_x$, $I_y$, $I_z$ and the resulting nine voltage components of voltage vector V may be expressed in matrix form using definitions ( ), (, and (as $$[V]=[\omega][M][I]. \quad (56)$$

Exciting the sense coils 912, 914, 916 of the fictitious reverse transmitting system 2700 with the same currents and frequencies as the generator coils 902, 904, 906 in the real forward transmitting system 1000, so that $$[I]=[I'] \quad (59)$$

and $$[\omega]=[\omega'] \quad (57)$$

holds, would result in the same induced voltage components, and the voltage matrices are related as follows:

$$[V]=[\omega][M][I]=[\omega'][M']^T[I']=[V']^T. \quad (58)$$

Hence, the induced voltage components are related as follows:

$$V_{xx'}=V_{x'x},$$

$$V_{xy'}=V_{y'x},$$

$$V_{xz'}=V_{z'x},$$

etc. (59)

Analogously to definition (13), the base positioning subsystem 364 may determine the absolute value of the scalar product of each unique combination of the 3D vectors $V_x$, $V_y$, $V_z$ that also form the 9D voltage vector V to generate a 6D vector A for the fictitious reverse transmitting system 2700 as follows:

$$A = \begin{bmatrix} |V_x \cdot V_x| \\ |V_y \cdot V_y| \\ |V_z \cdot V_z| \\ |V_x \cdot V_y| \\ |V_x \cdot V_z| \\ |V_y \cdot V_z| \end{bmatrix}. \quad (60)$$

As opposed to the 6D vector A' defined by (13), the vector A may become invariant to rotations of the generator 368 with respect to the sensor 366 in implementations where only the magnetic field generator 368 may be considered isotropic.

In analogy to Equation (31), a process for determining a position and orientation jointly in the fictitious reverse transmitting system 2700 of FIG. 27 may be defined as:

$$\min_{\text{all } i,j,k,l,m,n,p} |V_0(r_{i,j,k}) - p\hat{V}(-\varphi_l, -\theta_m, -\psi_n)| \to \hat{r} \quad (61)$$
$$\to \hat{\varphi},$$
$$\to \hat{\theta},$$
$$\to \hat{\psi}$$

where $V_0(r_{i,j,k})$ denotes the 9D zero-rotated reference vector associated to position $r_{i,j,k}$ and $\hat{V}(-\varphi_l, -\theta_m, -\psi_n)$ the rotational transform of the 9D detection vector $\hat{V}$ (as defined by ( )) of the fictitious reverse transmitting system 2700. The rotational transform $\hat{V}(-\varphi_l, -\theta_m, -\psi_n)$ may be defined in analogy to Equation (32) by $$\hat{V}(-\varphi_l, -\theta_m, -\psi_n) = [R_{\varphi_l}]^T [R_{\theta_m}]^T [R_{\psi_n}]^T [\hat{V}], \quad (62)$$

where matrices $[R_{\varphi_l}]$, $[R_{\theta_m}]$, and $[R_{\psi_n}]$ represent rotation matrices defined analogously to definitions (19)-(21). In some implementations, reference vectors $V_0(r_{i,j,k})$ may be obtained from a LUT analogous to the LUT 2300 of FIG. 23.

Position and rotation angle estimates $\hat{r}, \hat{\varphi}, \hat{\theta}, \hat{\psi}$ as output by the process of Equation ( ) refer to the generator's 368 position and orientation in the sensor's 366 coordinate frame.

In some implementations, position estimate $\hat{r}$ and rotation angle estimates $\hat{\varphi}, \hat{\theta}, \hat{\psi}$ as determined in the sensor's 366 coordinate frame may be transformed back to the generator's 366 coordinate frame using standard coordinate transformation given by the following Equations ( )-( ):

$$\hat{r}' = [R_{\hat{\psi}}][R_{\hat{\theta}}][R_{\hat{\varphi}}](-\hat{r}), \quad (63)$$

$$\hat{\varphi}' = -\hat{\varphi}, \quad (64)$$

$$\hat{\theta}' = -\hat{\theta}, \quad (65)$$

$$\hat{\psi}' = -\hat{\psi}. \quad (69)$$

Matrices $[R_{\hat{\psi}}]$, $[R_{\hat{\theta}}]$, and $[R_{\hat{\varphi}}]$ represent rotation matrices and are defined analogously to definitions (19)-(21).

Accordingly, the base positioning subsystem 362 may determine a position of the generator 368 with respect to the sensor 366 in the fictitious reverse transmitting system 2700 of FIG. 27 by using an orientation-independent process in analogy to the process as defined by (22) using the rotation-invariant vector A defined by ( ) as follows:

$$\min_{\text{all } i,j,k,l} |A(r_{i,j,k}) - \hat{A}| \to \hat{r}, \quad (66)$$

where $A(r_{i,j,k})$ may denote the 6D reference vectors as stored in a LUT analogous to the LUT 2300 of FIG. 23, and $\hat{A}$ may denote the 6D detection vector of the fictitious reverse transmitting system 2700.

Accordingly, once position $\hat{r}$ is known, e.g., from a first operation orientation-independent positioning process, the base positioning subsystem 362 may determine rotation angles $\hat{\varphi}, \hat{\theta}, \hat{\psi}$ of the generator 368 with respect to the sensor 366 in the fictitious reverse transmitting system 2700 of FIG. 27 by using an orientation finding process analogous to the process of Equation ( ). This process is not further described herein.

Figure 28:
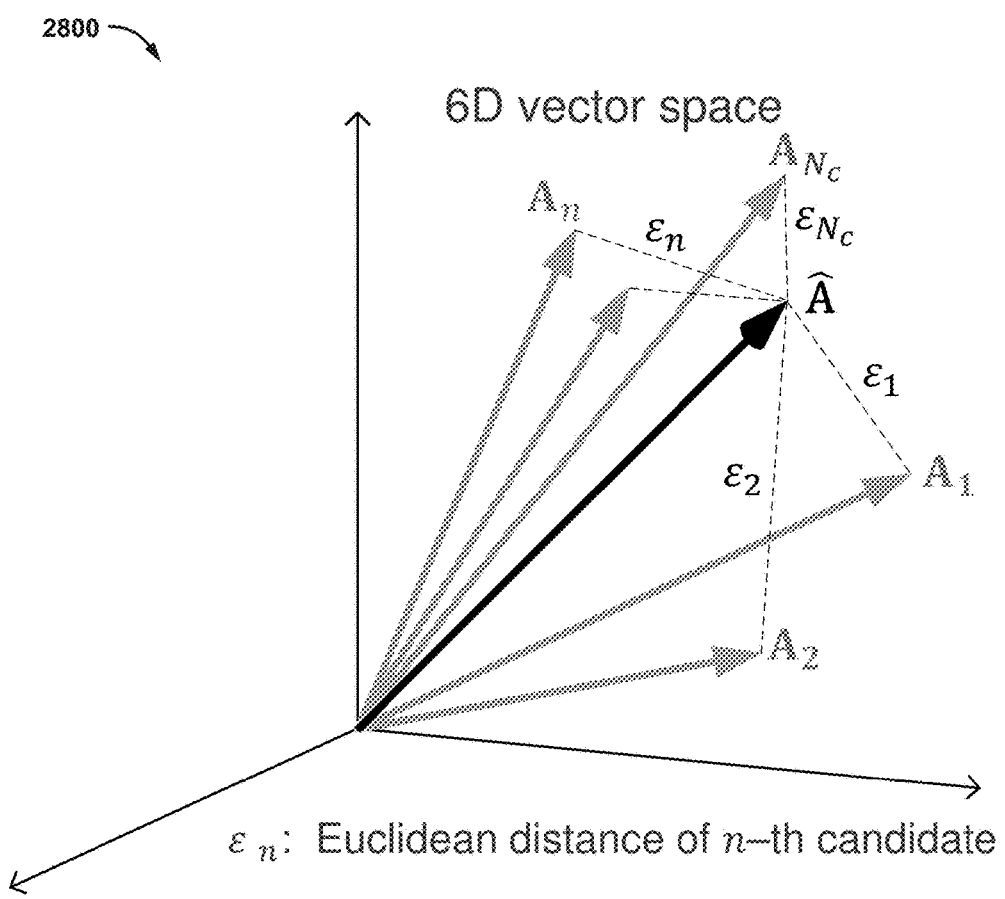
FIG. 28 is another diagram illustrating Euclidean distances between 6D candidate reference vectors of the LUT of FIG. 23 and a 6D detection vector in the 6D vector space.

Moreover, in some implementations, the base positioning subsystem 362 may determine a position estimate $\hat{r}$ and rotation angle estimates $\hat{\varphi}, \hat{\theta}, \hat{\psi}$ of the generator 368 with respect to the sensor 366 in the fictitious reverse transmitting system 2700 of FIG. 27 in a two-operation process as described below. In the first operation process, the base positioning subsystem 362 may find a number $N_c$ of candidate positions $r_1, r_2, \ldots, r_{N_c}$ in an orientation-independent process, which is not further described herein, in analogy to the process of Equation ( ). FIG. 28 illustrates Euclidean distances $\varepsilon_1, \varepsilon_2, \ldots \varepsilon_{N_c}$ between 6D reference vectors $A(r_1), A(r_2), \ldots, A(r_{N_c})$ of a LUT analogous to LUT 2300 and a 6D detection vector $\hat{A}$ in the 6D vector space 2800.

Figure 29:
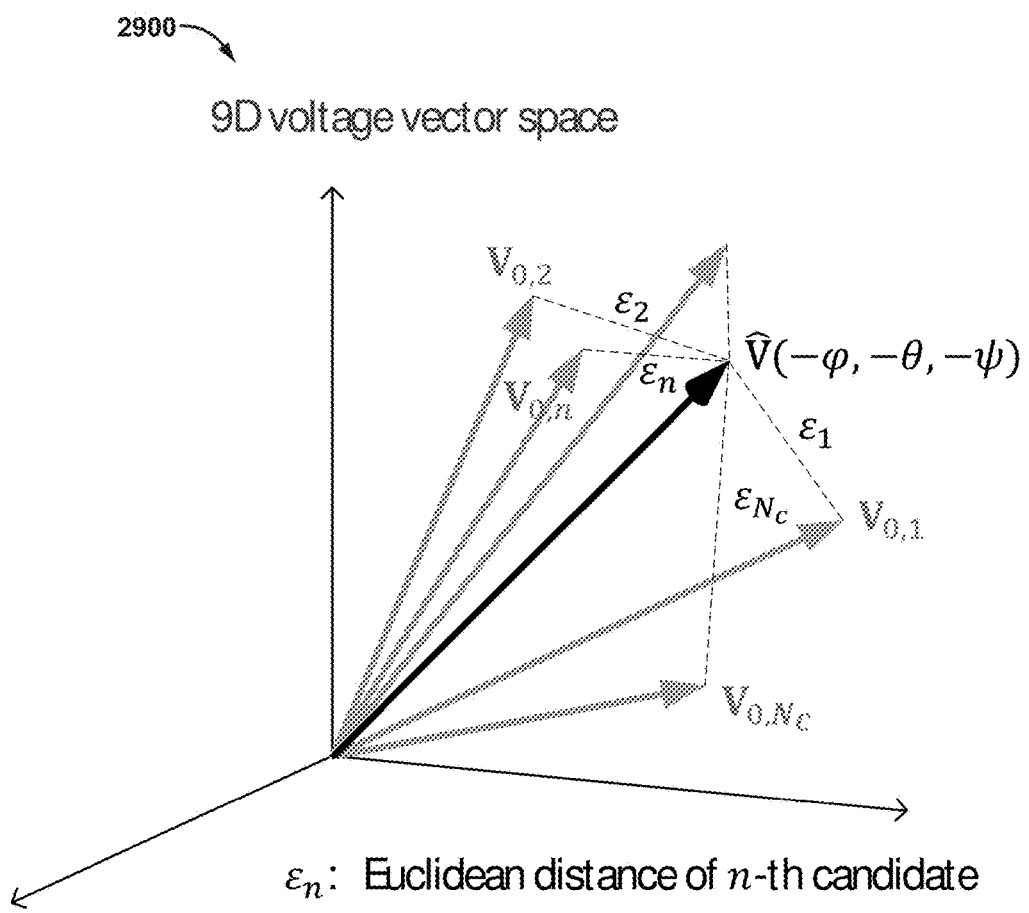
FIG. 29 is another diagram illustrating Euclidean distances between 9D candidate reference vectors of the LUT of FIG. 23 and a rotational transform of a 9D detection vector in the 9D voltage vector space.

In a subsequent (second operation) process, the base positioning subsystem 362 may determine, amongst the set of $N_c$ candidate positions $r_1, r_2, \ldots, r_{N_c}$, the position r and the rotation angles $\varphi_l, \theta_m, \psi_n$ for which a Euclidean distance $\varepsilon$ between a rotational transform $\hat{V}(-\varphi_l, -\theta_m, -\psi_n)$ of the 9D detection vector $\hat{V}$ and 9D reference vectors $V_0$ associated to candidate positions $r_1, r_2, \ldots, r_{N_c}$ is a minimum. The second operation of the two-operation process for joint position and orientation finding, which is not further described herein, is analogues to the process of Equation ( ). FIG. 29 illustrates Euclidean distances $\varepsilon_1, \varepsilon_2, \ldots \varepsilon_{N_c}$ between a rotational transform of detection vector $\hat{V}$ and a plurality of reference vectors $V_0$ in the 9D vector space 2900. The plurality of reference vectors $V_0$ refers to the zero-rotated 9D reference vectors associated to candidate positions $r_1, r_2, \ldots, r_{N_c}$ and may be stored in a LUT analogous to the LUT 2300 of FIG. 23. The position and rotation angles determined in this second operation process may be referred to as the final position estimate $\hat{r}$ and angle estimates $\hat{\varphi}, \hat{\theta}, \hat{\psi}$ of the generator 368 in the sensor's coordinate frame.

FIG. 30 is a block diagram illustrating at least a portion of the base positioning subsystem 362 of FIG. 3, in accordance with some implementations. The base positioning subsystem 362 comprises phase synchronization circuitry 3002, a processor 3004, and a memory 3010. The phase synchronization circuitry 3002 may be configured to receive and detect the voltage signals $v_x(t), v_y(t), v_z(t)$ as inputs from each of the sense coils 912, 914, 916 (see FIGS. 9 and 10). The phase synchronization circuitry 3002 may further establish a relative phase synchronization based on the received voltage signals $v_x(t), v_y(t), v_z(t)$. The phase synchronization circuitry 3002 may output signals indicative for a first set of voltage data comprising components $\hat{V}_{x'x}, \hat{V}_{x'y}, \hat{V}_{x'z}, \hat{V}_{y'x}, \hat{V}_{y'y}, \hat{V}_{y'z}, \hat{V}_{z'x}, \hat{V}_{z'y}, \hat{V}_{z'z}$ to the processor 3004 for subsequent processing. These nine components may represent the components of the 9D detection vector $\hat{V}$ as defined by (9) and are indicative of corresponding voltages induced into the sense coils 912, 914, and 916 as illustrated in FIGS. 9 and 10.

The memory 3010 may be configured to store information for use by either or both of the phase synchronization circuitry 3002 and the processor 3004. For example, the LUT 2300 of FIG. 23 and/or any other data associated with any determination, calculation, or process previously described in connection with any of FIGS. 3-29 may be stored in the memory 3010. Although memory 3010 is shown as an entity separate from the phase synchronization circuitry 3002 and the processor 3004, the present application is not so limited. For example, the memory 3010 may alternatively be integrated into one or both of the phase synchronization circuitry 3002 or the processor 3004.

The processor 3004 may be configured to receive the signals indicative for $\hat{V}_{x'x}$, $\hat{V}_{x'y}$, $\hat{V}_{x'z}$, $\hat{V}_{y'x}$, $\hat{V}_{y'y}$, $\hat{V}_{y'z}$, $\hat{V}_{z'x}$, $\hat{V}_{z'y}$, $\hat{V}_{z'z}$, and output signals indicative of the position estimate $\hat{r}'$ and angle estimates $\varphi'$, $\theta'$, $\psi'$ as previously described in connection with FIGS. 3-29.

For example, the phase synchronization circuitry 3002 may be configured to determine a first detection vector $\hat{V}'$ having a first number of dimensions (e.g., 9D) based on the respective voltage signals $v_x(t)$, $v_y(t)$, $v_z(t)$ generated by the plurality of sense coils 912, 914, 916 (see FIGS. 9 and 10 and Equation (9)).

The processor 3004 may further be configured to determine, using the first set of (voltage) data, a second set of data, which may comprise components of a second detection vector $\hat{A}'$ having a second number of dimensions (e.g., 6D) less than the first number of dimensions (see FIGS. 9 and 10 and Equation (13)). The second detection vector $\hat{A}'$ may be rotationally invariant with respect to an orientation of the plurality of receive coils 912, 914, 916.

The processor 3004 may further be configured to select a plurality of stored first reference vectors $A'(r'_1)$, $A'(r'_2)$, ..., $A'(r'_{N_c})$ (see FIGS. 23-25), each having the second number of dimensions (e.g., 6D) and each corresponding to a respective calibrated position $r'_1, r'_2, \ldots, r'_{N_c}$ with respect to the magnetic field generator 368. The plurality of stored first reference vectors $A'(r'_1)$, $A'(r'_2)$, ..., $A'(r'_{N_c})$ may be selected based on having a smaller Euclidean distance $\varepsilon_1, \varepsilon_2, \ldots \varepsilon_{N_c}$ between the selected plurality of stored first reference vectors $A'(r'_1)$, $A'(r'_2)$, ..., $A'(r'_{N_c})$ and the determined second detection vector $\hat{A}'$ than all other stored first reference vectors $A'(r')$ (see Equation ( )).

The processor 3004 may further be configured to select a plurality of stored second reference vectors $V'_0 (r'_1)$, $V'_0(r'_2), \ldots, V'_0(r'_{N_c})$ (see FIGS. 23 and 26). Each has the first number of dimensions (e.g., 9D) and each corresponds to the respective calibrated positions $r'_1, r'_2, \ldots, r'_{N_c}$ with respect to the magnetic field generator 368 for one of the selected plurality of stored first reference vectors $A'(r'_1)$, $A'(r'_2), \ldots, A'(r'_{N_c})$ (see FIGS. 23-25).

The processor 3004 may further be configured to rotationally transform the determined first detection vector $\hat{V}'$ by at least one predetermined rotation angle, e.g., $\varphi'$ (see FIG. 18 and Equation (32)).

The processor 3004 may further be configured to increment the at least predetermined rotation angle e.g. $\varphi'$ by a predefined angle step and rotationally transform the determined first detection vector $\hat{V}'$ by the incremented rotation angle $\varphi'$ a plurality of times until a limit of a predetermined rotation angle range is reached (see Equation (34)).

The processor 3004 may further be configured to, for each of the rotationally transformed first detection vectors, determine a Euclidean distance $\varepsilon$ between the rotationally transformed first detection vector $\hat{V}'(-\varphi', -\theta', -\psi')$ and each of the selected stored second reference vectors $V'_0 (r'_1)$, $V'_0(r'_2), \ldots, V'_0(r'_{N_c})$ (see FIG. 26 and Equation ( )).

The processor 3004 may further be configured to determine a position with respect to the magnetic field generator 368 based on the selected stored second reference vector $V'_0 (r')$ for which the determined Euclidean distance $\varepsilon$ between the selected stored second reference vector $V'_0(r')$ and any of the rotationally transformed first detection vectors $\hat{V}'(-\varphi', -\theta', -\psi')$ is a minimum (see FIGS. 23-26).

Figure 31:
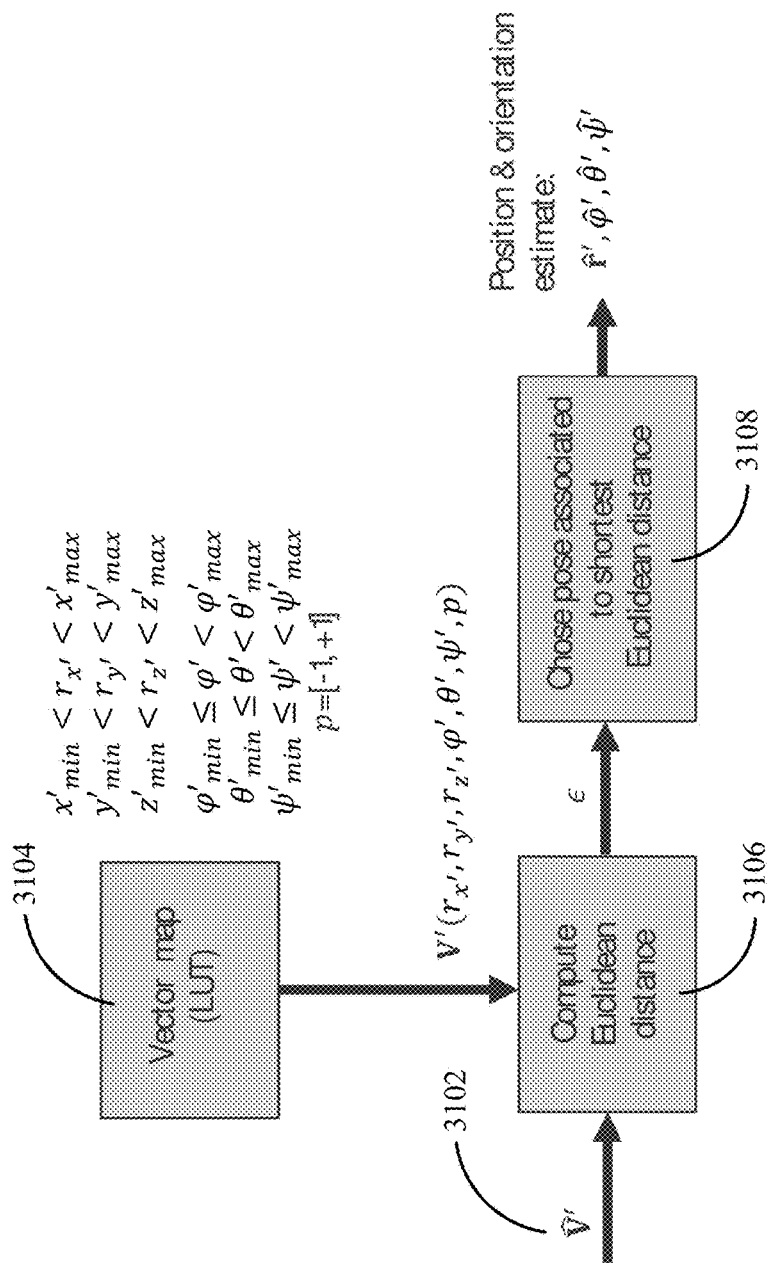
FIG. 31 illustrates a diagram of an example joint position and orientation finding process using an LUT.

FIG. 31 illustrates a flow diagram of an example joint position and orientation finding process using a LUT. Vector $\hat{V}'$ 3102 corresponds to a detected vector (e.g., a 9D vector) based upon one or more detected voltage signals. For example, vector $\hat{V}'$ 3102 may correspond to the output signals output by phase synchronization circuitry 3002 illustrated in FIG. 30. As illustrated in FIG. 31, at block 3106, a position computer (e.g., processor 3004 as illustrated in FIG. 30), in response to receiving the detected vector $\hat{V}'$ 3102, may compute a closeness level (e.g., a Euclidean distance $\varepsilon$) between the detected vector $\hat{V}'$ 3102 and a plurality of reference vectors V' from a vector map or LUT 3104 (e.g., LUT 2300 as illustrated in FIG. 23). At block 3108, the position computer may select a "closest" vector of the plurality of reference vectors V'. In some implementations, the "closest" vector may be determined by a selecting a reference vector V' having a shortest Euclidean distance $\varepsilon$ to the detected vector $\hat{V}'$ 3102 in a 9D vector space.

Figure 32:
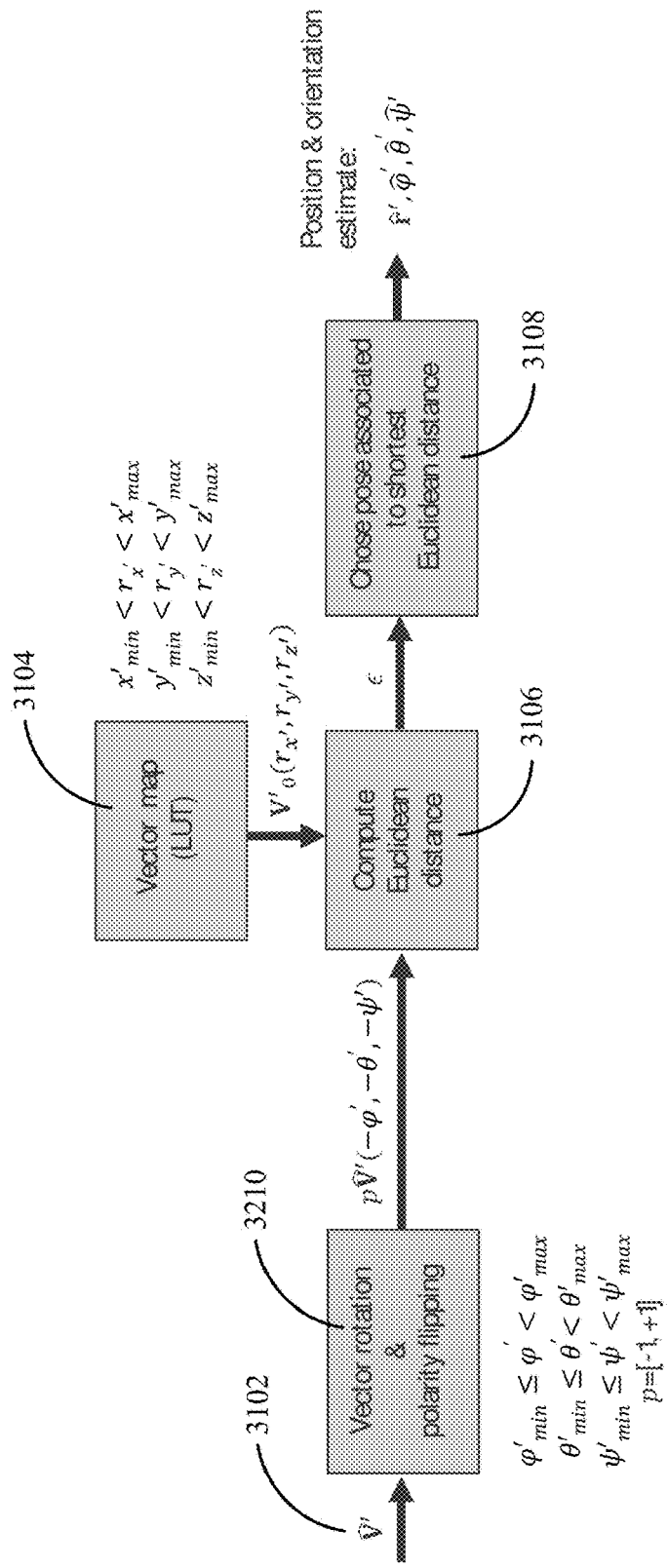
FIG. 32 illustrates a diagram of another example joint position and orientation finding process using an LUT.

FIG. 32 illustrates a flow diagram of another example joint position and orientation finding process using a LUT 3104 containing only zero-rotation reference vectors $V'_0$. In some implementations, this may be due to the memory 3010 on which the LUT 3104 is stored having one or more size or storage constraints. Here, the detected vector $\hat{V}'$ 3102 may first, at block 3210, undergo vector rotation and, if required, polarity flipping. The search for a closest zero-rotation reference vector $V'_0$ may be performed iteratively for a plurality of rotated versions of the detected vector $\hat{V}'$ 3102 (e.g., in steps of 1°). In the case of polarity ambiguity of the detected vector $\hat{V}'$, iterations may also be performed for both polarity hypotheses p=[−1, +1]. At block 3106, closeness levels (e.g., Euclidean distances $\varepsilon$) may be computed between the rotated and or flipped vectors $\widehat{pV}'(-\varphi', -\theta', -\psi')$ and a plurality of zero-ration reference vectors $V'_0$ from the LUT 3104. Upon identifying a zero-rotation reference vector $V'_0$ and rotation angles $\varphi'$, $\theta'$, $\psi'$ providing closest match of the rotational transform $\hat{V}'(-\varphi', -\theta', -\psi')$ to the detected vector $\hat{V}'$, the position r' associated with the zero-rotation reference vector $V'_0$ and the rotation angles $\varphi'$, $\theta'$, $\psi'$ may be chosen, at block 3108, as position estimate $\hat{r}'$ and orientation estimates $\hat{\varphi}'$, $\hat{\theta}'$, $\hat{\psi}'$, respectively.

Figure 33:
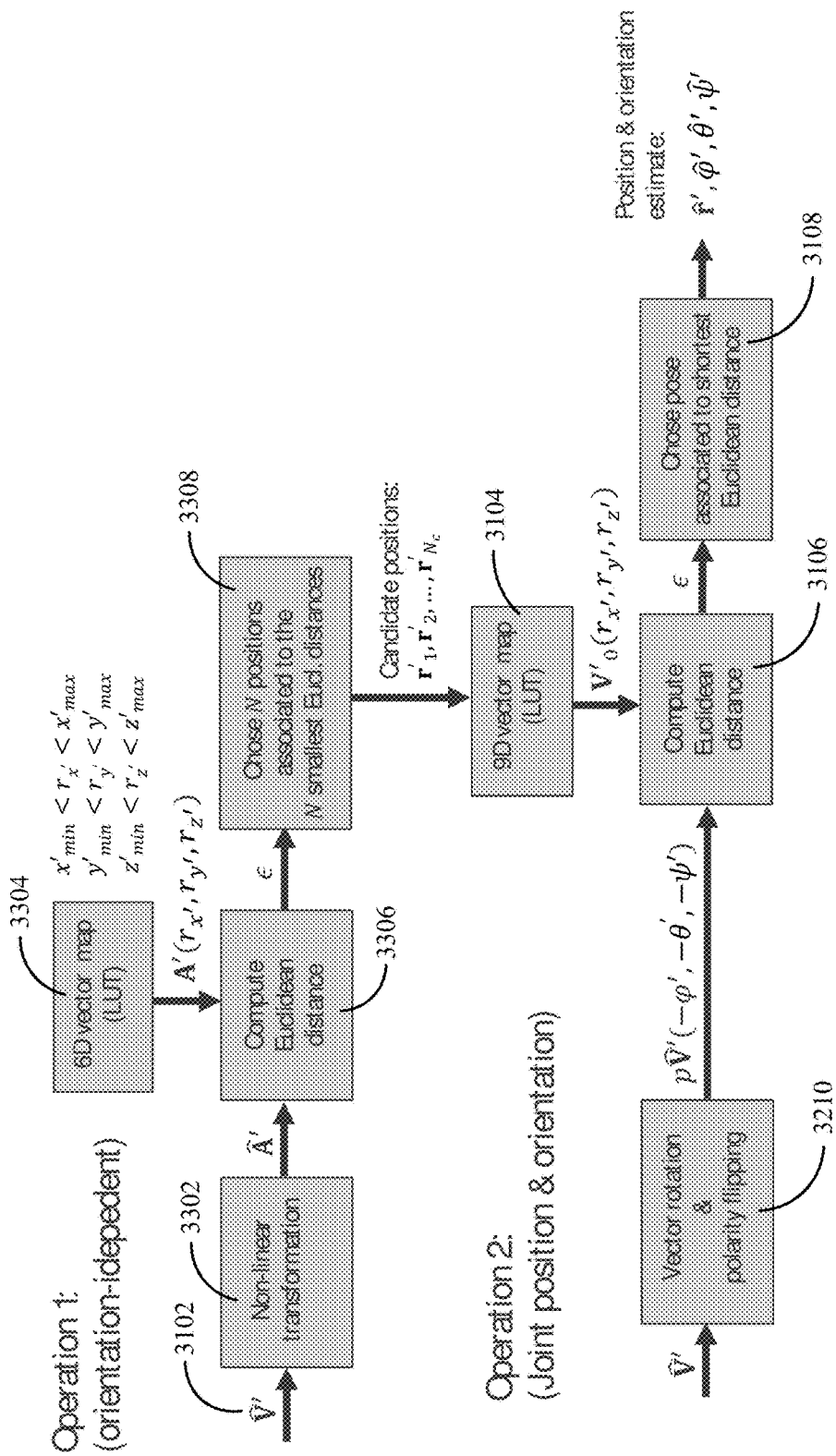
FIG. 33 illustrates a diagram of an example two-operation position and orientation finding process.

FIG. 33 illustrates a flow diagram of an example two-operation position and orientation finding process. In some implementations, the two-operation position and orientation finding process may be used for a processor 3004 that is subject to a computing power constraint. The two-operation position and orientation finding process comprises a first orientation-independent process, and a second joint position and orientation process. In the first operation, a 9D detection vector $\hat{V}'$ 3102 is received and undergoes a non-linear transform to produce a 6D rotation-invariant vector $\hat{A}'$ at block 3302. A 6D vector map or LUT 3304 is searched at block 3304 to determine a number of candidate positions $r'_1$, $r'_2, \ldots, r'_{N_c}$ (e.g., 50 candidate positions). In some implementations, the candidate positions are determined by computing, at block 3306, Euclidean distances $\varepsilon$ between the 6D rotation-invariant vector $\hat{A}'$ and reference vectors $A'(r')$ from the 6D vector map or LUT 3304, and choosing, at block 3308, a number of candidate positions $r'_1, r'_2, \ldots, r'_{N_c}$ having the smallest Euclidean distance $\varepsilon$ between the 6D rotation-invariant vector $\hat{A}'$ and the corresponding reference vector $A'(r')$ in comparison to all non-candidate positions of the 6D vector map or LUT 3304. In some implementations, the number of candidate positions chosen may be a predefined value, based upon a number of reference vectors $A'(r')$ having a distance from the 6D rotation-invariant vector $\hat{A}'$ less than a threshold amount, or a combination thereof.

In the second operation, a final position estimate $\hat{r}'$ and orientation estimate $\hat{\varphi}'$, $\hat{\theta}'$, $\hat{\psi}'$ is determined using the joint positioning process as previously described (e.g., in FIG. 32), using only candidate positions found in the first operation (e.g., reference vectors $V'_0$ retrieved from a 9D vector map or LUT 3104, corresponding to the candidate positions $r'_1, r'_2, \ldots, r'_{N_c}$.) By restricting the reference vectors $V'_0$ to those corresponding to the candidate positions $r'_1, r'_2, \ldots, r'_{N_c}$ found in the first operation instead of all positions within the 9D vector map or LUT 3104, the amount of computations needed to determine the final position and orientation estimate $\hat{r}'$, $\hat{\varphi}'$, $\hat{\theta}'$, $\hat{\varphi}'$ can be greatly reduced.

Figure 34:
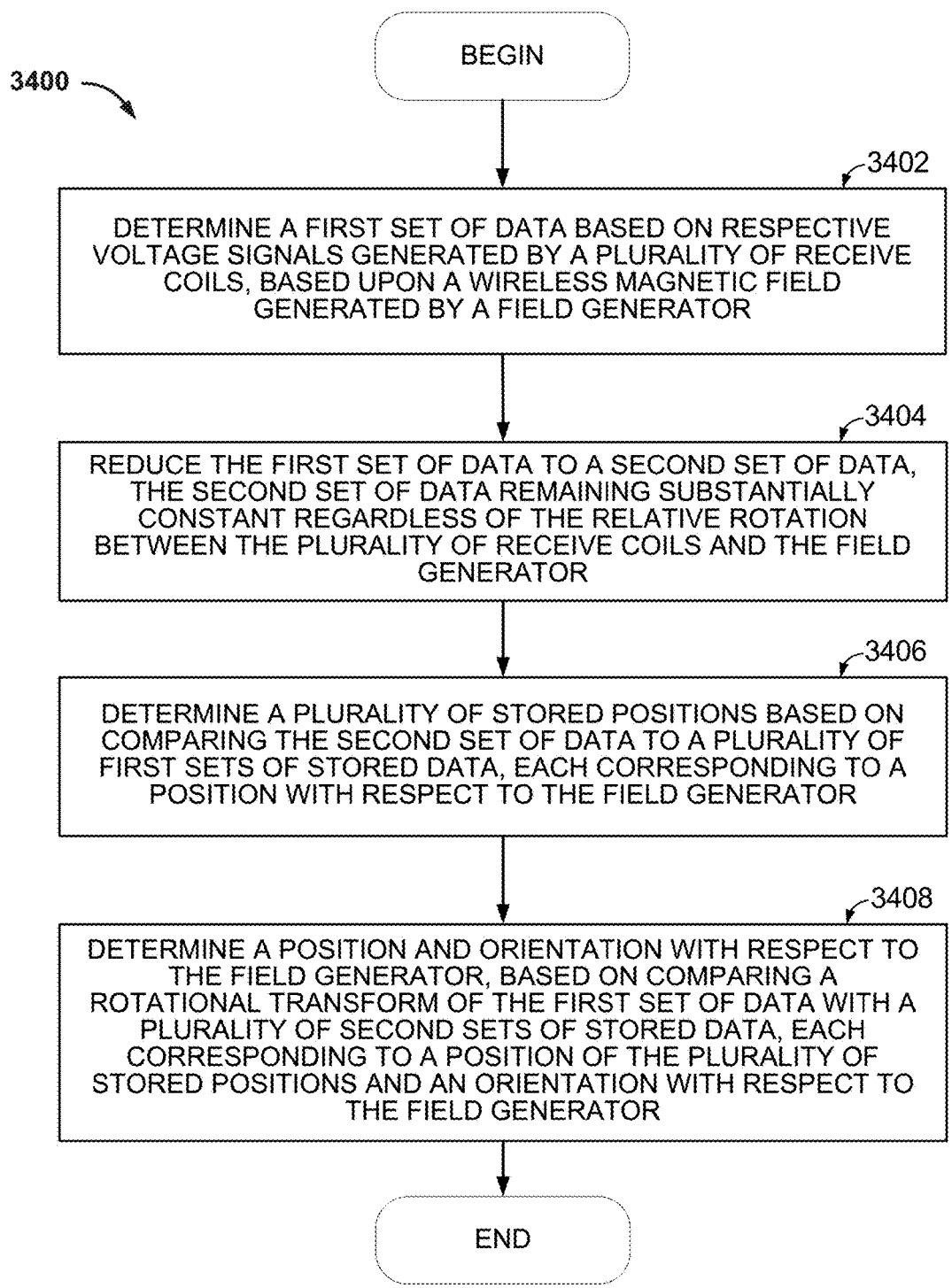
FIG. 34 is a flowchart depicting a method for determining a position and orientation of a vehicle, in accordance with some implementations.

FIG. 34 is a flowchart 3400 depicting a method for determining a position and orientation of a vehicle, in accordance with some implementations. Flowchart 3400 corresponds to previously described FIGS. 4-33 and may correspond to a magnetic field positioning system 900. Although the flowchart 3400 is described herein with reference to a particular order, in various implementations, blocks herein may be performed in a different order, or omitted, and additional blocks may be added.

At block 3402, a processor (e.g., processor 3004) determines a first set of (voltage) data based on respective voltage signals generated by a plurality of receive coils, wherein each of the plurality of receive coils is configured to generate a respective voltage signal in response to a wireless magnetic field generated by a field generator. In some implementations, the first set of (voltage) data corresponds to a multi-dimensional vector (e.g., a 9-dimensional vector).

At block 3404, the first set of (voltage) data is reduced to a second set of data, wherein the second set of data is substantially constant regardless of relative rotation between the plurality of receive coils and the field generator. In some implementations, the second set of data may correspond to a multi-dimensional vector, such as a 6-dimensional vector. In some implementations, reducing the first set of voltage data to the second set of data comprises performing a non-linear transformation on the first set of voltage data.

At block 3406, a plurality of stored positions (e.g., candidate positions) may be determined. This may comprise comparing the second set of data to a plurality of a first set of stored data each corresponding to a position with respect to the field generator to determine a subset of the plurality of the first set of stored data. In some implementations, the plurality of stored positions may correspond to first sets of stored data having a smaller distance to the determined second set of data than all other first sets of stored data of the plurality of first sets of stored data. In some implementations, the number of stored positions in the subset may be a predetermined number, or may comprise all stored positions in which the comparison to the second set of data satisfies one or more criteria (e.g., Euclidean distance less than a threshold amount), or some combination thereof.

At block 3408, a position and an orientation with respect to the field generator is determined, based on the first set of data and the plurality of stored positions (e.g., as determined at block 3406). The positions corresponding to the subset of the plurality of the first set of stored data may be used to determine a subset of a second set of stored (voltage) data, which may be compared to at least one rotational transforms of a first set of (voltage) data to determine the position and orientation.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for positioning a vehicle, the apparatus comprising:
   a plurality of receive coils, each of the plurality of receive coils configured to generate a respective voltage signal from a wireless magnetic field generated by a field generator; and
   a processor configured to:
      reduce a first set of data indicative of the respective voltage signals generated by the plurality receive coils to a second set of data that is substantially constant regardless of relative rotation between the plurality of receive coils and the field generator,
      determine a plurality of candidate positions based on comparing the second set of data to a plurality of first sets of stored data mapped to stored positions of the vehicle relative to the field generator,
      identify a plurality of second sets of stored data using the determined plurality of candidate positions, wherein the plurality of second sets of stored data are mapped to stored positions and orientations of the vehicle relative to the field generator, and
      determine a position and an orientation of the vehicle with respect to the field generator based on comparing the first set of data with the plurality of second sets of stored data.

2. The apparatus of claim 1, wherein the plurality of receive coils are arranged in different mutually orthogonal geometric planes.

3. The apparatus of claim 1, wherein first set of data is a first multi-dimensional vector having a first number of dimensions and the second set of data is a second multi-dimensional vector having a second number of dimensions and comprising products of components of the first vector.

4. The apparatus of claim 3, wherein the first number of dimensions of the first multi-dimensional vector is larger than the second number of dimensions of the second multi-dimensional vector.

5. The apparatus of claim 1, wherein the plurality of first sets of stored data is generated based upon a mapping function between the stored positions and each of the first sets of stored data.

6. The apparatus of claim 5, wherein the processor is further configured to generate the first and second sets of stored data using a preconfigured system calibration process.

7. The apparatus of claim 1, wherein the plurality of candidate positions comprises a subset of the plurality of first sets of stored data that have a smaller distance to the determined second set of data than all first sets of stored data of the plurality of first sets of stored data not part of the subset.

8. The apparatus of claim 7, wherein the distance corresponds to a Euclidean distance.

9. The apparatus of claim 1, wherein the plurality of second sets of stored data are mapped to stored positions corresponding to the plurality of candidate positions.

10. The apparatus of claim 1, wherein determining the position and orientation is based on a second set of stored data of the plurality of second sets of stored data for which the determined distance to a rotational transform of the first set of data is a minimum.

11. The apparatus of claim 1, wherein the processor is further configured to:
   rotationally transform the first set of data by a predetermined rotation angle,
   increment the predetermined rotation angle and rotationally transform the first set of data by the incremented rotation angle a plurality of times until a predetermined rotation angle limit is reached, and
   for each of the rotationally transformed first sets of data, determine a distance between the rotationally transformed first set of data and the plurality of the second sets of stored data.

12. The apparatus of claim 1, wherein the processor is further configured to generate visual or acoustic guidance information for aligning the vehicle with the field generator, based upon the determined position and orientation of the vehicle.

13. A method for determining a location of a vehicle relative to a reference point, the method comprising:
   receiving, as an input, a first multi-dimensional vector having a first plurality of values indicative of respective electrical characteristics of a plurality of positioning coils, the electrical characteristics generated in response to a magnetic field generated by a field generator;
   generating a second multi-dimensional vector having a second plurality of values by performing a non-linear transformation on the first multi-dimensional vector, the total number of the second plurality of values being less than the total number of the first plurality of values;
   determining a plurality of candidate positions based on comparing the second multi-dimensional vector to a plurality of stored multi-dimensional vectors mapped with stored positions of the vehicle relative to the reference point;
   identifying a second set of stored multi-dimensional vectors corresponding to the determined plurality of candidate positions, each of the second set of stored multi-dimensional vectors mapped to a stored position and orientation of the vehicle relative to the reference point; and
   determining a position and orientation based on comparing the first multi-dimensional vector with the second set of stored multi-dimensional vectors.

14. The method of claim 13, wherein the plurality of positioning coils are arranged in mutually orthogonal planes.

15. The method of claim 13, wherein the first multi-dimensional vector is a 9-dimensional voltage vector and the second multi-dimensional vector is a 6-dimensional voltage vector comprising products of components of the 9-dimensional voltage vector.

16. The method of claim 13, wherein the plurality of stored multi-dimensional vectors comprises a plurality of stored 6-dimensional voltage vectors, each corresponding to one of a plurality of positions with respect to the reference point.

17. The method of claim 13, wherein the plurality of candidate positions corresponds to a selected subset of stored multi-dimensional vectors of the plurality of stored multi-dimensional vectors that have a smaller distance to the determined second multi-dimensional vector than all unselected stored multi-dimensional vectors of the plurality of stored multi-dimensional vectors.

18. The method of claim 17 wherein the distance corresponds to a Euclidean distance.

19. The method of claim 13, further comprising:
rotationally transforming the first multi-dimensional vector by a predetermined rotation angle,
incrementing the predetermined rotation angle and rotationally transforming the first multi-dimensional vector by the incremented rotation angle a plurality of times until a predetermined rotation angle limit is reached, and
for each of the rotationally transformed first multi-dimensional vector, determine a distance between the rotationally transformed first multi-dimensional vector and each of the second set of stored multi-dimensional vectors.

20. The method of claim 19, wherein determining the position and orientation further comprises determining the position with respect to the reference point based on a stored multi-dimensional vector of the second set of stored multi-dimensional vectors for which the determined distance to any of the rotationally transformed first multi-dimensional vector is a minimum.

21. The method of claim 13, further comprising generating visual or acoustic guidance information for aligning the vehicle with the field generator, based upon the determined position and orientation of the vehicle.

22. The method of claim 13, wherein the second multi-dimensional vector is substantially constant regardless of relative rotation between the plurality of positioning coils and the field generator.

23. An apparatus for determining a location of a vehicle relative to a reference point, comprising:
means for receiving, as an input, a first multi-dimensional vector having a first plurality of values indicative of respective electrical characteristics of a plurality of positioning coils, the electrical characteristics generated in response to a magnetic field generated by a field generator;
means for generating a second multi-dimensional vector having a second plurality of values by performing a non-linear transformation on the first multi-dimensional vector, the total number of the second plurality of values being less than the total number of the first plurality of values;
means for determining a plurality of candidate positions based on comparing the second multi-dimensional vector to a plurality of stored multi-dimensional vectors mapped with stored positions of the vehicle relative to the reference point;
means for identifying a second set of stored multi-dimensional vectors corresponding to the determined plurality of candidate positions, each of the second set of stored multi-dimensional vectors mapped to a stored position and orientation of the vehicle relative to the reference point; and
means for determining a position and orientation based on comparing the first multi-dimensional vector with the second set of stored multi-dimensional vectors.

24. The apparatus of claim 23, wherein the first multi-dimensional vector is a 9-dimensional voltage vector and the second multi-dimensional vector is a 6-dimensional voltage vector comprising products of components of the 9-dimensional voltage vector.

25. The apparatus of claim 23, wherein the plurality of stored multi-dimensional vectors comprises a plurality of stored 6-dimensional voltage vectors, each corresponding to one of a plurality of positions with respect to the reference point.

26. The method of claim 23, wherein the plurality of candidate positions corresponds to a selected subset of stored multi-dimensional vectors of the plurality of stored multi-dimensional vectors that have a smaller distance to the determined second multi-dimensional vector than all unselected stored multi-dimensional vectors of the plurality of stored multi-dimensional vectors.

27. The method of claim 26 wherein the distance corresponds to a Euclidean distance.

28. A method for positioning a vehicle, the method comprising:
generating, at a plurality of receive coils, respective voltage signals based upon a wireless magnetic field generated by a field generator,
reducing a first set of data indicative of the respective voltage signals generated at the plurality receive coils to a second set of data that is substantially constant regardless of relative rotation between the plurality of receive coils and the field generator,
determining a plurality of candidate positions based on comparing the second set of data to a plurality of first sets of stored data mapped to stored positions of the vehicle relative to the field generator,
identifying a plurality of second sets of stored data using the determined plurality of candidate positions, wherein the plurality of second sets of stored data are mapped to stored positions and orientations of the vehicle relative to the field generator, and
determining a position and an orientation of the vehicle with respect to the field generator based on comparing the first set of data with the plurality of second sets of stored data.

29. The method of claim 28, wherein first set of data is a first multi-dimensional vector having a first number of dimensions and the second set of data is a second multi-dimensional vector having a second number of dimensions and comprising products of components of the first vector.

30. The method of claim 28, wherein the plurality of candidate positions comprises a subset of the plurality of first sets of stored data that have a smaller distance to the determined second set of data than all first sets of stored data of the plurality of first sets of stored data not part of the subset.

* * * * *